US008914306B1

(12) United States Patent
Preovolos et al.

(10) Patent No.: US 8,914,306 B1
(45) Date of Patent: Dec. 16, 2014

(54) SYSTEMS, METHODS, AND DEVICES FOR PRINTING DEBIT CARDS AND CHECKS

(71) Applicant: PenChecks, Inc., La Mesa, CA (US)

(72) Inventors: Peter Emanuel Preovolos, La Mesa, CA (US); Wendy Henderson, Campos, CA (US); Masood Roashan, San Diego, CA (US); Raphael Houri, Rancho Santa Fe, CA (US)

(73) Assignee: PenChecks, Inc., La Mesa, CA (US)

( * ) Notice: Subject to any disclaimer, the term of this patent is extended or adjusted under 35 U.S.C. 154(b) by 0 days.

(21) Appl. No.: 14/208,540

(22) Filed: Mar. 13, 2014

Related U.S. Application Data

(60) Provisional application No. 61/790,050, filed on Mar. 15, 2013, provisional application No. 61/790,656, filed on Mar. 15, 2013, provisional application No. 61/785,750, filed on Mar. 14, 2013, provisional application No. 61/791,604, filed on Mar. 15, 2013.

(51) Int. Cl.
*G06Q 20/10* (2012.01)
*G06Q 40/00* (2012.01)
*G06Q 20/26* (2012.01)
*G06Q 20/04* (2012.01)

(52) U.S. Cl.
CPC .............. *G06Q 20/26* (2013.01); *G06Q 20/105* (2013.01); *G06Q 20/042* (2013.01)

USPC .............................................. 705/41; 705/39

(58) Field of Classification Search
CPC ...... G06Q 20/10; G06Q 20/102; G06Q 20/40; G06Q 30/04; G06Q 40/00
USPC ........................................................ 705/41, 39
See application file for complete search history.

(56) References Cited

U.S. PATENT DOCUMENTS

| 6,932,268 | B1 * | 8/2005 | McCoy et al. | 235/380 |
| 7,644,036 | B2 * | 1/2010 | McCoy et al. | 705/39 |
| 2003/0212796 | A1 * | 11/2003 | Willard | 709/227 |
| 2005/0182724 | A1 * | 8/2005 | Willard | 705/44 |

\* cited by examiner

*Primary Examiner* — Jagdish Patel
(74) *Attorney, Agent, or Firm* — Knobbe Martens Olson & Bear LLP

(57) ABSTRACT

The disclosure herein provides system, methods, and devices for generating debit cards. A debit card system for creating a plurality of debit cards comprises a debit card printer, a batch creation engine, a payment batches database, a deposit management engine, and a distribution engine, wherein the debit card printer comprises an imprinting mechanism, a magnetic strip writer, and a computer network interface. In an embodiment, the distribution engine is further configured to initiate creation of an alternate account on behalf of a recipient related to a debit card that is not activated within a predetermined amount of time, and to transmit to a deposit processing system instructions to enable a deposit into the alternate account of funds equal to a recipient payment amount.

11 Claims, 25 Drawing Sheets

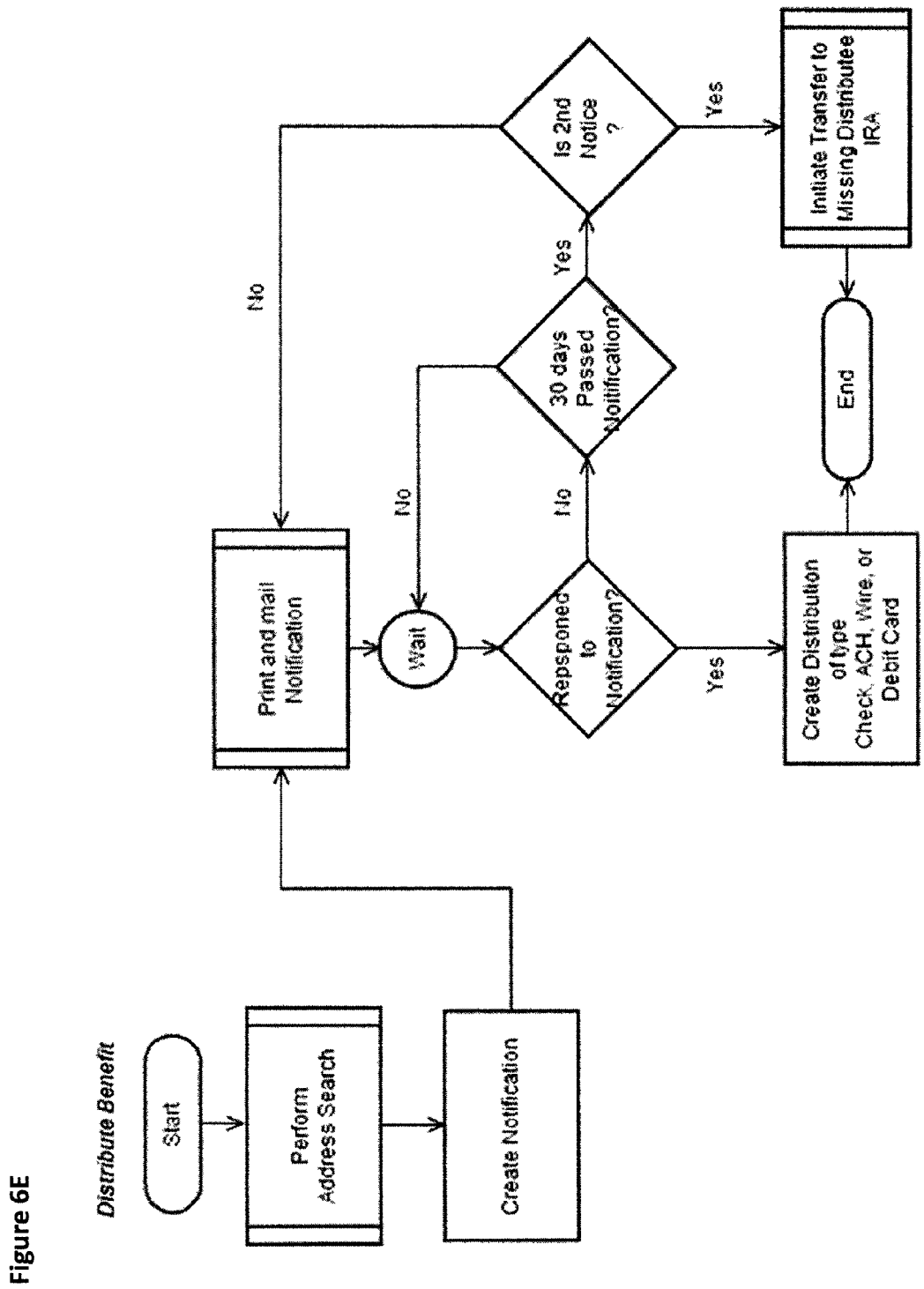

Figure 7C

SYSTEMS, METHODS, AND DEVICES FOR PRINTING DEBIT CARDS AND CHECKS

CROSS-REFERENCE TO RELATED APPLICATIONS

This application claims the benefit of U.S. Provisional Application No. 61/790,050 filed on Mar. 15, 2013, U.S. Provisional Application No. 61/790,656 filed on Mar. 15, 2013, U.S. Provisional Application No. 61/785,750 filed on Mar. 14, 2013, and U.S. Provisional Application No. 61/791,604 filed on Mar. 15, 2013. Each of the foregoing applications is hereby incorporated by reference herein in its entirety.

BACKGROUND

1. Field

The disclosure relates generally to the field of generating payment instruments, and more specifically to systems, methods, and devices for printing debit cards and checks.

2. Description

Payment instruments, such as debit cards, checks, and the like, can be convenient mechanisms for one company or individual to transfer funds to another company or individual. However, such payment instruments have several drawbacks. For example, unlike a physical transfer of cash, where the transfer is complete upon transferring the cash, a payment instrument is often merely associated with funds that are stored in the transferor's account. Accordingly, delivery of the payment instrument does not complete the transaction. Until the payment instrument is cashed, deposited, or otherwise presented for payment, the transferor may still have some level of responsibility associated with the safe-keeping of the funds. This drawback can become exponentially more complicated, tedious, and inefficient for a transferor dealing regularly with numerous payment instruments delivered to numerous recipients. Accordingly, it can be advantageous to have systems, methods, and devices that enable efficient printing, processing, and distribution of large numbers of payment instruments to large numbers of recipients.

SUMMARY

The disclosure herein provides systems, methods, and devices for efficient printing, processing, and distribution of large numbers of payment instruments to large numbers of recipients. In some embodiments, a debit card printing system is configured to receive instructions for a batch of debit cards to be distributed to a plurality of recipients and to efficiently process that batch, print a debit card for each recipient, and mail the debit card out to each recipient. In some embodiments, the debit card printing system is configured to automatically create and fund an alternate account, such as an investment account, for recipients that do not activate their debit card or are otherwise unresponsive.

In some embodiments, a debit card system for creating a plurality of debit cards comprises: a debit card printer configured to create debit cards based on instructions received through a computer network, the debit card printer comprising: an imprinting mechanism configured to apply textual information to a debit card blank; a magnetic strip writer configured to store information in a magnetic strip of the debit card blank; and a computer network interface configured to transmit and receive information through the computer network; a batch creation engine for processing batches of debit card distributions, the batch creation engine configured to receive through the computer network, from a user computing device, batch distribution information related to a batch of incomplete payments, the batch distribution information comprising a recipient name and a recipient payment amount for each of a plurality of recipients; a payment batches database for electronically storing information relating to the batches of debit card distributions, wherein the batch creation engine is further configured to assign a batch identifier to the batch of incomplete payments, calculate a total payment amount of the batch of incomplete payments by adding the recipient payment amounts, store the total payment amount in the payment batches database associated with the batch identifier, and transmit, through the computer network to the user computing device, the batch identifier and the total payment amount; a deposit management engine configured to receive, through the computer network from a deposit processing system, a deposit notification message, the deposit notification message comprising a deposit amount and a deposit identifier, wherein the deposit identifier matches the batch identifier, the deposit management engine further configured to access the total payment amount in the payment batches database using the deposit identifier, and to compare the deposit amount to the total payment amount to verify a correct amount of funds has been deposited; a distribution engine configured to, automatically in response to the verification that the correct amount of funds has been deposited, transmit instructions through the computer network to the debit card printer, causing the debit card printer to create a plurality of debit cards for at least a portion of the plurality of recipients by at least imprinting the recipient name and storing information associated with the recipient in the magnetic strip; and one more computers configured to operate the batch creation engine, deposit management engine, and distribution engine, wherein the one or more computers comprises a computer processor and an electronic storage medium.

In certain embodiments, a check printing system for printing a plurality of checks comprises: an electronic check printing device configured to print checks based on instructions received through a computer network, the check printing device comprising: a printer configured to apply textual information to paper; and a computer network interface configured to transmit and receive information through the computer network; a batch creation engine for processing batches of check distributions, the batch creation engine configured to receive through the computer network, from a user computing device, batch distribution information related to a batch of incomplete payments, the batch distribution information comprising a recipient name and a recipient payment amount for each of a plurality of recipients; a payment batches database for electronically storing information relating to the batches of check distributions, wherein the batch creation engine is further configured to assign a batch identifier to the batch of incomplete payments, calculate a total payment amount of the batch of incomplete payments by adding the recipient payment amounts, store the total payment amount in the payment batches database associated with the batch identifier, and transmit, through the computer network to the user computing device, the batch identifier and the total payment amount; a deposit management engine configured to receive, through the computer network from a deposit processing system, a deposit notification message, the deposit notification message comprising a deposit amount and a deposit identifier, wherein the deposit identifier matches the batch identifier, the deposit management engine further configured to access the total payment amount in the payment batches database using the deposit identifier, and to compare the deposit amount to the total payment amount to verify a correct amount of funds has been deposited; a distribution engine configured to, automatically in response to the verification that the correct amount of funds has been deposited, transmit instructions through the computer network to the check printing device, causing the check printing device to print a plurality of checks for at least a portion of the plurality of recipients using at least the recipient name and the recipient payment amount; and one more computers configured to operate the batch creation engine, deposit management engine, and distribution engine, wherein the one or more computers comprises a computer processor and an electronic storage medium.

In some embodiments, a payment distribution system for processing a plurality of payment instruments comprises: a batch creation engine for processing batches of payment distributions, the batch creation engine configured to receive through a computer network, from a user computing device, batch distribution information related to a batch of incomplete payments, the batch distribution information comprising a recipient name, a recipient address, and a recipient payment amount for each of a plurality of recipients; a payment batches database for electronically storing information relating to the batches of payment distributions, wherein the batch creation engine is further configured to assign a batch identifier to the batch of incomplete payments, calculate a total payment amount of the batch of incomplete payments by adding the recipient payment amounts, store the total payment amount in the payment batches database associated with the batch identifier, and transmit, through the computer network to the user computing device, the batch identifier and the total payment amount; a deposit management engine configured to receive, through the computer network from a deposit processing system, a deposit notification message, the deposit notification message comprising a deposit amount and a deposit identifier, wherein the deposit identifier matches the batch identifier, the deposit management engine further configured to access the total payment amount in the payment batches database using the deposit identifier, and to compare the deposit amount to the total payment amount to verify a correct amount of funds has been deposited; a distribution engine configured to assign a recipient identifier to each of the plurality of recipients and to store the recipient identifiers in the payment batches database associated with the batch identifier, the distribution engine further configured to, automatically in response to the verification that the correct amount of funds has been deposited, transmit instructions through the computer network to the deposit processing system, causing the deposit processing system to initiate mailings of payment instruments to the recipients using at least the recipient address and recipient payment, wherein the distribution engine is further configured to, automatically upon receiving a notification that a mailing was returned as undeliverable, associate the returned mailing with a recipient identifier stored in the payment batches database, transmit through the computer network to an identification verification system, a request for a current address for the recipient associated with the returned mailing, and to initiate a new mailing of the payment instrument associated with the returned mailing to the current address automatically upon receiving the current address from the identification verification system; and one more computers configured to operate the batch creation engine, deposit management engine, and distribution engine, wherein the one or more computers comprises a computer processor and an electronic storage medium.

In some embodiments, a computer-implemented method of creating a plurality of debit cards comprises receiving through a computer network, from a user computing device, batch distribution information related to a batch of incomplete payments, the batch distribution information comprising a recipient name and a recipient payment amount for each of a plurality of recipients; assigning, by a computer system, a batch identifier to the batch of incomplete payments; calculating, by the computer system, a total payment amount of the batch of incomplete payments by adding the recipient payment amounts; storing, associated in an electronic database, the batch identifier and the total payment amount; transmitting through the computer network, to the user computing device, the batch identifier and the total payment amount; receiving through the computer network, from a deposit processing system, a deposit notification message, the deposit notification message comprising a deposit amount and a deposit identifier, wherein the deposit identifier matches the batch identifier; comparing, by the computer system, the deposit amount to the total payment amount stored in the database, to verify a correct amount of funds has been deposited; and creating, by an electronic debit card printing device, automatically in response to the verification that the correct amount of funds has been deposited, a plurality of debit cards using at least the recipient name for at least a portion of the plurality of recipients.

In some embodiments, a computer-implemented method of printing a plurality of checks comprises receiving through a computer network, from a user computing device, batch distribution information related to a batch of incomplete payments, the batch distribution information comprising a recipient name, a recipient address, and a recipient payment amount for each of a plurality of recipients; assigning, by a computer system, a batch identifier to the batch of incomplete payments; calculating, by the computer system, a total payment amount of the batch of incomplete payments by adding the recipient payment amounts; storing, associated in an electronic database, the batch identifier and the total payment amount; transmitting through the computer network, to the user computing device, the batch identifier and the total payment amount; receiving through the computer network, from a deposit processing system, a deposit notification message, the deposit notification message comprising a deposit amount and a deposit identifier, wherein the deposit identifier matches the batch identifier; comparing, by the computer system, the deposit amount to the total payment amount stored in the database, to verify a correct amount of funds has been deposited; and printing, by an electronic check printing device, automatically in response to the verification that the correct amount of funds has been deposited, a plurality of checks using the recipient name, recipient address, and recipient payment amount for at least a portion of the plurality of recipients.

In some embodiments, a computer-implemented method of processing a plurality of related benefit distributions comprises receiving through a computer network, from a user computing device, batch benefit distribution information related to an incomplete batch benefit distribution, the batch benefit distribution information comprising a plurality of participant identifiers related to participants of a benefits plan and a distribution amount associated with each participant identifier; assigning, by a computer system, a unique identifier to the incomplete batch benefit distribution; calculating, by the computer system, a total batch distribution amount of the incomplete batch benefit distribution; storing, associated in an electronic database, the unique identifier and the total batch distribution amount; receiving through the computer network a deposit notification message from a banking system, the deposit notification message comprising a deposit amount and a deposit identifier, wherein the deposit identifier matches the unique identifier; comparing, by the computer system, the deposit amount to the total batch distribution amount stored in the database, to verify a correct amount of funds has been deposited; accessing, for each of the plurality of participant identifiers, a third party database, to obtain participant identity verification information; determining, by the computer system, using at least the participant identity verification information, validated identities for at least a portion of the plurality of participants; and transmitting through the computer network, to the banking system, distribution instructions causing the banking system to distribute funds equal to the distribution amount for each participant associated with a validated identity.

BRIEF DESCRIPTION OF THE DRAWINGS

The foregoing and other features, aspects, and advantages of the present invention are described in detail below with reference to the drawings of various embodiments, which are intended to illustrate and not to limit the invention. The drawings comprise the following figures in which:

FIG. 6E depicts an embodiment of a process flow diagram illustrating an example of distributing benefits.

FIGS. 7A-7C depict embodiments of a user interface for an unclaimed benefits system.

DETAILED DESCRIPTION OF THE EMBODIMENTS

Although several embodiments, examples, and illustrations are disclosed below, it will be understood by those of ordinary skill in the art that the invention described herein extends beyond the specifically disclosed embodiments, examples, and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described.

The disclosure herein provides systems, methods, and devices for generation of payment instruments, and in some embodiments, more specifically, generation of debit cards for distribution to a plurality of recipients. Utilizing debit cards to distribute payments to recipients can have various advantages. For example, when a recurring payment needs to go to a recipient, a debit card can be created once for that recipient. Then a payment distribution system can be configured to make recurring deposits into a bank account associated with that recipient and/or debit card. However, a system configured to generate and distribute large numbers of debit cards to recipients requires a methods and devices for efficiently producing and managing those debit cards.

Figure 1A:
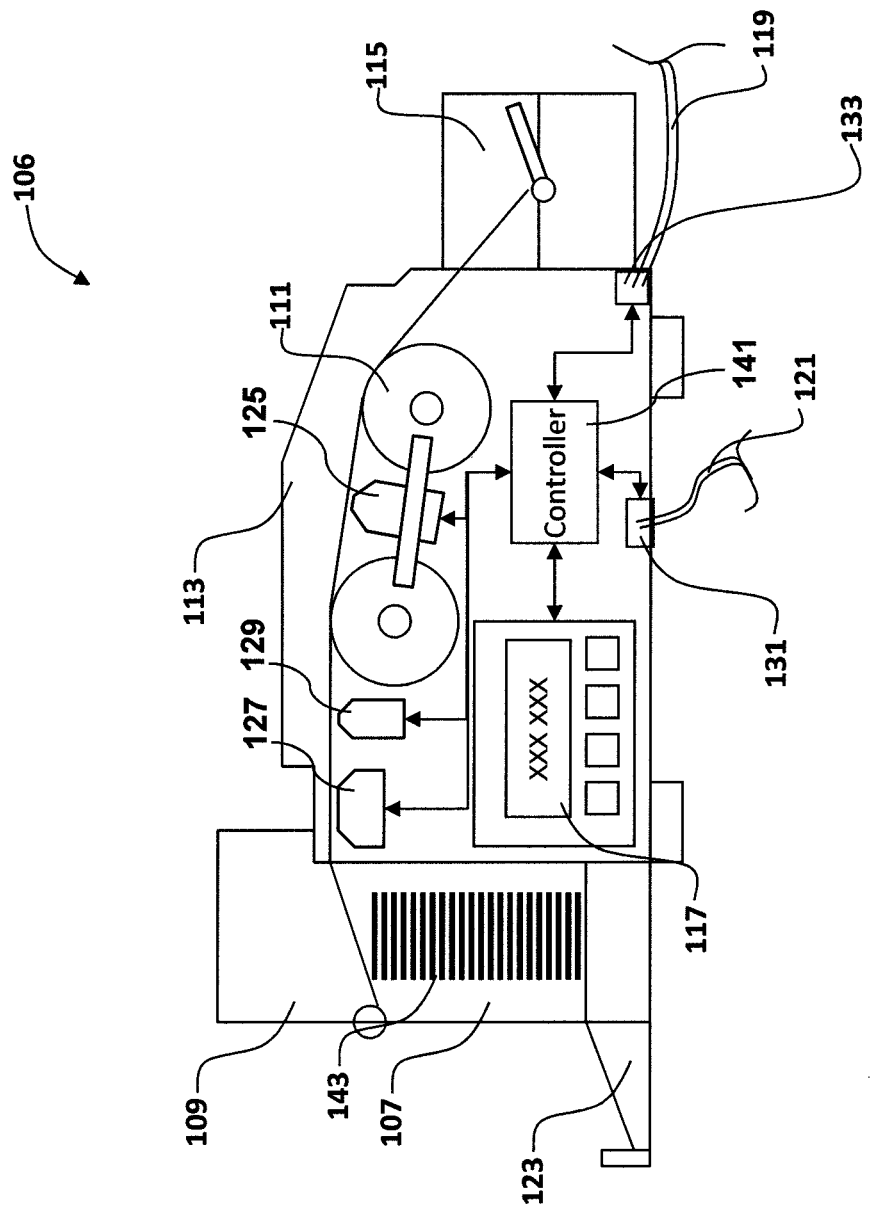
FIG. 1A is a side view of an embodiment of a debit card printer.
Figure 1B:
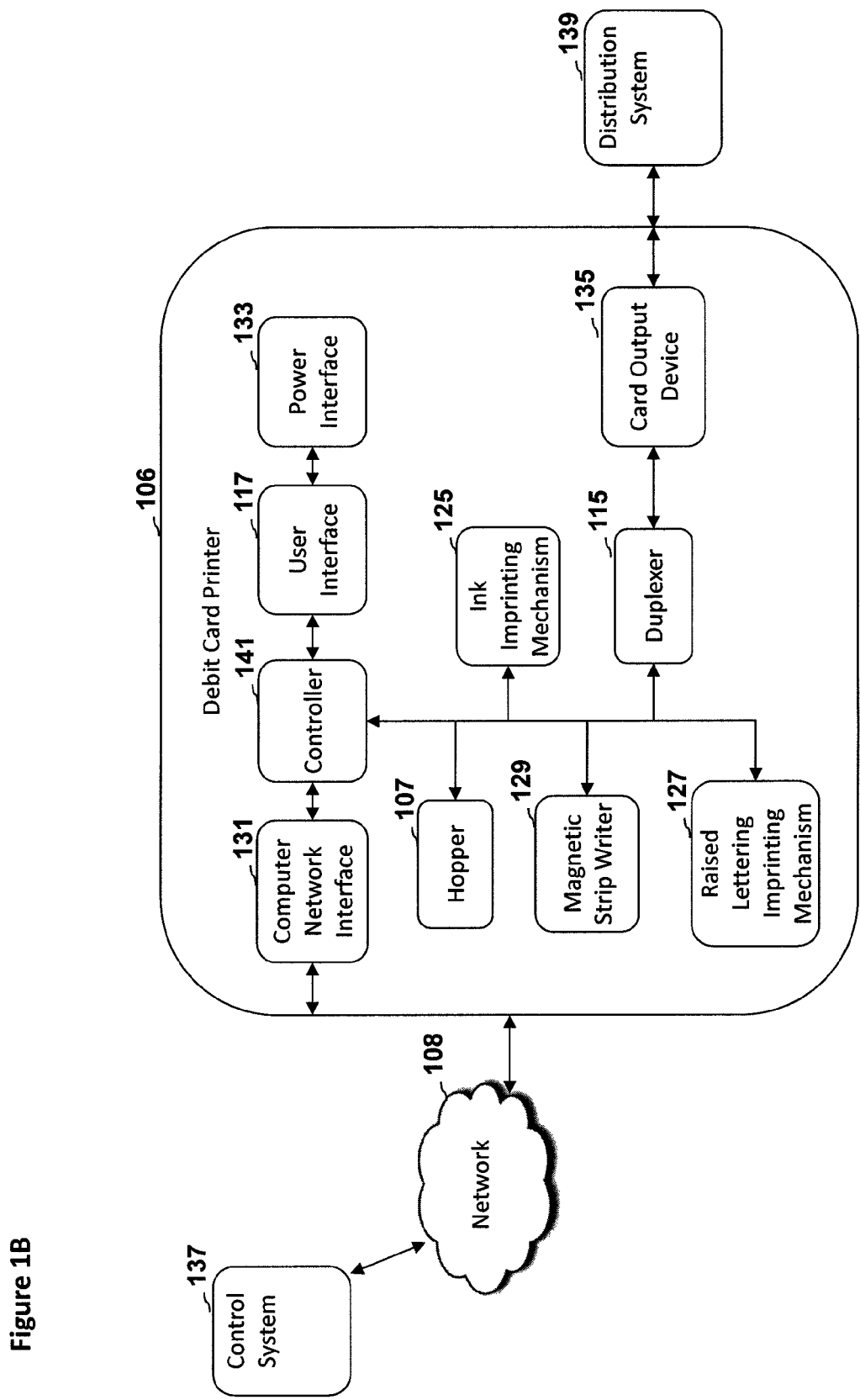
FIG. 1B is an embodiment of a schematic diagram illustrating the debit card printer of FIG. 1A.

In one embodiment, a debit card printer device is configured to be connected to a computer network to communicate with a control system. The control system can be configured to transmit instructions to the network-enabled debit card printer to enable the debit card printer to print a plurality of debit cards for a plurality of recipients. For example, referring to FIGS. 1A and 1B, FIG. 1A shows a side view of an embodiment of a debit card printer 106. FIG. 1B is an embodiment of a schematic diagram illustrating the debit card printer 106 of FIG. 1A. The network-enabled debit card printer 106 comprises a main body 113 supporting a user interface 117, a ribbon assembly 111, a duplexer 115, a hopper 107, a raised lettering imprinting mechanism 127, a magnetic strip writer 129, an ink imprinting mechanism 125, a controller 141, and an output tray 123. The debit card printer 106 further comprises a computer network interface 131 configured to connect to an Ethernet cable 121 and a power interface 133 configured to connect to a power cable 119. In operation, the hopper 107 can be filled with blank debit cards by opening the hinged lid 109 and inserting a stack of blank debit cards 143.

In various embodiments, the hopper 107 can be configured to hold various numbers of blank debit cards, such as 50, 100, 200, and/or the like.

The user interface 117 can be used to setup or configure the debit card printer 106 by, among other things, adjusting various configuration settings. For example, the user interface 117 can be used to configure whether the debit card printer 106 will offer duplexing of cards or printing on only one side of cards, whether the debit card printer 106 will write information to a magnetic strip or, such as in an instance where blank debit cards already come with information prewritten into the magnetic strip, whether the debit card printer 106 may not write information to the magnetic strip for some debit cards. Further, the user interface 117 can be used to configure the debit card printer 106 to determine the type of lettering imprinted onto a blank debit card. For example, the debit card printer 106 can be configured to utilize the ink imprinting mechanism 125 to imprint text, such as a name or account number onto the debit card using ink. The debit card printer 106 can further be configured to imprint raised lettering, such as for an account number, using the raised lettering imprinting mechanism 127. The magnetic strip writer 129 can be configured to write and/or read magnetic strip information on a debit card. In some embodiments, the user interface 117 is not necessary, because the debit card printer 106 can further or alternatively be configured by a control system over the computer network.

In operation, a control system 137 can be configured to transmit debit card printing instructions over the network 108 to the debit card printer 106. The computer network interface 131 can be configured to receive these instructions and to pass at least a portion of them along to the controller 141. The controller 141 can be configured to then automatically instruct various components of the debit card printer 106 to create a debit card. For example, the controller 141 can instruct the hopper 107 to extract a blank debit card and pass it along to one or more mechanisms, such as the raised lettering imprinting mechanism 127, the magnetic strip writer 129, the imprinting mechanism 125, and/or the like to have information imprinted or encoded onto the debit card. In some embodiments, the duplexer 115 is used to flip a blank debit card to allow information to be imprinted onto a second side of the debit card. Once the debit card has been printed, a card output device 135 can be configured to eject the card into the output tray 123. A distribution system 139 can be configured to in some cases automatically retrieve the outputted debit cards and distribute them to recipients, such as via mail.

In some embodiments, various portions of the debit card printer 106 can be configured to be removable or replaceable. For example, the ribbon assembly 111 can be configured to be easily removed and replaced with a new ribbon when ink in the ribbon assembly 111 runs out. Further, the debit card printer 106 can be configured to enable blank debit cards to be loaded into the hopper 107 while the debit card printer 106 is operating, without stopping the operation of the debit card printer 106. In some embodiments, the debit card printer 106 is configured to only print on one side of a debit card. In other embodiments, the debit card printer 106 is configured to utilize the duplexer 115 to enable printing on both sides of a debit card.

The debit card printer 106 can be used as a portion of a payment generation system, such as the payment generation system 100 illustrated in FIG. 1C and described in greater detail below.

The debit card printer 106 can be configured to be used as a single card feeder and/or a multiple card feeder and can print on blank or personalized plastic cards. Card dimensions are generally 85.60×53.98 mm, standardized by ISO/IEC 7810 as ID-1. This is a similar format as used with various other plastic cards, such as telephone cards, driver's licenses, credit cards, and/or the like.

Various processes can be utilized to print debit cards. In some embodiments, a plastic card passes through a thermal print head concurrently with a color ribbon. The color from the color ribbon can be transferred to the plastic card to imprint text and graphics. Various processes for printing text or graphics on a card can be used, including, but not limited to, thermal transfer, dye sublimation, reverse image technology, and/or thermal rewrite print process. In addition to printing text, debit card printers can also read and encode information into magnetic strips and or RFID chips.

The disclosure herein further provides systems, methods, and devices for generation of payment instruments, and more specifically printing and distribution of physical payment instruments to a plurality of recipients. Many businesses require distribution of large numbers of payments to large pools of recipients. For example, companies that manage retirement plans, pension plans, and/or the like, often have hundreds or thousands or tens of thousands of recipients that need to receive funds from their associated plan. The business operating the plan, such as a plan sponsor or third-party administrator, is charged with managing the plan or fund to make sure it is invested properly and is growing or making money for the beneficiaries of the plan. Managing such a plan to make sure that it is invested properly and makes money for the beneficiaries or recipients, can be a complicated and difficult job. Adding on top of that responsibility the responsibility of making thousands of payment distributions to the recipients or beneficiaries of the plan can be complicated and tedious and take the company's focus away from their primary responsibility of managing the plan's investments.

Various issues can arise in processing payments or payment instruments for distribution to large numbers of recipients. For example, recipients can move or change their address without informing the plan sponsor. When a payment instrument is mailed to that person the payment instrument may be returned and then it is the responsibility of the plan sponsor or administrator to get the payment to the person whose address they no longer know. Further, even if a recipient receives a payment instrument, for example a check, some recipients may lose the check, forget to cash or deposit the check, or for whatever other reason not present the check for payment. In such a situation, the entity managing the fund from which the payment was distributed then may have the responsibility of determining what to do with the uncashed or stale funds that have been earmarked for the recipient but have not yet been transferred to the recipient.

The systems, methods, and devices described herein solve all of the problems described above, in addition to numerous other problems. In some embodiments, a system is configured to assign a unique identifier to each recipient and to associate that unique identifier with various items to enable automatic processing of various issues that may arise during processing of a payment or after processing of the payment. For example, a recipient identifier may be associated with a batch of payments, a specific benefits plan, a specific company, a specific bank account linked to that recipient's debit card, one or more specific checks or other payment instruments that have been sent to that recipient, and various other items. One example of when such a unique identifier can be useful is that, if a mailing of a payment instrument is returned as undeliverable, the system can be configured to automatically query an identity or address verification database, notify a plan sponsor of the returned mailing, cancel the check or debit card associated with that mailing, re-send the mailing to a current address, and/or the like, all based on receipt of a return mailing having the unique recipient identifier.

In one embodiment, a payment generation system is configured to process a batch of payment distributions based on recipient information received from an administrator of a plan and a lump sum of funds received from the administrator. For example, a system can be configured to enable a user, such as a retirement plan administrator, to login to a website and upload a list of recipients along with an amount of money or funds each recipient is to receive. The payment generation system can generate a unique identifier associated with that batch of distributions and inform the user of that unique identifier. The user can then deposit an amount of funds equal to the total of the batch payment distribution into a bank using the batch identifier. The payment generation system can then link the deposit of funds to the batch of payments using the batch identifier. The payment generation system can be configured to then, for each recipient in the batch, print a payment instrument, such as a check or debit card, and mail that payment instrument to the recipients.

In some embodiments, the system is configured to inform the user of the batch identifier and then wait for a notification that the funds associated with that batch identifier have been deposited. In other embodiments, the system is configured to enable the user to process a deposit of the funds using the same user interface or website the user used to start the batch distribution process. For example, the website can be configured to, during the same session, receive batch distribution information and manage a deposit of funds to be used for the batch distribution.

In some embodiments, in addition to printing and distributing batches of payment instruments, a payment generation system can be configured to automatically deal with numerous issues that may arise after the mailing of such payment instruments. For example, when the payment instrument is a check, the payment generation system can be configured to ensure sufficient funds to cover that check are maintained in an associated bank account. However, if the check is not cashed or deposited by the recipient within a certain amount of time, the payment generation system can be configured to make sure the funds earmarked for that recipient do not sit as stale funds in a non-interest-bearing account. For example, in some embodiments, a system can be configured to automatically open an interest-bearing account on behalf of the recipient and transfer the funds earmarked for that recipient into the interest-bearing account. The interest-bearing account may be, for example, an individual retirement account (IRA).

Similarly, when a debit card is the payment instrument, the payment generation system can be configured to allow a predetermined amount of time for the recipient to activate the debit card. The system can be configured to not fund a bank account associated with the debit card with the recipient's money until the recipient activates the debit card. When the recipient activates the debit card, the payment generation system can be configured to immediately and automatically transfer the funds earmarked for that recipient from one bank account into another bank account linked to the debit card. On the other hand, when a user does not activate the debit card within the predetermined amount of time, the system can be configured to create an alternate account, such as an interest-bearing default IRA, and to transfer the funds earmarked for that recipient into this interest-bearing account.

Such a system can be very helpful in protecting the interests of recipients of distributions from retirement plans, pension plans, and/or the like. Without such a payment generation system, if the recipient is not able to be found or otherwise does not cash his or her check or activate his or her debit card, the funds earmarked for that recipient may otherwise sit in a non-interest-bearing account and the recipient will end up losing money through inflation. Further, in other instances, the institution that owes the funds to the recipient may keep those funds in an interest-bearing account but may keep the interest for itself rather than giving the interest to the recipient. By using a payment generation system as described herein, if a recipient cannot be found or is otherwise unresponsive, the system can automatically protect that recipient's interests by creating default accounts on behalf of the recipient that will act to grow the funds for the recipient until the recipient is found or otherwise claims his or her funds.

In addition to protecting the interests of a recipient that cannot be found or is otherwise unresponsive, systems as described herein can also be configured to automatically find a recipient that initially was not responsive. For example, a payment generation system can be configured to, upon receiving a returned mailing, automatically query a third-party identity verification system to determine whether there may be a better or more current address for the recipient. The system can then be configured to automatically re-mail the payment instrument (or a new payment instrument) to the better or more current address. In another example, the system may be configured to query the identity verification system and discover the recipient is deceased. In that case, the system can also be configured to automatically handle an appropriate processing of the funds on behalf of the deceased recipient's estate, instead of just letting the funds sit until a representative of the estate comes looking for them.

A further complication with processing large numbers of distributions from heavily regulated plans, such as many retirement plans and pension plans, is that numerous regulations and laws must be complied with. As one example, many distributions from retirement plans are taxable and require the distributing party to withhold taxes on behalf of the recipient. A payment generation system as disclosed herein can be configured to automatically withhold the appropriate taxes from a distribution prior to distributing the funds in a payment instrument to the recipient. Further, the system can be configured to track the withholdings for each recipient to enable rolling back the tax withholdings in the event that the recipient cannot be found or otherwise does not accept the distribution or cash the check, and/or the like. For example, if a distribution check is sent to a recipient and taxes have been withheld from the amount of the check, but the recipient never cashes the check, the recipient may not actually owe those taxes. Accordingly, the payment generation system can be configured to restore the withheld taxes to the recipient's funds and then to put the entire funds, with the withheld taxes added back in, into, for example, a tax-deferred individual retirement account.

As another example, some regulations require that a certain legal document be signed and mailed to the company distributing the funds prior to any distributions. A payment generation system as described herein can be configured to automatically analyze the specific situation of each recipient in a batch determine whether such a regulation applies. When the system determines that such a regulation complies, the system can be configured to automatically generate a request to have the recipient sign and mail in that document before the system will allow creation of a check or debit card or other payment instrument for that recipient.

In some cases, distributions to recipients are recurring rather than one-time. For example, a recipient of pension funds may elect to receive a certain amount of money each and every month. A payment generation system as disclosed herein that is capable of automatically printing and managing debit cards can be ideal for such a situation. Instead of requiring a company to print and mail checks each and every month, and then worry about whether each check every month is cashed and what they need to do when it is not cashed, a system as described herein makes this process much simpler. The system can be configured to associate a unique identifier specific to each recipient with a unique bank account specific to that recipient and/or specific to that recipient's debit card. The system can then be configured to, each month, transfer an appropriate amount of funds for each recipient into the account linked with that recipients debit card.

As used herein, the term "payment instrument" is intended to mean any vehicle for distribution of a payment to a recipient. For example, a payment instrument may be a physical object such as a check, debit card, gift card, and/or the like. In some embodiments, a payment instrument may not be a physical object. For example, a payment instrument may comprise a code that can be used to access funds stored in a bank account. A payment instrument may in some embodiments be a wire transfer, an ACH transfer, a transfer to an electronic payment system such as the electronic payment system provided by PayPal®, and/or the like.

Payment Generation Systems

Figure 1C:
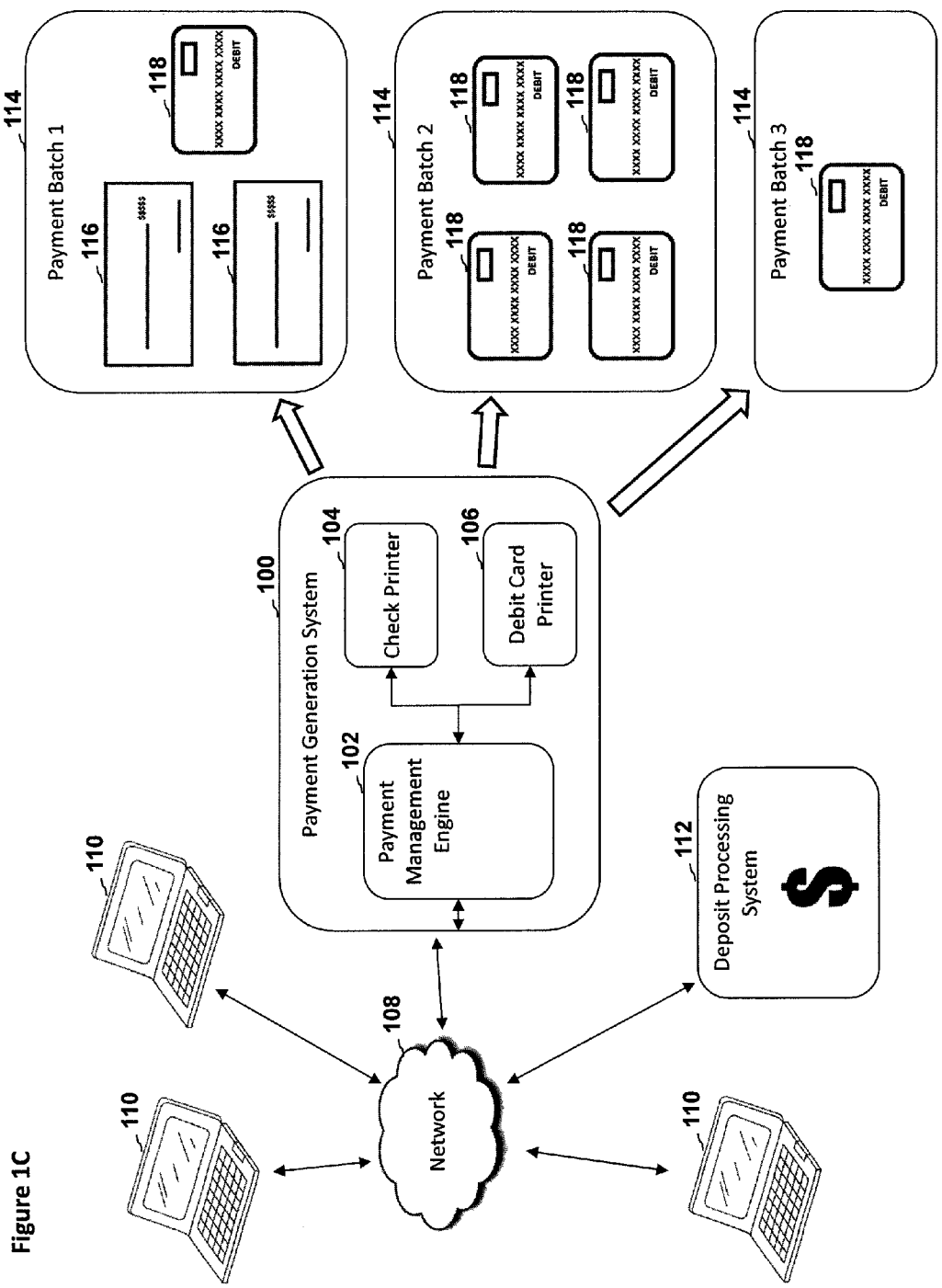
FIG. 1C is an embodiment of a schematic diagram illustrating a payment generation system communicating with user access point systems to generate batches of payment instruments.

FIG. 1C is an embodiment of a schematic diagram illustrating a payment generation system 100 communicating with user access point systems 110 and a deposit processing system 112 to enable generation and distribution of batches of payments. This figure illustrates an example of a payment generation system 100 receiving instructions from various users of the user access point systems 110 to enable the payment generation system 100 to print a plurality of checks and/or debit cards for mailing to recipients. The payment generation system 100 communicates electronically with the various user access point systems 110 and the deposit processing systems 112 through the network 108. The network 108 can be any type of electronic computer network, such as a wide area network, a local area network, wireless Internet, Ethernet, a Bluetooth network, a cellular network, and various other types of electronic communication networks. In some embodiments, the computer network comprises a direct connection between computing devices, such as by using a serial cable, parallel cable, USB cable, wireless equivalents, and/or the like.

The user access point systems 110 can be, for example, computer hardware having a user interface enabling a user to interact with the payment generation system 100. For example, a user access point system 110 may enable an administrator of a retirement plan to view a rendering of a website provided by the payment generation system 100 and to interact with that website to generate instructions for a payment batch.

The payment generation system 100 comprises a payment management engine 102, a check printer 104, and a debit card printer 106. The payment management engine 102 can be configured to electronically communicate with the user access point systems 110 to receive batch payment instructions, to process those instructions, and to provide electronic instructions to the check printer 104 and/or debit card printer 106 to enable automatic printing or creation of checks and/or debit cards. In processing payment batches, the payment management engine 102 can further be configured to communicate with one or more deposit processing systems 112 to receive notification of deposits by the users and to transfer portions of those deposited funds to accounts associated with debit cards and/or checks that are created and sent to recipients.

FIG. 1C also illustrates three examples of payment batches 114 that can be generated by the payment generation system 100. For example, the first payment batch 114 comprises two checks 116 and a debit card 118. Payment batch 2 comprises 4 debit cards 118. Payment batch 3 comprises a single debit card 118. These three example batches illustrate that a payment batch can comprise any number of payment instruments in any combination and can even be just a single payment instrument to a single recipient. Further, although these payment batches only illustrate up to four payment instruments in a single batch, a single batch can include hundreds or even thousands of payment instruments in the single batch.

As an example process flow of a payment generation process by the system illustrated in FIG. 1C, a user, such as an administrator of a pension plan, can utilize a user access point system 110 to access the payment generation system 100. The payment generation system 100 can present the user with a website interface that enables the user to create instructions for a batch of payment instruments. For example, the user will enter recipient's identification information and an amount of money or funds to be distributed to each recipient. The recipient identification information may be as simple as a recipient name or may comprise a variety of information, such as, recipient name, address, Social Security number, date of birth, and/or various other types of recipient information.

Once the user has initiated creation of a batch, the payment management engine 102 can be configured to generate a unique identifier specific to that batch and communicate that batch identifier to the user access point system 110 for communication to the user. The payment management engine 102 can also be configured to total up all of the recipient payments to generate a total batch payment amount and transmit that information also to the user access point system 110 for communication to the user. The user can then make a deposit into a bank, such as the deposit processing system 112, of the total batch amount and include the batch identifier with the deposit. Unless issues arise during the payment generation process that require the input of the user, this in some embodiments ends the requirements of the user in generating this batch of payments. The payment generation system 100 can be configured to automatically complete the rest of the distribution process. Accordingly, it can be seen how such a payment generation system 100 has offloaded enormous responsibility from the user in distribution of this plurality of payment instruments. All the user was required to do was provide, at a minimum, a list of who should receive money and how much money each one should receive. The payment generation system 100 then takes over the rest of the process, once the user has simply deposited a single deposit into a bank account that will cover the plurality of distributions.

Once the user has deposited the funds to fund this batch into the deposit processing system 112, the deposit processing system 112 notifies the payment generation system 100 of the deposit and the associated identifier. The payment management engine 102 can be configured to match the identifier received from the deposit processing system 112 with its stored unique batch identifier to determine what batch those funds are earmarked for. Once the payment management engine 102 confirms the appropriate amount of funds for this batch have been deposited, the payment management engine 112 performs any required regulation or rule compliance verifications, any user identity or address verification determinations, and begins generating payment instruments for distribution to the batch's recipients. For example, if this batch is payment batch 1 shown in FIG. 1C, there are three recipients, with two needing checks and one needing a debit card. Accordingly, the payment management engine is configured to communicate electronically with the check printer 104 to provide instructions to automatically print two checks 116. Further, the payment management engine 102 electronically communicates with the debit card printer 106 to automatically print one debit card 118.

The payment management engine 102 can further be configured to assign a unique identifier to each recipient in the batch and to associate that identifier with the printed checks, the printed debit card, and any bank accounts linked to those checks or debit cards. By storing associations of the recipient identifier with any related checks, debit cards, accounts, and/or the like, the payment generation system 100 can be configured to automatically deal with any issues that arise after mailing out the debit card and/or check.

Figure 2A:
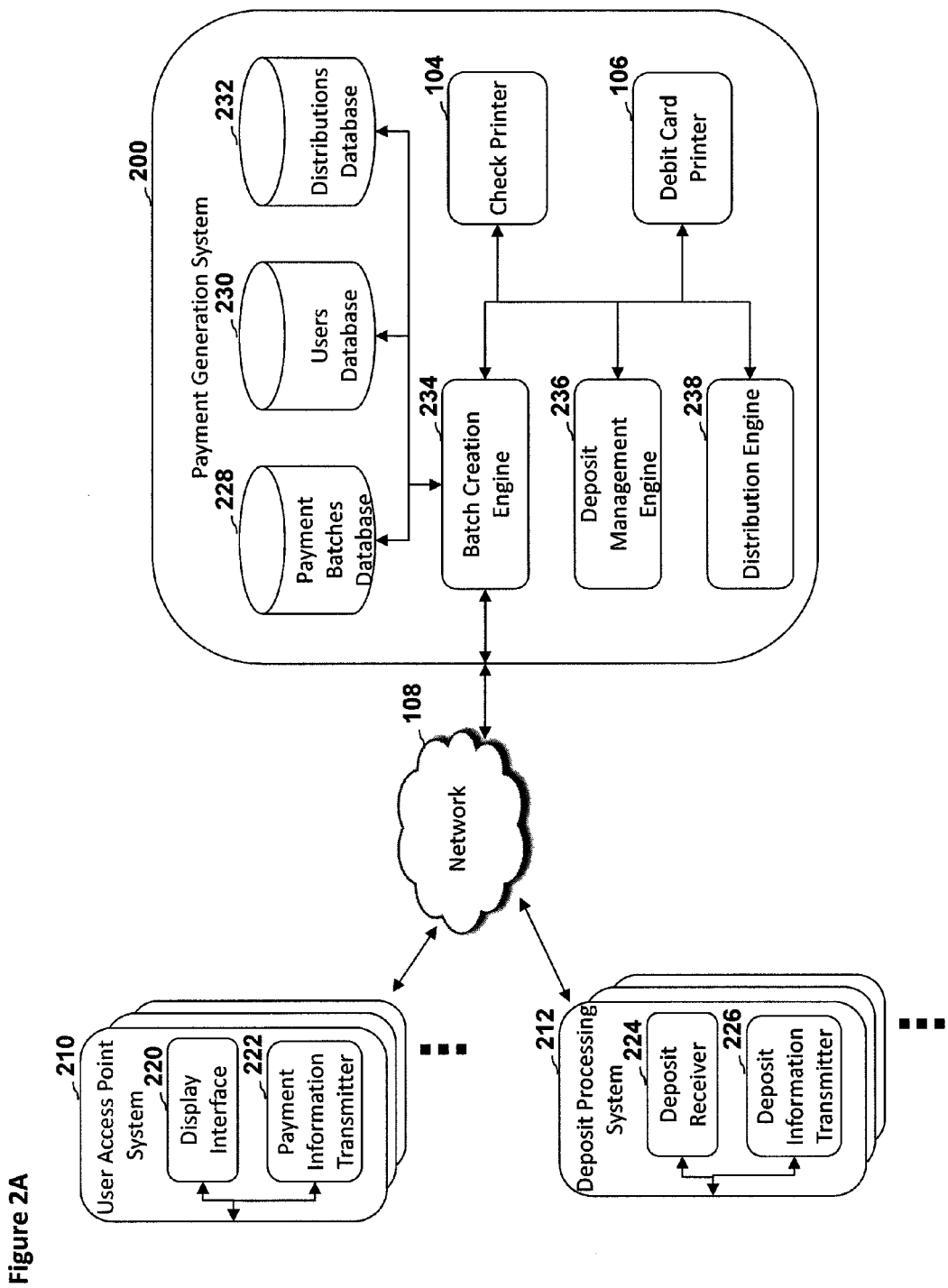
FIG. 2A is a block diagram depicting an embodiment of a payment generation system in communication with one or more other systems.

FIG. 2A is a block diagram depicting an embodiment of a payment generation system 200 in communication with one or more other systems. In this embodiment, the payment generation system 200 is in communication with a plurality of user access point systems 210 and a plurality of deposit processing systems 212 through the electronic network 108. The user access point systems 210 can be similar to the user access point systems 110 illustrated in FIG. 1C. The user access point systems 210 comprise a display interface 220 and a payment information transmitter 222. The display interface 220 can be configured to, for example, display information received from the payment generation system 200 to a user of the user access point system 210 and to enable the user to input information related to a batch of payment instruments. The payment information transmitter 220 can be configured to compile any information from the user and electronically transmit that information through the network 108 to the payment generation system 200 for creation of a batch of payment instruments.

The plurality of deposit processing systems 212 comprise a deposit receiver 224 and a deposit information transmitter 226. The deposit receiver 224 can be configured to receive deposits from users. For example, the deposit receiver 224 can be configured to received ACH deposits, wire transfers, manual check deposits, and/or the like. The deposit information transmitter 226 can be configured to electronically transmit information through the network 108 to the payment generation system 200 to inform the payment generation system 200 when a deposit has been received. In some embodiments, the deposit receiver 224 is further configured to receive a deposit identifier from the user, such as the batch identifier provided to the user from the payment generation system. The deposit information transmitter 226 can be configured to include that deposit identifier with any other information it sends to the payment generation system 200, to enable the payment generation system 200 to link the deposit with a specific batch.

The payment generation system 200 comprises a payment batches database 228, a users database 230, and a distributions database 232. The payment generation system 200 further comprises a batch creation engine 234, a deposit management engine 236, a distribution engine 238, a check printer 104, and a debit card printer 106. The payment batches database 228 can be configured to store information related to pending and completed batches of payment instruments. For example, the payment batches database 228 can be configured to store unique batch identifiers, recipient information and/or unique identifiers of recipients associated with each batch, amounts of funds to be sent to each recipient in a batch, and/or the like.

The users database 230 can be configured to store information related to various users of the payment generation system 200. The various users of the payment generation information system 200 can comprise at least a few different types of users. For example, the users database 230 can be configured to store information related to administrators or other managers of plans or funds that require distribution to recipients, the database can store information related to the recipients themselves, and the database can further be configured to store information related to administrators of the payment generation system 200.

The distributions database 232 can be configured to store information related to each individual distribution or payment instrument. For example, the distributions database 232 can be configured to store information for each individual payment instrument, such as, payment amount, date sent, recipient it was sent to, address it was sent to, whether the payment was returned, whether the payment has been cashed or otherwise deposited or cleared, what plan the distribution is associated with, and/or the like. The information stored in the distributions database 232 can be useful for various reasons. For example, the information can be useful for reporting reasons to enable reporting to retirement plan or pension plan administrators of information about the various distributions that have been made to the recipients of those plans. The distributions database 232 can also be useful to enable the payment generation system 200 to automatically respond to various issues that may arise in distribution of payments, such as, returned mailings, uncashed checks, stale funds, and/or the like.

The check printer 104 can be the same as the check printer 104 illustrated in FIG. 1C. The debit card printer 106 can be the same as the debit card printer 106 illustrated in FIGS. 1A-1C. The check printer 104 can be configured to receive instructions from the distribution engine 238 to print one or more checks for distribution to a recipient. The debit card printer 106 can be configured to take instructions from the distribution engine 238 to print a debit card for distribution to a recipient.

The batch creation engine 234, deposit management engine 236, and distribution engine 238 can be configured to perform functions similar to the payment management engine 102 illustrated in FIG. 1C. For example, the batch creation engine 234 can be configured to receive batch payment information from a user access point system 210 and to generate information to initiate creation of a batch of payment instruments. The deposit management engine 236 can be configured to monitor and/or receive notifications of deposits of funds. For example, the deposit management engine 236 can be configured to receive notifications from the deposit processing systems 212 that a deposit has been received and the deposit identifier associated with that deposit. The deposit management engine 236 can then be configured to compare the received deposit identifier to the unique batch identifiers stored in the payment batches database 228 to determine what payment batch the received deposit should be associated with. The deposit management engine 236 can further be configured to reconcile deposited funds to confirm an appropriate amount of funds has been deposited. For example, the deposit management engine 236 can compare a total batch payment amount stored in the payment batches database 228 with the amount of funds received to confirm sufficient funds were received. In some embodiments, the deposit management engine 236 can be confirmed to, when a deposit received associated with a specific batch is not large enough to cover the total batch payment amount, to either wait a certain amount of time for additional deposits associated with that batch identifier and/or to automatically send a notification to a user access point system 210 to notify the user that there is a discrepancy in the deposit received.

The distribution engine 238 can be configured to, once sufficient funds have been received, process a batch of payment instruments, such as by instructing the check printer 104 and/or debit card printer 106 to print the checks and/or debit cards. The distribution engine 238, in accomplishing this process, can be configured to perform several other tasks, such as assigning accounts to debit cards and/or checks, associating recipient unique identifiers with those accounts, automatic processing of returned checks or returned mailings, and/or the like.

Figure 2B:
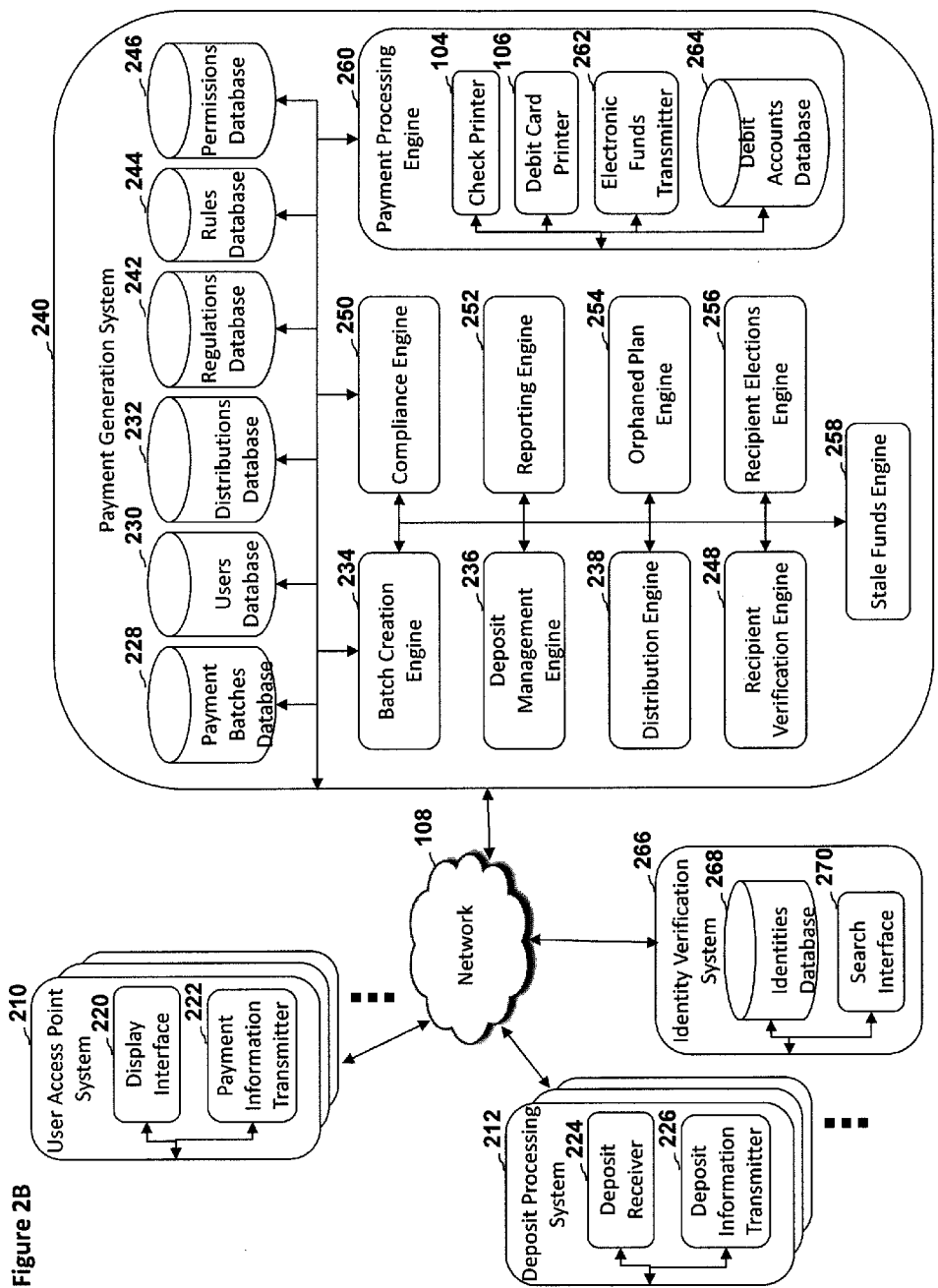
FIG. 2B is a block diagram depicting another embodiment of a payment generation system in communication with one or more other systems.

FIG. 2B is a block diagram depicting another embodiment of a payment generation system 240 in communication with one or more other systems. The payment generation system 240 illustrated in FIG. 2B is similar to the payment generation system 200 illustrated in FIG. 2A, but comprises various additional features. Further, the payment generation system 240 can further be configured to electronically communicate with an identification verification system 266. The identification verification system 266 comprises and identities database 268 and a search interface 270. The identity verification system 266 can be configured to enable a system such as the payment generation system 240 to submit queries to verify recipient identities, determine a current address for a recipient, and/or the like. For example, the identities database 268 can be configured to store information related to various individuals, and the search interface 270 can be configured to enable a payment generation system 240 to query the identities database 268. Although in this embodiment the identify verification system 266 is a system separate from the payment generation system 240, such as a third party system, in some embodiments, the payment generation system 240 incorporates the functionality of the identity verification system.

In addition to the elements of the payment generation system 200, the payment generation system 240 further comprises a regulations database 242, a rules database 244, and a permissions database 246. The regulations database 242 can be configured to store information related to laws and regulations that are applicable to various payment distribution processes. For example, one regulation may dictate that distributions from certain retirement plans require a signature of a recipient's spouse, and thus a distribution must not be made until a signature of the spouse is on file.

The rules database 244 can be configured to store various rules that may be applied within the payment generation system 240 during the processing of payment instrument creation or payment distribution but that may not necessarily be a government regulation or law. For example, a rule stored in the rules database 244 may be a rule promulgated by the user of the system, such as a third party administrator of a retirement plan, that that specific retirement plan requires certain reporting requirements before a check can be distributed or that certain identity verification is required before a check or debit card can be distributed.

The permissions database 246 can be configured to store information related to permissions of various users of the payment generation system 240. For example, the information related to various plans and distributions stored in the payment batches database 228, users database 230, and/or distributions database 232 can be set up in a hierarchical fashion to allow different users to see different data. For example, an individual recipient may be associated with permissions in the permissions database 240 that enable that recipient to only see information related to that recipient's retirement or benefits plan and distributions. On the other hand, a user of the payment generation system 240 may be an administrator of that recipient's retirement plan. In that case, the administrator user may have permissions stored in the permissions database 246 that enable the user to query and see details about the entire retirement plan and details about distributions for each recipient of that retirement plan. In some cases, an administrator user may handle a plurality of different retirement plans or other types of benefit plans using the payment generation system 240. In that case, permissions may be stored in the permissions database 246 that enable the administrator user to view each of the plans and each of the recipients and associated distributions associated with each plan.

In some embodiments, the permissions database 240 can be configured to provision access using user groups and/or various user account types. For example, three user groups may comprise third-party administrators (TPA's), plan sponsors, and administrators. A third-party administrator group may, for example, be configured to be able to access all of the third-party administrator's plans, including plans of any plan sponsors for which the third-party administrator is responsible. A plan sponsor group can be configured to access only distribution data managed by that plan sponsor. An administrator user group may, for example, be configured to be able to access any distributions or other data in the system. Examples of user account types are TPA administrator, TPA basic, TPA view only, plan sponsor administrator, plan sponsor basic, plan sponsor view only, and administrator. For example, a TPA administrator user can be configured to be able to perform any action regarding the third-party administrator's accounts until a distribution is processed. Once a distribution is processed, the number of actions the TPA administrator can perform on that distribution are limited. A TPA basic user, for example, can maintain a distribution record until it is processed. A TPA basic user cannot, however, create other user accounts. A TPA view only user can view the distributions of a TPA, but cannot edit. Similarly to the TPA user account types, a plan sponsor administrator user type can perform any action on that plan sponsor's information until the distribution is processed. A plan sponsor basic user can maintain distribution records until they are processed, but cannot create other plan sponsor users. A plan sponsor view only user can view the information related to a specific plan sponsor but cannot make changes. An administrator user can be configured to be able to access all distributions in the system, although may be limited in what the user can change after distributions are processed.

The payment generation system 240 comprises a payment processing engine 260 configured to generate various types of payment instruments. The payment processing engine 260 comprises the same check printer 104 and debit card printer 106 of the payment generation system illustrated in FIG. 2A. However, the payment processing engine 260 further comprises an electronic funds transmitter 262 and a debit accounts database 264. The electronic funds transmitter 262 can be configured to generate payment instruments and/or transmit electronic payments through, for example, wire transfer, ACH transfer, an electronic payment system such as the electronic payment system provided by PayPal®, and/or the like. The debit accounts database 264 can be configured to store information on the various bank accounts linked to debit cards that are printed by the debit card printer 106. The debit accounts database 264 can, in addition to storing information about the specific bank accounts, store information associating specific debit cards and specific recipients to the bank accounts. This can enable the distribution engine 238 to know what bank account to transfer money into to process a distribution to a specific recipient or debit card and what batch to transfer that money from.

Although various embodiments disclosed herein incorporate debit card and check printers into the system, in some embodiments, the payment generation system may be configured to transmit instructions to a third party debit card and/or check printing system to create debit cards and/or checks.

The recipient verification engine 248 can be configured to verify recipient identification and other recipient information. For example, the recipient verification engine 248 can be configured to query the identity verification system 266 to confirm spellings of users' names, whether a user has changed his or her name, a current address for a recipient, and/or the like. In some embodiments, the recipient verification engine 248 can be configured to only verify recipient identities and/or address information after a problem has occurred, such as a returned mailing or similar. In other embodiments, the recipient verification engine 248 can be configured to proactively verify or determine recipient information prior to processing a distribution. For example, the recipient verification engine 248 can be configured to query the identity verification system 266 using a recipient's Social Security number and to confirm that all other associated recipient information received from a user matches what is returned by the identity verification system 266. If the information does not match, the recipient verification engine 248 can be configured to automatically update the recipient information and/or to notify the user access point system 210 that there is an issue with the information to enable resolving the issue. In some embodiments, a user may not provide all information necessary to process a distribution for a recipient. In that case, the system may be configured to query the identity verification system to determine the additional information as needed.

The compliance engine 250 can be configured to make sure all applicable regulations, laws, and/or rules are adhered to prior to allowing a distribution or creation of a payment instrument. The compliance engine 250 can be configured to verify compliance at various stages in a payment generation or payment instrument generation process. For example, a user may provide batch payment instructions to the payment generation system 240 to initiate processing of a batch of payment instruments. The compliance engine 250 may at that point review the type of plan being distributed from, the way the user requests the distributions be sent, and/or the like to make sure any applicable laws, regulations, and rules are complied with. Then, further in the process, other regulations, laws, or rules may be applicable and may be checked at a later time. For example, in the processing of an individual recipient's payment instrument, the compliance engine 250 may check to see whether a signature from a spouse is required before a payment instrument can be issued. Further, the compliance engine 250 may check for each individual recipient whether taxes must be withheld and automatically determine how much taxes are withheld. At a third stage in the process, after payment instruments have already been distributed, the compliance engine 250 may make sure that any rules are complied with regarding, for example, a length of time that funds can go uncashed or unaccepted before something must happen to them. For example, an internal rule may dictate that any debit card not activated within 45 days of receipt must be canceled and funds that were earmarked for that debit card be transferred to an automatically generated default individual retirement account. Similarly, an internal rule may dictate that a check that goes uncashed for 90 days must be canceled and the money earmarked for that check must be transferred to a different account held on behalf of the recipient. The compliance engine 250 can be helpful to ensure automatically that all of these laws, regulations and rules are complied with.

The reporting engine 252 can be configured to generate reports for various users of the payment generation system 240. For example, the reporting engine 252 can be configured to generate a report for a recipient of all distributions that have been made to that recipient, the amounts of those distributions, what plan those distributions came from, and/or the like. The reporting engine 252 can also be configured to report on various levels, such as on the plan level to a plan level administrator, wherein the report includes information related to all distributions and recipients related to that plan.

The orphaned plan engine 254 can be configured to enable the system to process a plan, such as an IRS qualified plan that has been orphaned, meaning that the institution holding the money cannot locate the plan sponsor or plan trustee. Similarly, when a distribution or a payment instrument goes uncashed or unaccepted, the orphan plan engine 254 can be configured to automatically generate an alternate account, transfer the funds from the qualified plan to the alternate account, and terminate the qualified plan. The alternate account, such as a default IRA, can then be held on behalf of the beneficiary of the plan. Further functions of the orphaned plan engine 254 can be similar to as described below with reference to a QTA process or Qualified Termination Administrator module.

The recipient elections engine 256 can be configured to request that recipients elect how to receive distributions. The recipient election engine 256 can be configured to receive those elections and then instruct the distribution engine 238 as to how distributions should be made. For example, when an administrator user requests that funds be distributed to a recipient as part of a batch process, the payment generation system 240 may need to determine whether the funds should be distributed as a lump sum of money or as a rollover into a tax preferred account. Further, the payment generation system 240 may need to know how the user would like to receive a lump sum payment, such as via a check, debit card, electronic funds transfer, and/or the like. Accordingly, the recipient elections engine 256 can be configured to request this information from the recipients, receive the information from the recipients, and instruct the distribution engine 238 in how to handle the distribution.

The stale funds engine 258 can be configured to help in processing funds that have not been claimed or otherwise accepted by a recipient. For example, the stale funds engine 258 can be configured to, when a debit card is not activated within a predetermined amount of time, cancel the debit card, automatically open an individual retirement account on the recipient's behalf, and transfer any funds earmarked for that debit card into the default individual retirement account.

Although, in several embodiments, the stale funds engine 258 is described as handling stale funds from payment instruments distributed by the payment generation system 240, the stale funds engine 258 in some embodiments can also be configured to handle processing of stale funds that were not initially distributed the payment generation system 240. For example, a user of a user access point system 210 may be an administrator of a gift card plan for a retail store. The retail store may decide to cancel the gift card plan and yet may still have many outstanding gift cards with a balance left on them. If the retail store does not wish to deal with refunding all of those funds, it may engage the payment generation system 240 to deal with these stale funds. The stale funds engine 258 can be configured to, in combination with other components of the payment generation system 240, query the identification verification system 266 to determine current addresses of various owners of the gift cards, and to automatically send notifications to the various gift card holders or recipients that they have funds to be sent to them. The stale funds engine 258 can, upon receiving an election back from the recipients, instruct the distributions engine 238 to process a payment instrument to pay out the stale funds to the recipient. For recipients that do not respond, the stale funds engine 258 can be configured to automatically generate an alternate account to be managed on behalf of the recipient and to transfer the funds into that account.

Figure 2C:
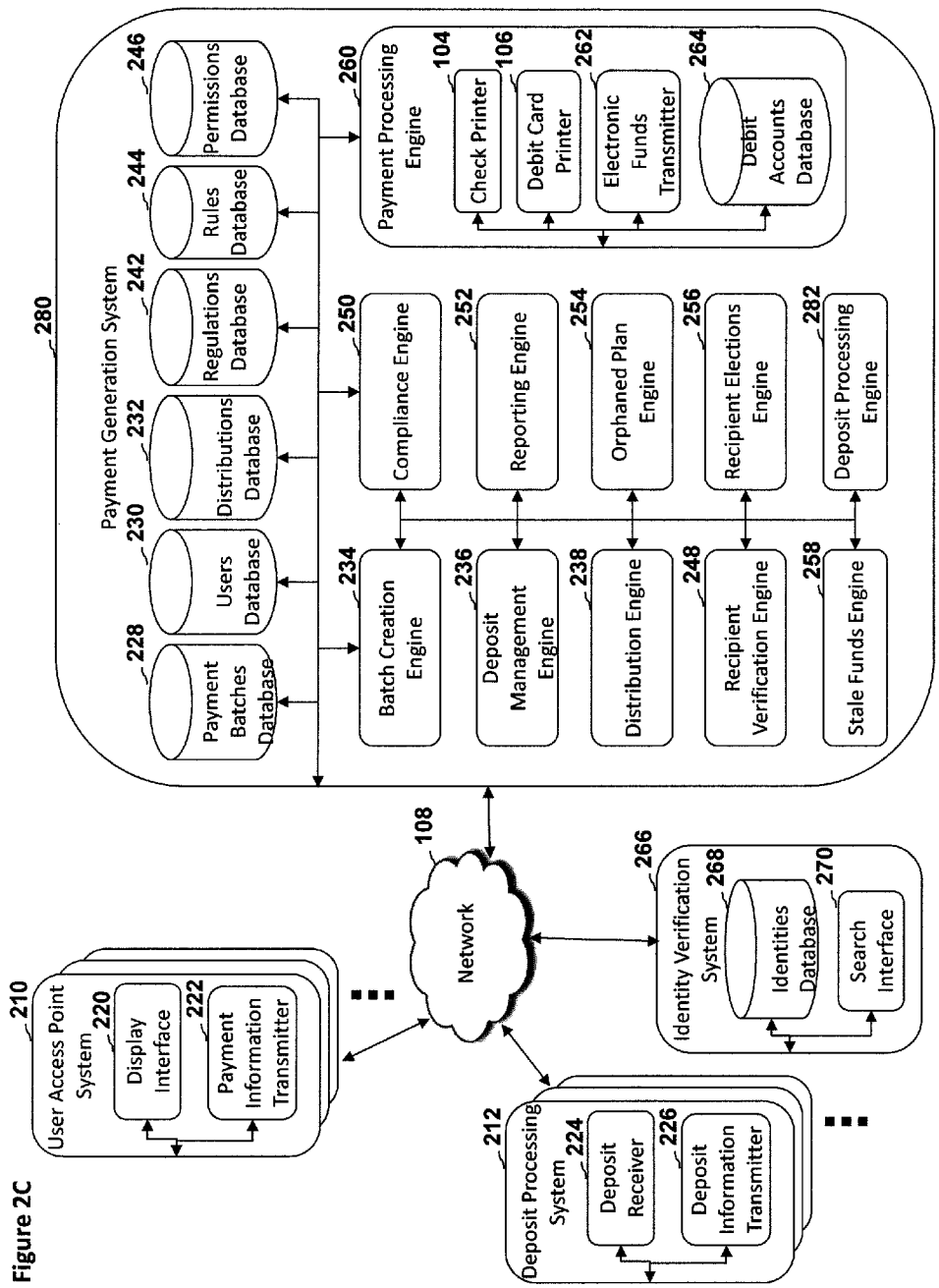
FIG. 2C is a block diagram depicting another embodiment of a payment generation system in communication with one or more other systems.

FIG. 2C is a block diagram depicting another embodiment of a payment generation system 280 in communication with one or more other systems. The payment generation system 280 depicted in FIG. 2C is similar to the payment generation system 240 illustrated in FIG. 2B. However, the payment generation system 280 further comprises a deposit processing engine 282. The deposit processing engine 282 can be configured to perform similar functions to the plurality of deposit processing systems 212. In a sense, the payment generation system 280 can act as its own bank. For example, when a user requests to have the payment generation system 280 process a batch of payment distributions, the payment generation system 280 can request that the lump sum of funds to be distributed to the plurality of recipients be transferred directly to the payment generation system 280 utilizing the deposit processing engine 282. In some embodiments, the payment generation system 280 is configured to utilize both the deposit processing engine 282 to receive deposits directly and to utilize one or more deposit processing systems 212 to merely receive notifications that funds have been deposited with the deposit processing system 212.

Creating and Managing Payment Instruments

Figure 3A:
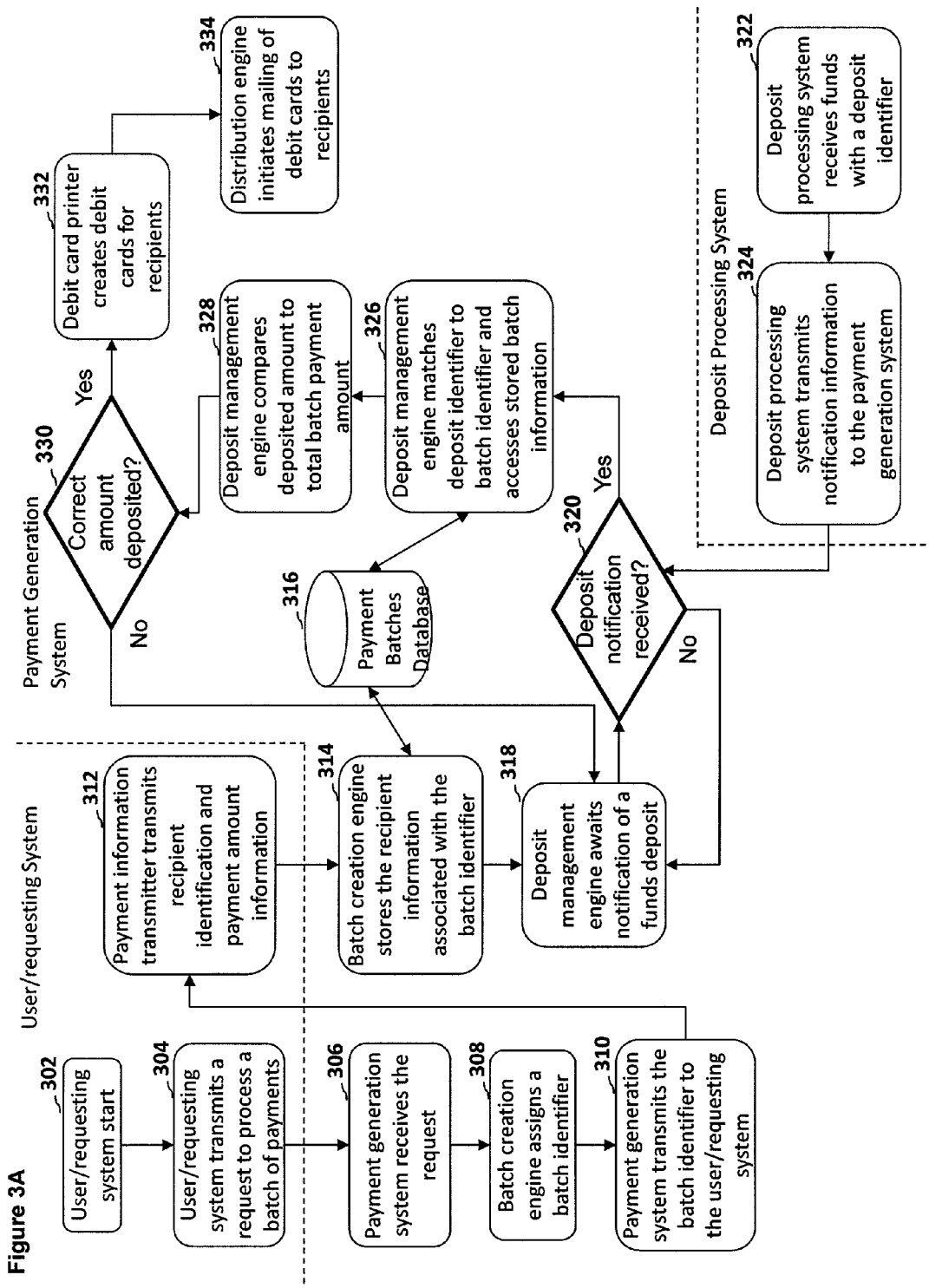
FIG. 3A depicts an embodiment of a process flow diagram illustrating an example of creating and distributing debit cards for a plurality of recipients.

FIG. 3A depicts an embodiment of a process flow diagram illustrating an example of creating and distributing debit cards for a plurality of recipients. The process flow illustrated in FIG. 3A can be performed by, for example, any of the payment generation systems illustrated in FIG. 1C and FIGS. 2A-2C. At block 302, a user or requesting system starts the process. For example, the user access point system 210 illustrated in FIG. 2A can start the process by a user utilizing the user access point system 210 to contact the payment generation system 200. At block 304, the user or requesting system transmits a request to process a batch of payments. For example, the user of the user access point system 210 can use the user access point system 210 to transmit a request to the payment generation system 200 that the user would like the payment generation system to generate payment instruments for a plurality of recipients based on one lump sum amount for the batch of payments.

At block 306, the payment generation system receives the request from the user or requesting system. At block 308, a batch creation engine assigns a batch identifier to this batch of payment instruments. For example, the batch creation engine 234 can be configured to generate a unique identifier specific to this batch and to store that batch identifier in the payment batches database 228.

At block 310, the payment generation system transmits the batch identifier to the user or requesting system. At block 312, the payment information transmitter of the user access point system transmits recipient identification and payment amount information to the payment generation system. For example, the recipient identification information may comprise in some embodiments a recipient name, Social Security number, date of birth, address, and/or the like for each recipient. The payment amount information may comprise, for example, an amount of money to be distributed to each recipient.

At block 314, the batch creation engine stores the recipient information in a payment batches database and associates the recipient information with the unique batch identifier. For example, the batch creation engine may store this information in the payment batches database shown at block 316, which may be the payment batches database 228 illustrated in FIG. 2A. At block 318, a deposit management engine awaits notification of a funds deposit. For example, the deposit management engine 236 illustrated in FIG. 2A can be configured to await a notification of a deposit from one of the deposit processing systems 212 illustrated in FIG. 2A.

At block 320, the process flow varies depending on whether a deposit notification has been received. If a deposit notification has not yet been received, the process flow proceeds back to block 318. At block 322, a deposit processing system receives funds and an associated deposit identifier. For example, the deposit receiver 224 illustrated in FIG. 2A may receive a monetary deposit from a user along with an associated deposit identifier. At block 324, the deposit processing system transmits notification information to the payment generation system. For example, the deposit information transmitter 226 can be configured to transmit a notification to the payment generation system that fund shave been received, the amount of funds received, and the associated deposit identifier.

Once the deposit notification has been received at block 320, the process flow proceeds to block 326. At block 326, the deposit management engine matches the deposit identifier to the unique batch identifier stored in the payment batches database and further accesses the stored batch information. For example, the deposit management engine is configured to look up the batch in the payment batches database based on the deposit identifier and to retrieve the recipient information received from the user requesting system. At block 328, the deposit management engine compares the deposited amount to the total batch payment amount. For example, the deposit management engine can be configured to total up the various payments requested in this batch to determine a total batch payment amount. The deposit management engine can then be configured to compare that total batch payment amount to the amount that was deposited. If the amount deposited matches the total batch payment amount, the process flow proceeds to block 332. At block 332, a debit card printer prints or creates a debit card for each recipient. At block 334, a distribution engine initiates mailing of the debit cards to the recipients. For example, the distribution engine 238 illustrated in FIG. 2A can be configured to begin a process that puts the debit cards in envelopes and mails them to the recipients.

Returning to block 330, if the amount deposited does not match the total batch payment amount, the process flow can return to block 318, wherein the deposit management engine awaits notification of another funds deposit. In some embodiments, the payment generation system can be configured to merely wait until sufficient funds to match the total batch payment amount have been received. For example, a user may deposit the total batch payment amount spread out over multiple deposits. In another embodiment, the payment generation system can be configured to notify the user that a discrepancy has occurred in the deposit amount and the total batch payment amount.

Figure 3B:
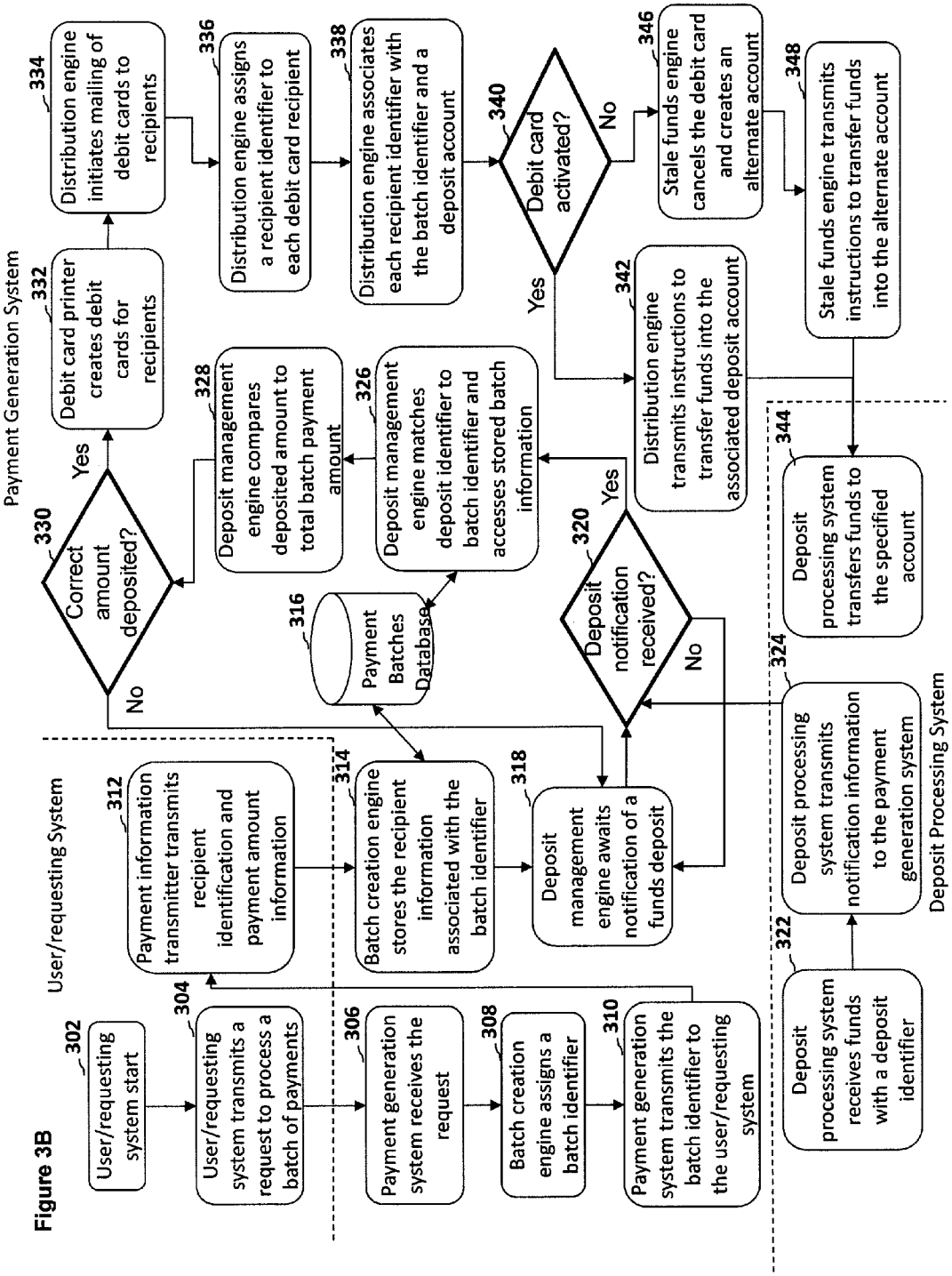
FIG. 3B depicts an embodiment of a process flow diagram illustrating an example of creating and funding debit cards.

FIG. 3B depicts an embodiment of a process flow diagram illustrating an example of creating and funding debit cards. The process flow illustrated in FIG. 3B is similar to the process flow illustrated in FIG. 3A for blocks 302-334. However, the process differs after block 334. At block 336, the distribution engine assigns a recipient identifier to each debit card recipient. The recipient identifier can be a unique identifier that uniquely identifies each recipient of a debit card. The recipient identifier can be stored in, for example, the users database 230 and/or various other databases. At block 338, the distribution engine associates each recipient identifier with the batch identifier and a deposit account. This can enable the system to know which batch this recipient is associated with and what deposit account linked to that recipient's debit card to fund.

At block 340, the process flow varies depending on whether a recipient's debit card has been activated. In some embodiments, the process flow varies depending on whether the debit card has been activated within a predetermined amount of time. For example, when the debit card is mailed to the recipient, it may come along with a letter that indicates the debit card must be activated within 45 days. If the debit card is activated or if the debit card is activated within the predetermined amount of time, the process flow continues to block 342. At block 342, the distribution engine transmits instructions to transfer funds into the associated deposit account. For example, the distribution engine can be configured to, for an individual debit card, look up in a database what recipient identifier is associated with that debit card, and/or look up what deposit account is linked to that debit card. The distribution engine can then transmit instructions to, for example, a deposit processing system 212 to transfer a portion of the funds received for this batch equal to the recipient payment amount into the associated deposit account that is associated with the debit card. At block 344, the deposit processing system then transfers the funds to the specified account based on the instructions from the distribution engine.

Returning to block 340, if the debit card is not activated, or if it is not activated within the predetermined amount of time, the process flow proceeds to block 346. At block 346, a stale funds engine cancels the debit card and creates an alternate account. For example, the stale funds engine 258 illustrated in FIG. 2B can be configured to cancel the debit card so that it may not be used, and to automatically cause the creation of an alternate account, such as a default IRA, or other interest bearing or tax deferred account. Such an account can be created to make sure the funds that are earmarked for this recipient will be held and make interest on behalf of the recipient until such time the recipient claims the funds.

At block 348, the stale funds engine transmits instructions to transmit the funds into the alternative account. Finally, at block 344, the deposit processing system transfers the funds to the specified account based on the instructions received from the stale funds engine.

Figure 3C:
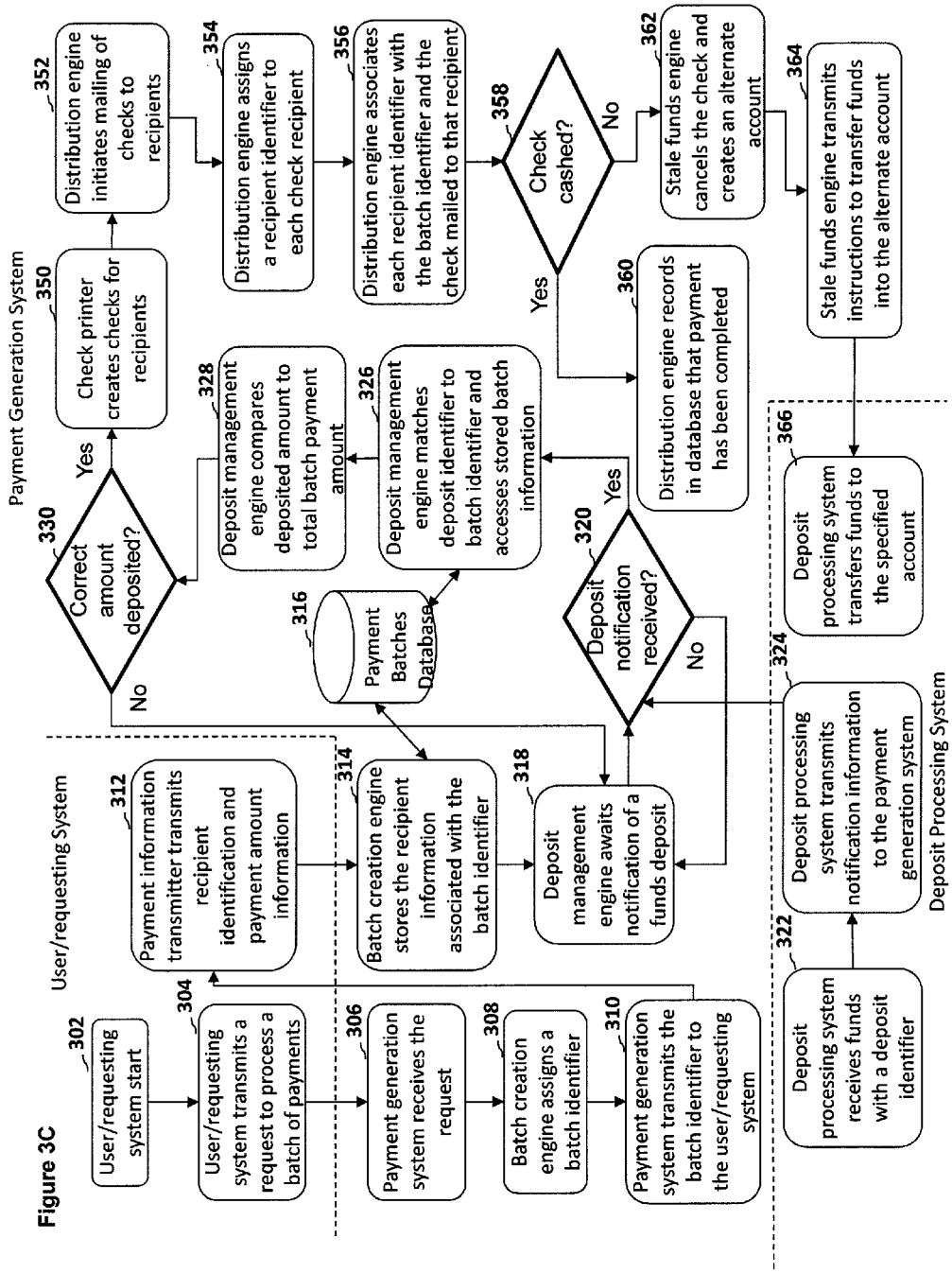
FIG. 3C depicts an embodiment of a process flow diagram illustrating an example of creating and distributing checks for a plurality of recipients.

FIG. 3C depicts an embodiment of a process flow diagram illustrating an example of creating and distributing checks for a plurality of recipients. The process flow illustrated in FIG. 3C is similar to a process flow illustrated in FIG. 3B. However, the process flow illustrated in FIG. 3C is for distribution and printing of checks instead of debit cards. Although one of these process flows deals with debit cards and the other deals with checks, in various embodiments, a payment generation system can be configured to use these concepts for batches that have a combination of checks, debit cards, and/or various types of payment instruments. The process flow illustrated in FIG. 3C is the same as in FIG. 3B from blocks 302-330.

At block 350, once the correct amount of funds to process a batch of payment instruments has been deposited, a check printer creates checks for the recipients. For example, the check printer 104 illustrated in FIG. 2B can be configured to print a plurality of checks based on the recipient information received at block 314. At block 352, the distribution engine initiates mailing of the checks to the recipients. At block 354, the distribution engine assigns a recipient identifier to each check recipient. At block 356, the distribution engine associates each recipient identifier with the batch identifier and the check mailed to that recipient. This can be helpful to enable automatic processing of any issues that occur, such as a returned check.

At block 358, the process flow varies depending on whether the check is cashed or whether the check is cashed within a predetermined amount of time. For example, when the checks are mailed to each recipient, they may be mailed along with a letter that states the check must be cashed or otherwise presented for payment within 90 days. If the check is cashed within the amount of time, the process flow proceeds to block 360. At block 360, the distribution engine records in a database that the payment has been completed. For example, the distribution engine can be configured to record in the distributions database 232 that this distribution transaction has been completed.

Returning to block 358, if the check is not cashed within the predetermined amount of time, the process flow proceeds to block 362. At block 362, a stale funds engine cancels the check and creates an alternate account. For example, the stale funds engine can be configured to cancel the check such that it cannot be cashed any longer and to cause the automatic creation of an alternate account, such as a default IRA, or other tax preferred account. At block 364, the stale funds engine transmits instructions to transfer funds into the alternate account. At block 366, the deposit processing system transfers funds to the specified alternate account based on the instructions from the stale funds engine.

In some embodiments, the payment generation system may be configured to withhold taxes before a check is printed. For example, if a distribution to a recipient is $1,000.00, and the recipient's tax rate is 25%, the system may be configured to withhold $250.00 and print a check for only $750.00 for mailing to the recipient. At block 362, after the check has not been cashed and the stale funds engine is setting up a tax preferred account for the money, the stales fund engine can also be configured to reverse the tax withholding and make the entire $1,000.00 amount whole again before transmitting instructions to transfer those funds into the alternate account. Accordingly, even though the user would have only received $750.00 had the user cashed the check, when the alternate account is created, in some embodiments, the entire $1,000.00 amount is transferred to that alternate account, as the alternate account may be a pretax account.

Further, although not explicitly illustrated in the process flow of FIG. 3C or some of the other figures, the user requesting the batch processing may also transmit information indicating that a fee should be applied to payment distributions. For example, at block 312, the payment information transmitter can further transmit information indicating that a fee should be deducted from each distribution and paid to the user. For example, the user may indicate that a $15.00 fee is due to the user on each distribution. Then, before the check printer is instructed to print the checks, $15.00 would be deducted from each recipient amount and earmarked for payment to the user.

Figure 3D:
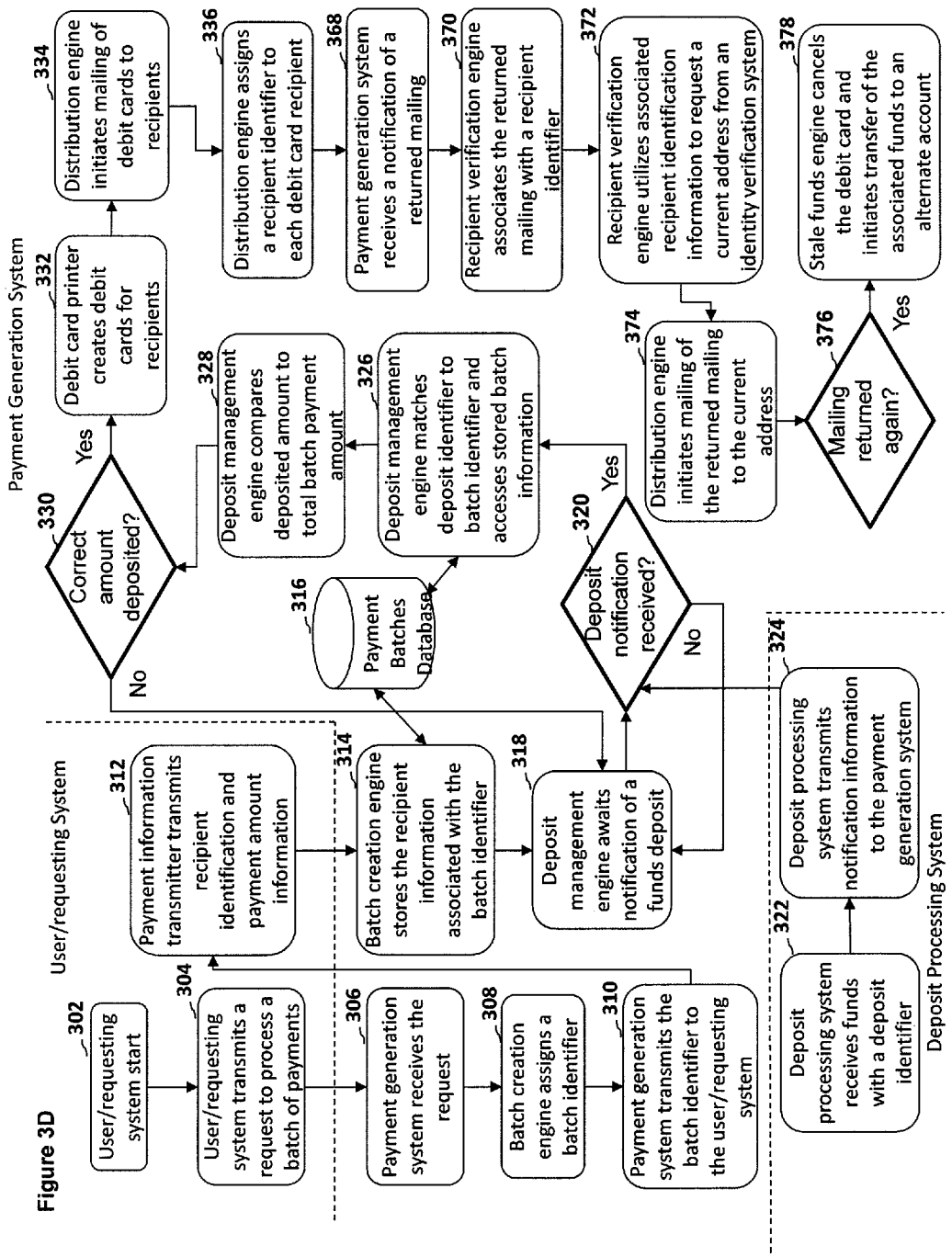
FIG. 3D depicts an embodiment of a process flow diagram illustrating an example of creating and distributing debit cards and verifying recipient identities.

FIG. 3D depicts an embodiment of a process flow diagram illustrating an example of creating and distributing debit cards and verifying recipient identities. The process flow illustrated in FIG. 3D can be useful when a mailing of a debit card or other payment instrument to a recipient is returned as undeliverable. The process flow illustrated in FIG. 3D is similar to the process flow illustrated in FIG. 3B at blocks 302-336. However, the process flow is different after block 336. At block 368, the payment generation system receives a notification of a returned mailing. For example, a debit card mailing may be returned to the facility that mailed the debit card and a notification is generated to notify the payment generation system that the mailing was returned. At block 370, the recipient verification engine associates the returned mailing with the recipient identifier. For example, the recipient verification engine 248 illustrated in FIG. 2B can be configured to analyze the returned mailing to acquire the recipient identifier and/or to compare recipient identification information and/or recipient payment amount information with information stored in the distributions database 232 to determine what recipient identifier this returned mailing is associated with.

At block 372, the recipient verification engine utilizes associated recipient identification information to request a current address from an identity verification system. For example, the recipient verification engine 248 can be configured to transmit recipient identifying information, such as Social Security number, date of birth, name, and/or the like to the identity verification system 266 for determination of a current or better mailing address. At block 374, after receiving a current or better address from the identity verification system, the distribution engine initiates re-mailing of the returned mailing to the current or better address.

At block 376, the process flow varies depending on whether the mailing is returned again. If the mailing is not returned again, the process flow is complete, and/or the distribution engine 238 can be configured to note in the distributions database 232 that the distribution is completed. If the mailing is returned again at block 376, the process flow proceeds to block 378. At block 378, the stale funds engine cancels the debit card and initiates a transfer of the funds earmarked for that debit card to an alternate account, such as a default IRA or other interest bearing or tax preferred account.

Figure 3E:
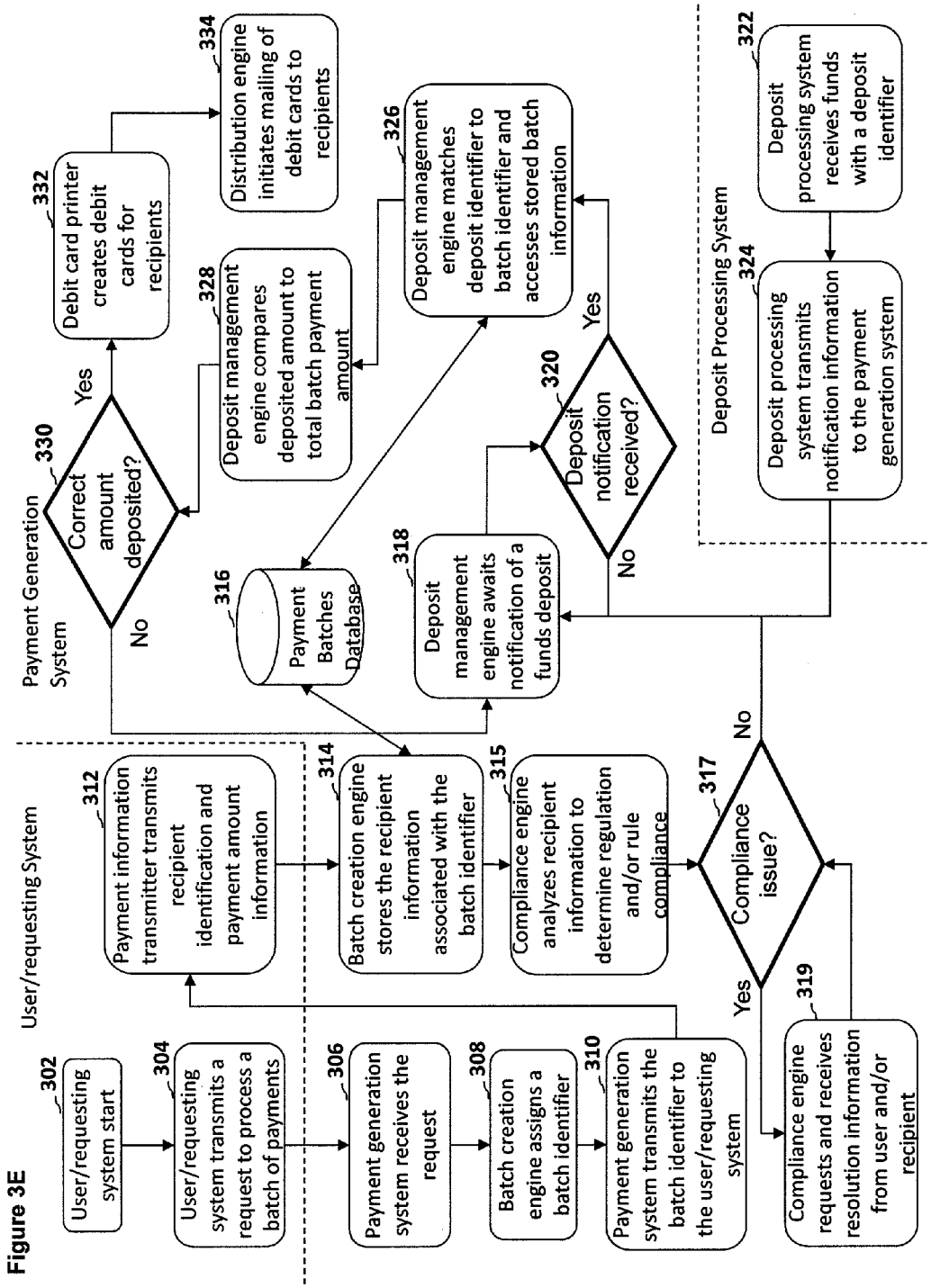
FIG. 3E depicts an embodiment of a process flow diagram illustrating an example of creating and distributing debit cards while ensuring compliance with rules and regulations.

FIG. 3E depicts an embodiment of a process flow diagram illustrating an example of creating and distributing debit cards while ensuring compliance with rules and regulations. Portions of the process flow illustrated in FIG. 3E are similar to the process flow illustrated in FIG. 3A as discussed above. For example, blocks 302-314 and 318-334 are similar to the same numbered blocks in FIG. 3A. At block 315, after the batch creation engine has stored the recipient information associated with the batch identifier, a compliance engine analyzes the recipient information to determine compliance with regulations, laws, and/or rules. For example, the compliance engine 250 illustrated in FIG. 2B can configured to query the regulations database 242 and/or the rules database 244 to determine what rules, regulations, and/or laws apply to this batch transaction and to analyze the information received from the user related to this batch transaction to determine if any of those are potentially not in compliance. For example, there may be a regulation related to the type of distributions for this batch that require a recipient to have a signature on file by the recipient's spouse.

At block 317, the process flow varies depending on whether there is a compliance issue. If there is a compliance issue, such as the compliance engine determines that a spousal signature may need to be on file, the process flow proceeds to block 319. At block 319, the compliance engine requests and receives and any resolution information from the user and/or recipient. For example, the compliance engine can be configured to generate a mailing to a recipient that asks the recipient whether they are married and, if so, asks them to have their spouse sign a letter and mail it back to a given address. The compliance engine can be configured to then wait for the receipt of that letter or an acknowledgement that the recipient has no spouse before allowing the process to continue at least with respect to that recipient. Once this information is received the process flow proceeds back to block 317 where the process flow again varies depending on whether there are any remaining compliance issues. Once there are no remaining compliance issues, the process flow proceeds to block 318 and proceeds similar to as described above with respect to FIG. 3A.

Although in the process flow illustrated in FIG. 3E there is only one point of compliance determination at block 315, compliance determination may also or alternatively take place at various other points in the batch payment instrument distribution process. For example, compliance may be determined as soon as information related to a batch is received, before batch funds are deposited, after batch funds are deposited, before debit cards or other payment instruments are printed and/or distributed, after payment instruments are printed and/or distributed, and/or the like. In some embodiments, the compliance engine is configured to ensure compliance with federal and/or state tax withholding requirements prior to enabling a distribution to be made.

Figure 3F:
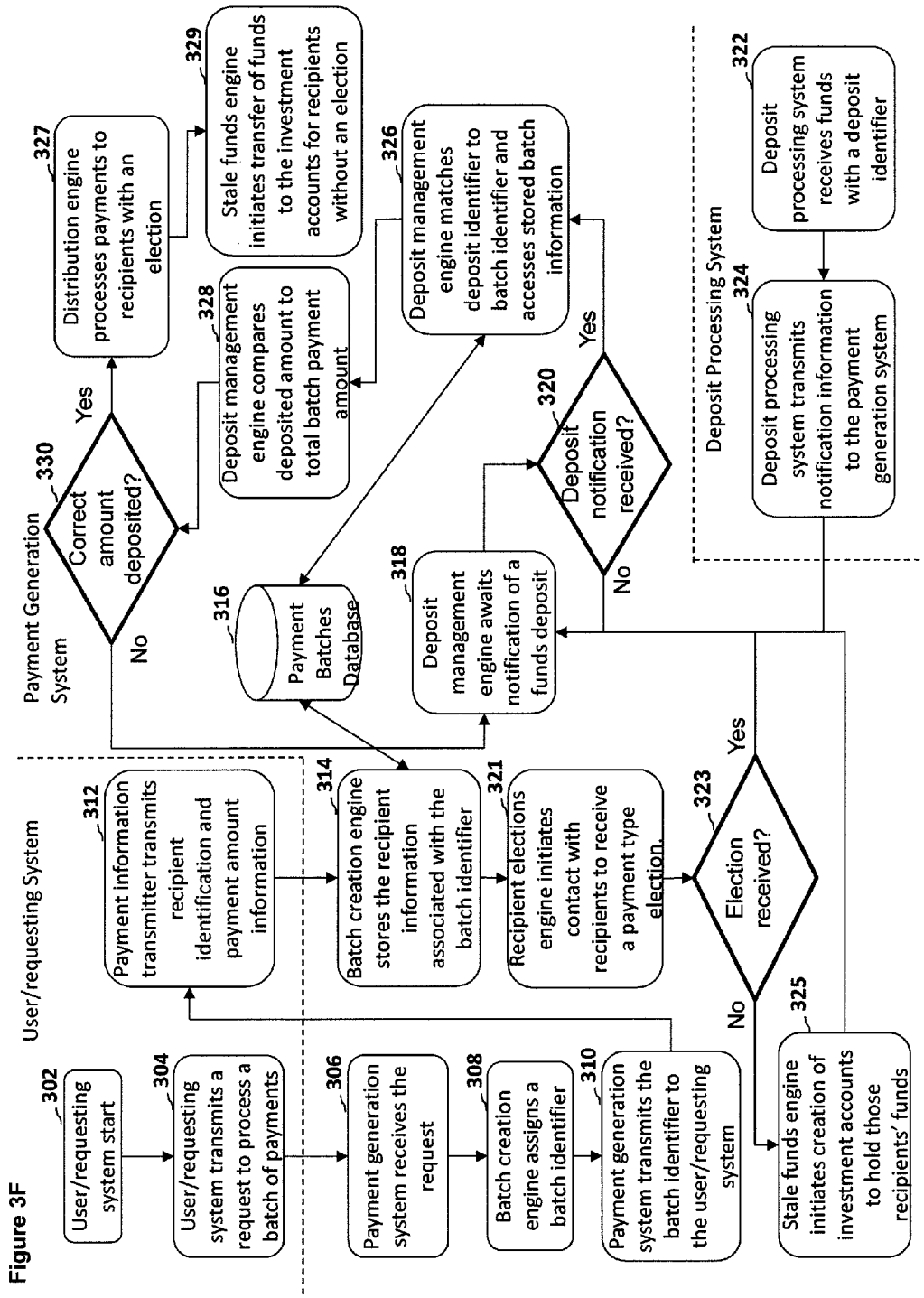
FIG. 3F depicts an embodiment of a process flow diagram illustrating an example of creating and distributing payments based on recipient elections.

FIG. 3F depicts an embodiment of a process flow diagram illustrated in an example of creating and distributing payments or payment instruments based on recipient elections. The process flow illustrated in FIG. 3F is similar to the process flow illustrated in FIG. 3E, with the exception of the odd numbered blocks in FIG. 3F. At block 321, after the batch creation engine stores the recipient information associated with the batch identifier, a recipient elections engine initiates contact with recipients to receive a payment type election. For example, the recipient elections engine 256 illustrated in FIG. 2B can be configured to initiate contact, such as through e-mail or physical mail, with recipients to ask them how they would like to receive their distribution. For example, an election may be to receive the distribution as a lump sum payment which may require tax withholding in some cases or to receive it as a rollover, meaning the funds are rolled over from one tax preferred account to another tax preferred account without having taxes withheld. Another type of election that may be received is the method of receiving payment, such as via physical check, debit card, ACH or wire transfer, and/or the like.

At block 323, the process flow varies depending on whether the election has been received by the recipient or received from the recipient. If the required election has been received or has been received within a predetermined amount of time, the process flow proceeds to block 318 and proceed similarly to as described above with respect to FIG. 3A. If the required election is not received or is not received within a predetermined amount of time, the process flow proceeds to block 325. At block 325, a stale funds engine initiates creation of investment accounts to hold the funds of the recipients that did not respond with an election. This is similar to some of the embodiments of processes described above, wherein the stale funds engine generates an alternative account and transfers the recipient's funds to that alternative account to be held on behalf of the recipient and to likely earn interest on behalf of the recipient until the recipient claims the funds. The process flow then proceeds to block 318 as described above.

At block 330, after the correct amount of funds for the batch have been deposited, the process flow proceeds to block 327. At block 327, the distribution engine processes payments to recipients with an election. For example, for recipients that elected to receive a lump sum payment in the form of a debit card, the distribution engine causes a debit account to be opened and associated with a recipient identifier and instructs the debit card printer to print a debit card linked to the debit account for mailing to the recipient. At block 329, the stale funds engine initiates transfer of funds to the investment accounts initiated at block 325 for the recipients that did not have an election.

In various embodiments, various elements of the processes illustrated in FIGS. 3A-3F can be combined into a single process. As one example, the recipient election features of FIG. 3F may be combined with other processes. As another example, the compliance features of FIG. 3E may be combined with other processes.

Example Distribution by a Payment Generation System

The following is one example of a process that can be formed by a payment generation system as described herein. An employee named Mary works at an employer and has saved $50,000 in her 401(k) at that employer. Mary then quits her job and leaves her 401(k) at her ex-employer. The employer may not want to be responsible for the leftover 401(k) funds and may therefore engage a payment generation system as disclosed herein to take that 401(k) off of the employer's hands. The employer can, for example, log into a web interface of the payment generation system and create in this case a single recipient batch wherein the employer instructs the payment generation system to distribute this $50,000 in leftover 401(k) money to Mary as Mary elects to receive it.

The payment generation system creates a unique batch identifier, sends that unique batch identifier to the employer, and the employer now transfers the $50,000 to a bank account associated with the payment generation system and including the batch identifier with the deposit. The payment generation system receives notification of the deposit with the batch identifier and reconciles the account to make sure the appropriate amount of funds was received. In some embodiments, the payment generation system may now have a certain amount of time to get this money distributed, either based on internal rules or laws or regulations. For example, the payment generation system may now have 90 days to get the $50,000 distributed to Mary.

The payment generation system may now be configured to automatically determine all applicable regulations and laws that apply to this distribution. Further, the payment generation system can be configured to gather whatever information on Mary that it can from existing databases, such as third-party identification verification services. In some embodiments, the employer provides the payment generation system with enough information that the payment generation system does not have to determine additional information on its own. The payment generation system can now be configured to determine compliance with whatever regulations and laws it can based on the information it has or was able to automatically retrieve from an identity verification system. If there are any holes in the information and the payment generation system needs additional information to enable the distribution and/or to determine compliance, the system can be configured to automatically request this information from Mary.

The payment generation system can now be configured to request instructions from Mary as to how she would like the funds to be distributed. For example, it can ask whether she wants to roll the funds over to another tax preferred account or whether she wants a lump sum distribution. The system can be configured to then determine compliance with additional regulations and laws, such as tax withholding regulations or laws, based on the elections received from Mary as to how she would like the funds distributed.

The system can now be configured to distribute the funds per Mary's instructions. Once the funds have been distributed, the system can be configured to perform more reconciliations to make sure all of the funds have been appropriately distributed. If the funds are distributed via a debit card or check, the system may be configured to give Mary a certain amount of time to activate the debit card and/or deposit the check. If Mary does not act within that amount of time, the system can be configured to unwind the check or cancel the debit card and transfer the $50,000 to a default or missing participant IRA to be held on behalf of Mary until she claims those funds.

Managing Stale Payment Instruments

Figure 4:
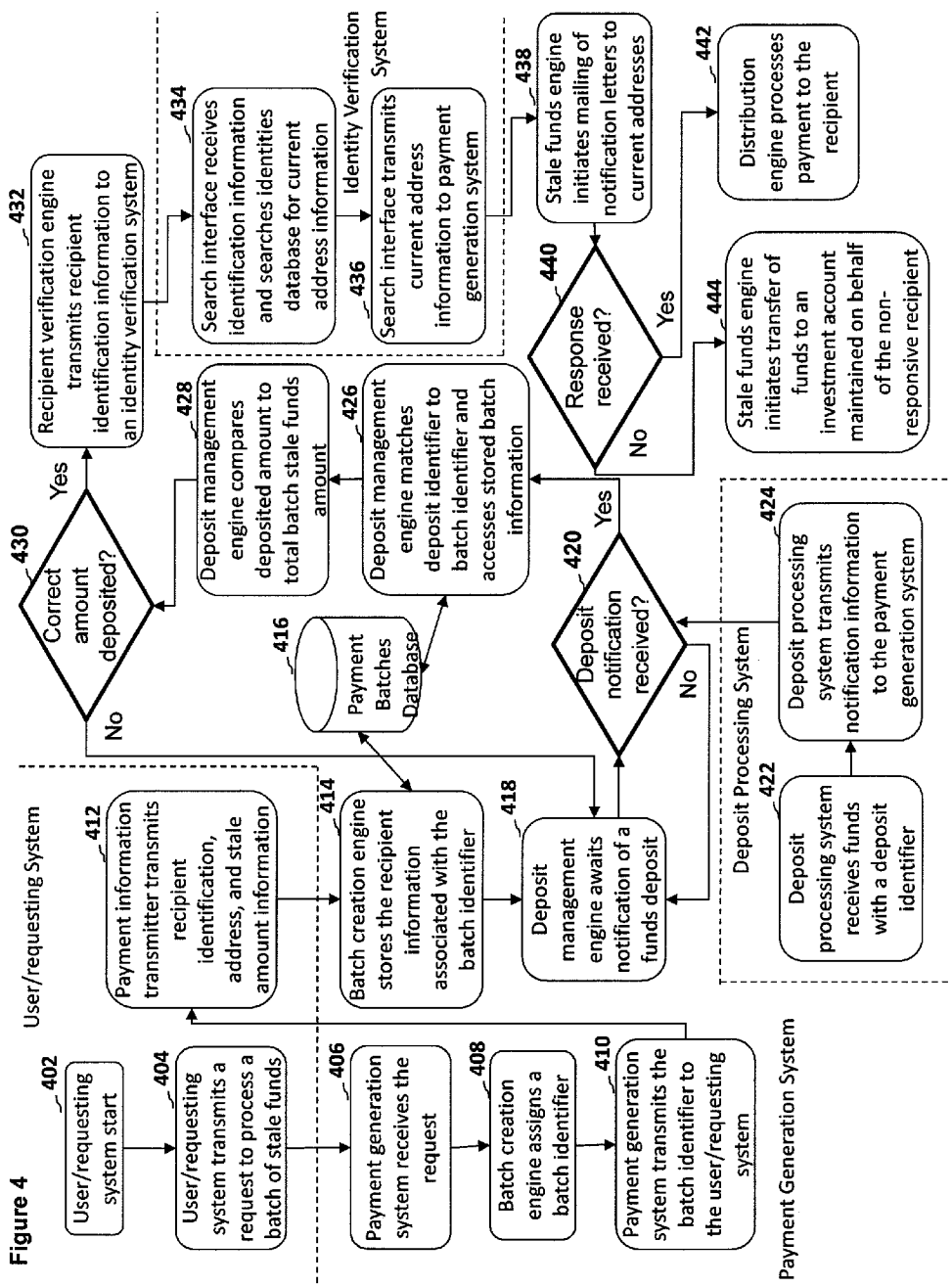
FIG. 4 depicts an embodiment of a process flow diagram illustrating an example of processing a plurality of stale payment instruments.

FIG. 4 depicts an embodiment of a process flow diagram illustrating an example of processing a plurality of stale payment instruments. The process flow illustrated at FIG. 4 can be used, for example, to enable the payment generation system to process on behalf of another entity payments related to funds that are stale, meaning the status of the funds is unknown and/or the other entity has already attempted to get the recipients to accept the funds and no response was received, or similar situations.

At block 402, the user or requesting system starts the process. The user or requesting system may be, for example, one of the user access point systems 210 illustrated in FIG. 2B. At block 404, the user or requesting system transmits a request to process a batch of stale funds. For example, the user access point system 210 can transmit the request to the payment generation system 240 through the network 108. At block 406, the payment generation system receives the request from the user requesting system.

At block 408, a batch creation engine assigns a unique batch identifier to this batch of stale funds. At block 410, the payment generation system transmits the batch identifier to the user or requesting system. This is to enable to the user of the user or requesting system to deposit funds and associate those funds with that batch identifier to enable the payment generation system to link the deposit up with this batch when it is received.

At block 412, the payment information transmitter of the user access point system transmits recipient identification, address, and stale amount information. For example, this recipient information can comprise recipient name, Social Security number, date of birth, mailing address, the amount of stale funds due to that recipient, and/or the like. At block 414, the batch creation engine stores the recipient information in a payment batches database associated with the unique batch identifier. At block 418, a deposit management engine awaits notification of a funds deposit.

At block 420, the process flow varies depending on whether a deposit notification has been received. If a deposit notification has not been received, the process flow proceeds back to block 418 and the deposit management engine awaits notification of a funds deposit.

At block 422, a deposit processing system receives funds with an associated deposit identifier. For example, the user requesting the processing of this batch of stale funds can initiate a transfer of the stale funds to one of the deposit processing systems 212 and transmit along with this deposit a deposit identifier matching the batch identifier. At block 424, the deposit processing system transmits notification information to the payment generation system that this deposit has been received, the notification information also comprising the deposit identifier.

At block 420 once the deposit notification has been received by the payment generation system, the process flow proceeds to block 426. At block 426, the deposit management engine matches the deposit identifier to the batch identifier and access the stored batch information in the payment batches database shown at block 416. At block 428, the deposit management engine compares the deposited amount to the total batch stale funds amount to determine whether the correct or full amount has been deposited.

At block 430, the process flow varies depending on whether the correct amount has been deposited. If the correct amount has not been deposited, the process flow proceeds back to block 418 and the deposit management engine awaits notification of another funds deposit. If the correct amount is deposited, the process flow proceeds from block 430 to block 432. At block 432, a recipient verification engine transmits recipient identification information to an identity verification system. This is to, for example, determine whether the address received by the payment information transmitter is the best and most current address, and/or to verify any other recipient identification information.

At block 434, a search interface of the identity verification system receives the identification information and searches an identities database for current address information and/or for other identity information. At block 436, the search interface transmits current address information and/or other identity information to the payment generation system.

At block 438, a stale funds engine of the payment generation system initiates mailing of notification letters to current addresses of the recipients. The notification letters can, for example, notify the recipient that the payment generation system is in receipt of funds that are earmarked for those recipients and ask them to respond to let the payment generation system know how they would like to receive the funds. At block 440, the process flow varies depending on whether a response to the notification letter is received. If a response to the notification letter is received, process flow proceeds to block 442. At block 442, a distribution engine processes a payment to the recipient based on the recipient's instructions. If a response is not received, the process flow proceeds to block 444. At block 444, a stale funds engine initiates transfer of the funds for that recipient into an investment account maintained on behalf of the nonresponsive recipient. In this way, the funds will at least be maintained in a way that is advantageous to the recipient until such time as the recipient claims those funds.

In various embodiments, systems, methods, and devices as described herein require computer hardware to operate. For example, in some embodiments, a payment generation system is configured to be able to simultaneously or substantially simultaneously receive and process requests for batch distributions from a plurality of users or user access point systems, such as from 5, 10, 50, 100, 1000, 10,000 or more user access point systems. Further, to enable the system to operate appropriately, the system must operate for at least some of its functions in real-time or near real-time, meaning a user may make a request using a user access point system, and that user may expect a response almost immediately from the system. For example, a user of a user access point system may upload a spreadsheet of 1000 recipients and associated recipient payment amounts indicating 1000 different distributions that need to be made to 1000 recipients of a particular benefits plan. The user may then expect a response from the system almost immediately, such as within a few seconds, 1 second, 5 seconds, etc., of what the total distribution amount is and the batch identifier to enable the user to deposit the funds in a bank account for the distributions. If a system as described herein were not able to operate at such speeds, a requesting user would have to wait a significant amount of time for a human to total up all of the requested distribution amounts and to perform any identity verification tasks that, in a system as described herein, can be performed in real time while the user is still entering batch distribution information.

In some embodiments, utilizing computer hardware enables systems as described herein to prevent fraud that would be much harder to prevent were computer hardware not utilized. For example, if two different users were to simultaneously or substantially simultaneously instruct the system to distribute funds from the same benefits plan to a list of users, since embodiments of systems as described herein can operate substantially in real-time, the systems can be configured to determine almost instantaneously that users are trying to accomplish a double spend, meaning users are attempting to spend the same money twice. However, if some of the processes as described herein were attempted to be done manually, such a double spend may not be able to be detected or it may not be able to be detected in time before issues arise due to an attempted double spend.

Further, various processes as described herein would be impossible for a human to do. For example, various processes as described herein require magnetically encoding information, transmitting electronic communications, storing information in electronic databases, querying information from electronic databases, creating relational tables and relational links between electronic databases, and various other processes that are not able to be performed by a human, but rather require computer hardware.

Computing System

Figure 5:
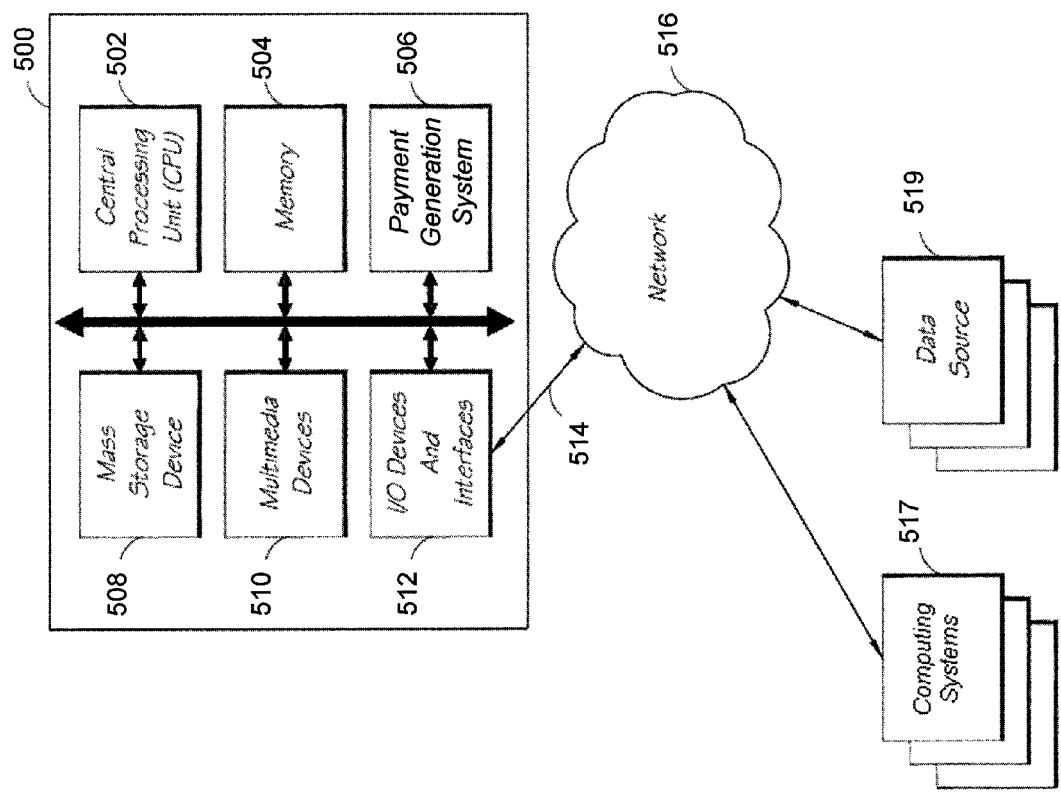
FIG. 5 is a block diagram depicting an embodiment of a computer hardware system configured to run software for implementing one or more embodiments of the payment generation systems and other systems described herein.

FIG. 5 is a block diagram depicting an embodiment of a computer hardware system configured to run software for implementing one or more embodiments of the payment generation systems described herein.

In some embodiments, the computer clients and/or servers described above take the form of a computing system 500 illustrated in FIG. 5, which is a block diagram of one embodiment of a computing system that is in communication with one or more computing systems 517 and/or one or more data sources 519 via one or more networks 516. The computing system 500 may be used to implement one or more of the systems and methods described herein. In addition, in one embodiment, the computing system 500 may be configured to manage access or administer a software application. While FIG. 5 illustrates one embodiment of a computing system 500, it is recognized that the functionality provided for in the components and modules of computing system 500 may be combined into fewer components and modules or further separated into additional components and modules.

Payment Generation System Module

In one embodiment, the computing system 500 comprises a payment generation system module 506 that carries out the functions described herein with reference to managing payments and payment instruments, including any one of the techniques described above. The payment generation system module 506 and/or other modules may be executed on the computing system 500 by a central processing unit 502 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 500 also comprises a mainframe computer suitable for controlling and/or communicating with large databases, performing high volume transaction processing, and generating reports from large databases. The computing system 500 also comprises a central processing unit ("CPU") 502, which may comprise a conventional microprocessor. The computing system 500 further comprises a memory 504, such as random access memory ("RAM") for temporary storage of information and/or a read only memory ("ROM") for permanent storage of information, and a mass storage device 508, such as a hard drive, diskette, or optical media storage device. Typically, the modules of the computing system 500 are connected to the computer using a standards based bus system. In different embodiments, the standards based bus system could be Peripheral Component Interconnect (PCI), Microchannel, SCSI, Industrial Standard Architecture (ISA), and Extended ISA (EISA) architectures, for example.

The computing system 500 comprises one or more commonly available input/output (I/O) devices and interfaces 512, such as a keyboard, mouse, touchpad, and printer. In one embodiment, the I/O devices and interfaces 512 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 512 comprise a microphone and/or motion sensor that allow a user to generate input to the computing system 500 using sounds, voice, motion, gestures, or the like. In the embodiment of FIG. 5, the I/O devices and interfaces 512 also provide a communications interface to various external devices. The computing system 500 may also comprise one or more multimedia devices 510, such as speakers, video cards, graphics accelerators, and microphones, for example.

Computing System Device/Operating System

The computing system 500 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 500 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 500 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 5, the computing system 500 is coupled to a network 516, such as a LAN, WAN, or the Internet, for example, via a wired, wireless, or combination of wired and wireless, communication link 514. The network 516 communicates with various computing devices and/or other electronic devices via wired or wireless communication links. In the embodiment of FIG. 5, the network 516 is communicating with one or more computing systems 517 and/or one or more data sources 519.

Access to the payment generation system module 506 of the computer system 500 by computing systems 517 and/or by data sources 519 may be through a web-enabled user access point such as the computing systems' 517 or data source's 519 personal computer, cellular phone, smartphone, laptop, tablet computer, e-reader device, audio player, or other device capable of connecting to the network 516. Such a device may have a browser module that is implemented as a module that uses text, graphics, audio, video, and other media to present data and to allow interaction with data via the network 516.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 512 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 500 may comprise a physical or logical connection established between a remote microprocessor and a mainframe host computer for the express purpose of uploading, downloading, or viewing interactive data and databases online in real time. The remote microprocessor may be operated by an entity operating the computer system 500, including the client server systems or the main server system, an/or may be operated by one or more of the data sources 519 and/or one or more of the computing systems 517. In some embodiments, terminal emulation software may be used on the microprocessor for participating in the micro-mainframe link.

In some embodiments, computing systems 517 who are internal to an entity operating the computer system 500 may access the payment generation system module 506 internally as an application or process run by the CPU 502.

User Access Point

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

Other Systems

In addition to the systems that are illustrated in FIG. 5, the network 516 may communicate with other data sources or other computing devices. The computing system 500 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Retirement Benefits Management System

In some embodiments, the disclosure herein provides systems, methods, and devices for managing retirement benefits. In some embodiments, a system is provided that comprises one or more modules or engines configured to enable third party administrators and/or retirement plan sponsors to, for example, process Qualified Retirement Plan distributions, establish Department of Labor Safe Harbor Default (e.g., automatic) and/or Missing Participant Individual Retirement Accounts (IRA's), process retirement plan terminations, handle stale-dated and/or uncashed checks, and/or process legal settlement disbursements in a secure but convenient online environment. The system can be configured to accommodate various account types (e.g., traditional, Roth, pre-tax, post-tax, etc.) and various distribution types (e.g., lump sum, rollovers, outstanding loan, recurring/periodic payments, Roth conversions, etc.). The system can be configured to provide online participant benefit election, automatic lead generation to plan advisors, bulk upload of plan/participant distribution data, tax withholding (e.g., Federal, State, and/or U.S. Territories), and several payment mechanism options (e.g., check, wire, ACH, reloadable debit card, etc.). In some embodiments, a retirement benefits management system can be a payment generation system, such as the various payment generation systems described above.

A retirement benefits management system can be configured to provide transparency in communication to enable users to be informed of the status of current and prior transactions. Such a system can include a hierarchical structure to enable viewing of all activity for each plan/accounts, customized multiple user access and writes control, a dashboard of pending transactions, instant email notifications, easy search and reporting functionality, and 24/7 access through the Internet. Such a system can enable users to save time, reduce risk, and eliminate costs. Such a system can be a simple, fast, and cost-effective way to manage the benefit distribution process. A retirement benefits management system as described herein can create consistency, efficiency, and scalability for its users.

Qualified Termination Administrator Module

In some embodiments, a retirement benefits management system or payment generation system comprises a Qualified Termination Administrator (QTA) module configured to enable a QTA to formally terminate an IRS Qualified Plan which has been orphaned (e.g., the institution holding the money cannot locate the plan sponsor or plan trustee). The QTA module can, in some embodiments, be configured to implement an automated QTA process. In some embodiments, the QTA module can be configured to allow a QTA to batch-process terminations to, for example, enable more efficient processing of Qualified Plan terminations.

Example QTA Processes

Figure 6A:
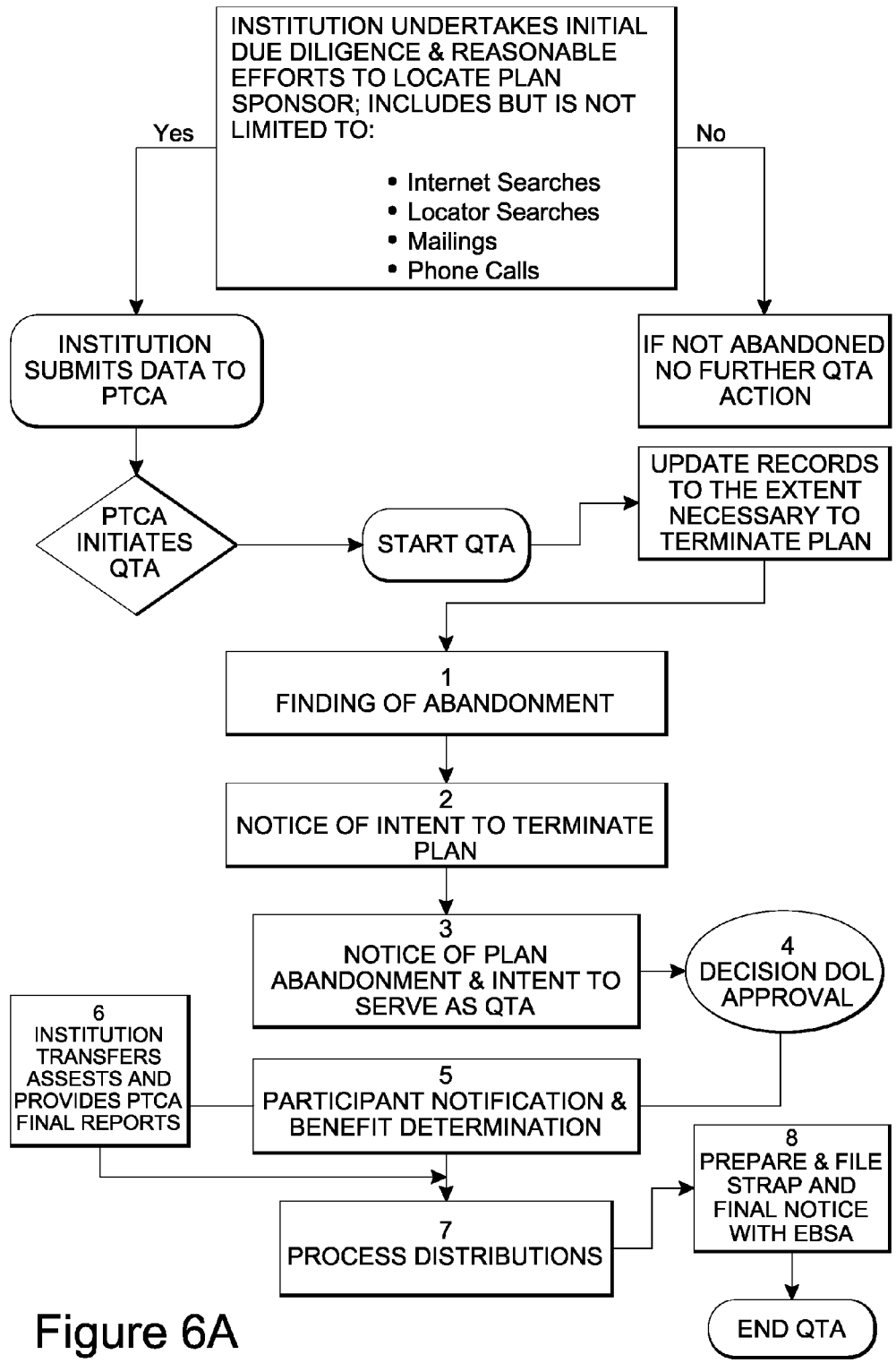
FIG. 6A depicts an embodiment of a process flow diagram illustrating an example of a qualified termination administration (QTA) process.
Figure 6B:
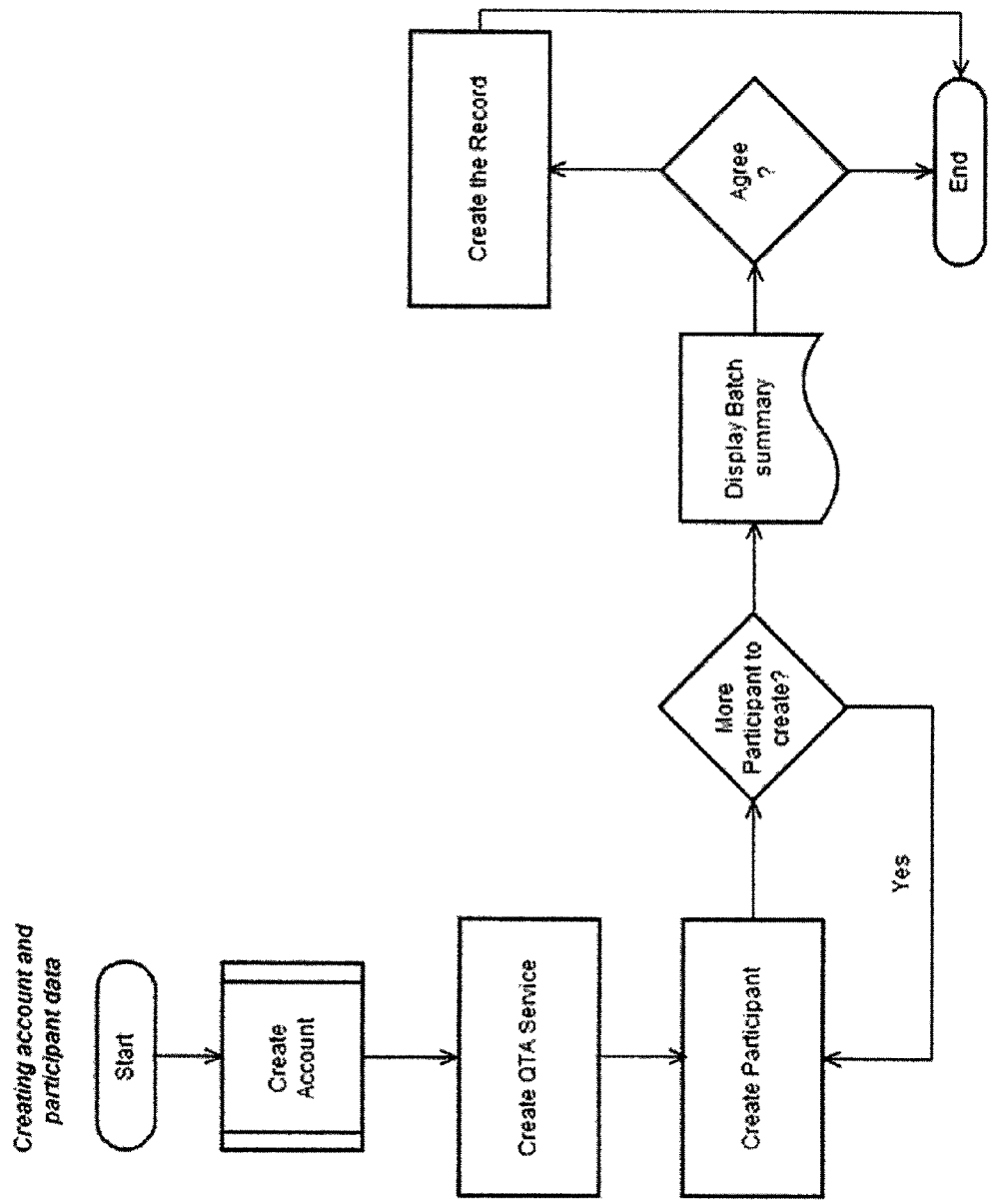
FIG. 6B depicts an embodiment of a process flow diagram illustrating an example of creating account and participant data.
Figure 6C:
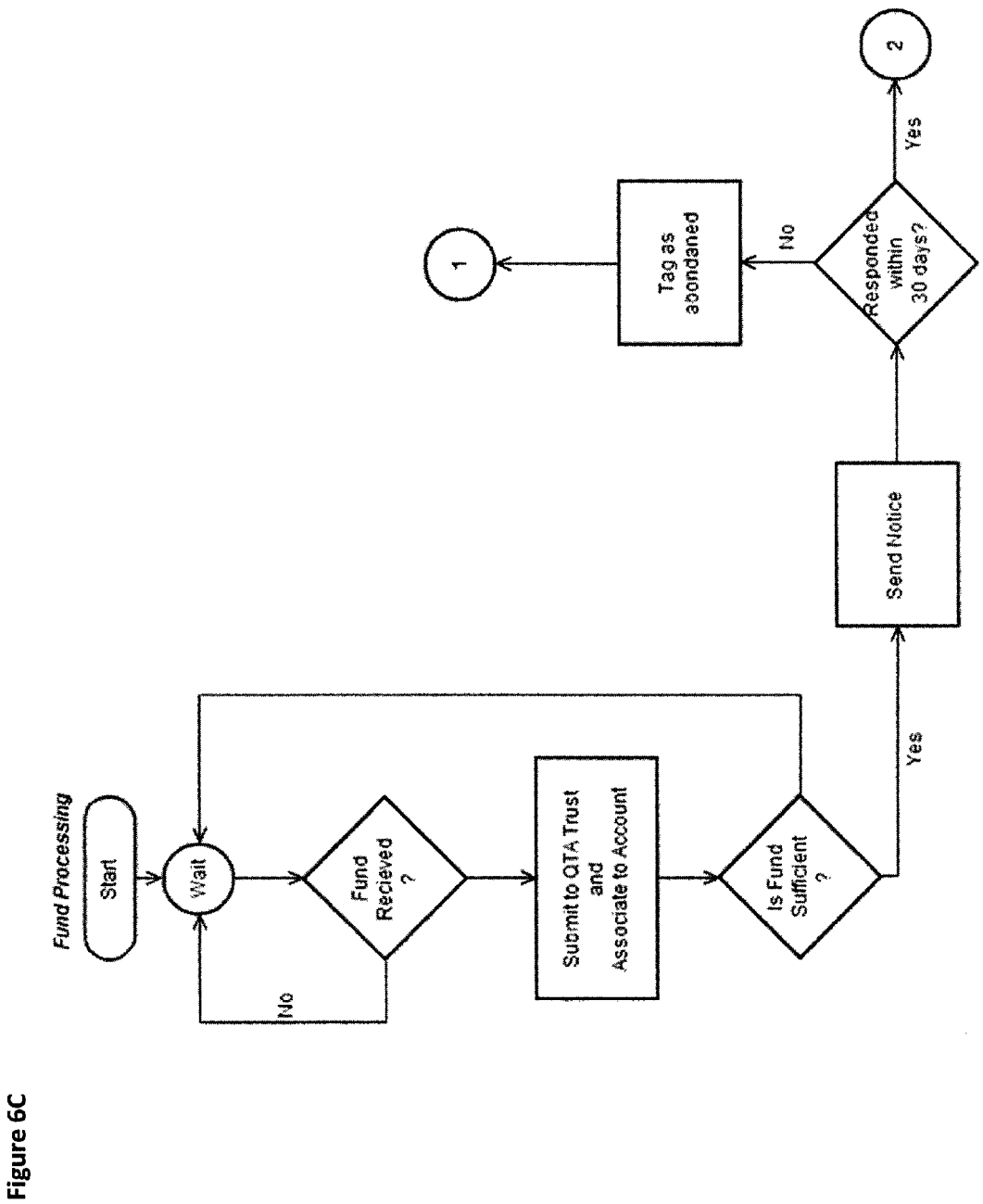
FIGS. 6C and 6D depict an embodiment of a process flow diagram illustrating an example of fund processing.
Figure 6D:
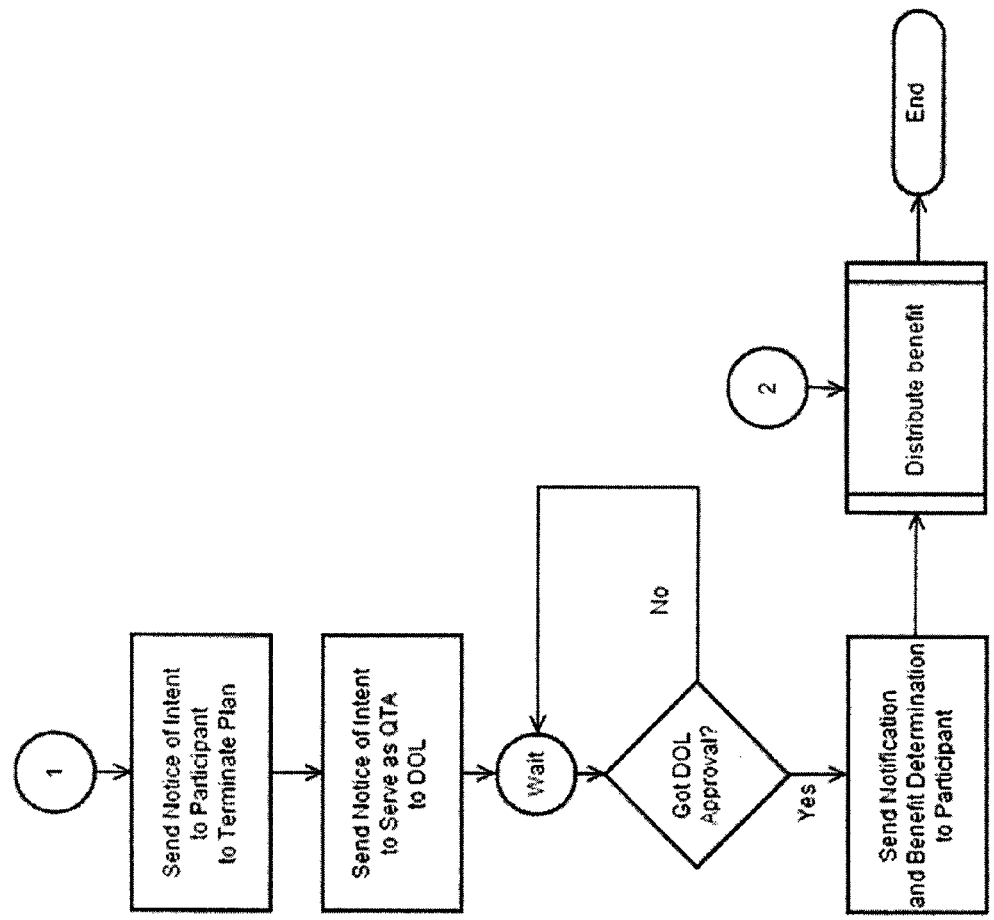

In some embodiments, a QTA module is configured to implement a process flow comprising three elements: creating account and participant data, fund processing, and distributing the benefits. In some embodiments, a QTA module is configured to implement the example process flow illustrated in FIG. 6A. In other embodiments, a QTA module is configured to implement a process flow comprising the following process flow elements, further illustrated in FIGS. 6B-6E. FIG. 6B depicts an embodiment of a process flow diagram illustrating an example of creating account and participant data. FIGS. 6C and 6D depict an embodiment of a process flow diagram illustrating an example of fund processing. FIG. 6E depicts an embodiment of a process flow diagram illustrating an example of distributing benefits. Although this embodiment and the embodiment in FIGS. 6A-6E illustrate some elements as occurring sequentially, in various embodiments, a process flow may comprise more or fewer elements and/or the elements may be processed in a different order and/or one or more elements may be processed simultaneously or concurrently. In some embodiments, the processes described herein in reference to a QTA module may be performed by, for example, the orphaned plan engine 254 illustrated in FIG. 2B.

The retirement benefits management system can be configured to enable a representative of a financial institution to communicate with the system, such as through a user access point system, to create an Institutional Organization Account (IOA) and/or one or more QTA accounts. The IOA account can be created by, for example, the institution that wants to process QTA using the retirement benefits management system. The QTA accounts can be created by the institution for each orphaned plan that it wants to submit to the retirement benefits management system.

The retirement benefits management system can be configured to then request that a user selects a module or service type to implement. In this example, a user would select the QTA module or service type.

After a user has selected the QTA module or service type, the QTA module can be configured to prompt a user to create a QTA account by, for example, uploading participant information for each participant, including such information as participant name, date of birth, social security number, address, account balance, and/or the like. The QTA module can be configured to perform various validations on the data provided by the user (e.g., social security number, date of birth, address, etc.) to ensure or at least to provide a certain level of confidence that complete and accurate data has been provided or received.

After the information is provided by the user to create one or more QTA accounts, the QTA module can be configured to present the user with a batch summary. The batch summary can be configured to display to the user that a batch of QTA accounts has been created and to display various information about the batch, such as participant information for each individual account and/or batch totals. The QTA module can additionally be configured to enable the user to create or add additional accounts and/or participants to the batch, to edit or remove existing accounts and/or participants from the batch, and/or to finalize or close the batch.

When a user indicates to the system to finalize or close the batch, the QTA module can be configured to obtain an acknowledgment or confirmation from the user that he or she has read and understands the disclosures provided (e.g., that the information provided is true and accurate), that the QTA will not be held liable for inaccurate or invalid information, and/or that the QTA participant accounts represent unpaid benefits to the participants.

In some embodiments, the QTA module can be configured to, after the user agrees that he or she has read and understands the disclosures, to provide a confirmation number to the user. The confirmation number can be used to, for example, communicate to the user that the QTA batch and accounts have been created and saved. In addition, the QTA module can be configured to present a confirmation page to the user that provides the user with additional instructions on, for example, how to remit the money to fund the QTA account or accounts. For example, the module may indicate to the user that the batch total and the amount needed to fund these accounts is $25,000. The module may be configured to request these funds via, for example, check, ACH, wire transfer, etc., and to provide instructions as to how the user should submit the funds.

In some embodiments, the QTA module can be configured to confirm that the required funds have been received prior to proceeding any further in the process flow.

The QTA module can be configured to send any funds received to a trust, such as a QTA Distribution Trust (QTADT).

The QTA module can be configured to, once the funds are received into the QTADT, validate and reconcile the deposit information from the QTADT account. For example, the funds received can be matched with any uncashed check account instructions provided. The module can be configured to then link the received funds to the IOA account and/or any associated QTA participant accounts.

In some embodiments, the QTA module can be configured to, once the funds are reconciled and associated to the QTA accounts, send notice to the plan sponsor and/or plan trustee at, for example, the last known addresses, indicating an intent to terminate the plan.

The QTA module can be configured to, after a predetermined amount of time without a response to the notification (e.g., thirty (30) days), internally tag the account or accounts with a finding of abandonment.

Once the QTA has been tagged as abandoned, the module can be configured to generate a Notice of Intent to Terminate the Plan to be mailed to each participant.

The QTA module can be configured to then generate a Notice of Plan Abandonment & Intent to Serve as QTA, terminate the plan, and to forward payment of fees (which can be calculated by the QTA module) to the Department of Labor.

The QTA module can be configured to then await an indication of approval from the Department of Labor to act as the QTA, to terminate the plan, and to approve fees.

The QTA module can be configured to then generate a Participant Notification and Benefit Determination to be mailed to the participants.

In some embodiments, the module can be configured to perform the following functions in notifying each participant of their benefit and in processing the distribution:

Perform an address search based on the unpaid account data previously received to obtain the best address. In some embodiments, an API protocol is used to drop files via secure FTP to a vendor and to either receive confirmation that the current address is the best address or to update the current address with a better one.

Create the notification letter via, for example, PDF and save the notification letter.

Print and mail the notification letter. In some embodiments, the module is configured to include information in the notification letter to provide instructions to the unpaid beneficiary as to how to securely claim their unpaid benefit via, for example, an online claim form or via paper forms. The letter can also notify the party of any processing fees and what happens if the benefit goes unclaimed within a predetermined amount of time (e.g., the next 30 to 60 days).

If the party is responsive, the module can be configured to process the online or paper claim form and to schedule the unpaid benefit to be paid according to the claim form (e.g., check, ACH, wire, debit card, etc.). The module can be configured to then pay the benefit out, and to assess and collect a processing fee.

If the QTA module does not receive a response to the notification letter within a predetermined time (e.g., 30 days), the module can be configured to automatically generates another letter to be mailed.

If the QTA module does not receive a response to the second notification letter within a predetermined time (e.g., an additional 30 days), the module can be configured to, for example, initiate a transfer to a Missing Participant IRA.

Once all of the participants are paid out or Missing Participant IRA's are established, the QTA module can be configured to generate and file a Special Terminal Report for Abandoned Plans (STRAP) and Final Notice with the Employee Benefits Security Administration (EBSA).

Uncashed Checks Module

In some embodiments, a retirement management system or payment generation system comprises an uncashed checks module configured to assist in reuniting a former retirement plan participant with his or her benefits. Uncashed retirement benefit distribution payments (e.g., checks) often represent a former retirement plan participant who never received his or her benefit payment. Additionally, these un-negotiated plan payments can create significant plan fiduciary and custodian compliance issues. Therefore, it is desirable to have a system configured to both reunite the former plan participant with their benefits (e.g., money) and reduce outstanding plan fiduciary liability and compliance issues for custodians, while complying with state escheatment laws and regulations for uncashed checks or other types of payments.

Example Uncashed Checks Process Flow

In some embodiments, an uncashed checks module is configured to implement a process flow comprising the following process flow elements. In some embodiments, such a process flow may be implemented by, for example, the stale funds engine 258 illustrated in FIG. 2B. Although this embodiment illustrates some elements as occurring sequentially, in various embodiments, a process flow may comprise more or fewer elements and/or the elements may be processed in a different order and/or one or more elements may be processed simultaneously or concurrently.

The retirement benefits management system can be configured to enable a user to create a user account as well as a sponsor organization account. The sponsor organization accounts are typically created by the company or entity that has the responsibility to resolve the uncashed checks (e.g., banks, institutions, sponsors of a retirement plan, third party administrators, etc.).

The retirement benefits management system can be configured to then request that a user select the module or service type desired. In this example, a user would select the uncashed check module or service type.

In some embodiments, the uncashed checks module is configured to ask the user who is going to pay the processing fees for the service (e.g., the participant or requestor).

The uncashed checks module can be configured to then prompt the user to create one or more uncashed check accounts by, for example, uploading the unpaid party information, such as unpaid party name, date of birth, social security number, address, unpaid amount, etc. The uncashed checks module can be configured to perform various validations on the data provided by the user (e.g., social security number, date of birth, address, etc.) to ensure or at least to provide a certain level of confidence that complete and accurate data has been provided or received.

After the necessary information is provided by the user to create one or more uncashed check accounts, the module can be configured to present the user with a batch summary. The batch summary can be configured to display to the user that a batch of uncashed check accounts has been created, information relating to each account in the batch, and/or batch totals. The uncashed checks module can additionally be configured to enable the user to create or add additional accounts and/or participants to the batch, to edit or remove existing accounts and/or participants from the batch, and/or to finalize or close the batch.

When a user indicates to the system to finalize or close the batch, the uncashed checks module can be configured to obtain an acknowledgment or confirmation from the user that he or she has read and understands the disclosures provided (e.g., that the information provided is true and accurate), that the entity providing the retirement benefits management system will not be held liable for inaccurate or invalid information, that the uncashed check accounts represents an unpaid benefit to the account holder, and/or that the uncashed check accounts do not include an uncashed check from a rollover out of an IRA or Qualified Retirement Plan.

In some embodiments, the uncashed checks module can be configured to, after the user agrees that he or she has read and understands the disclosures, to provide a confirmation number to the user. The confirmation number can be used to, for example, communicate to the user that the uncashed checks batch and accounts have been created and saved. In addition, the uncashed checks module can be configured to present a confirmation page to the user that provides the user with additional instructions on, for example, how to remit the money to fund the uncashed check account or accounts. For example, the module may indicate to the user that the batch total and the amount needed to fund these accounts is $25,000. The module may be configured to request these funds via, for example, check, ACH, wire transfer, etc., and to provide instructions as to how the user should submit the funds.

In some embodiments, the uncashed checks module can be configured to confirm that the required funds have been received prior to proceeding any further in the process flow.

The uncashed checks module can be configured to send any funds received to a trust, such as a Missing Distributee Distribution Trust (PMDDT).

The uncashed checks modules can be configured to, once the funds are received into the PMDDT, validate and reconcile the deposit information from the PMDDT account. For example, the funds received can be matched with the uncashed check account instructions provided. The module can be configured to then link the received funds to the sponsor organization account and/or any associated uncashed check accounts.

In some embodiments, the uncashed checks module can be configured to, once the funds are reconciled and associated to the uncashed check accounts, send a notification to the unpaid beneficiary or beneficiaries of their benefit.

If the funds received do not match or reconcile with the uncashed check account information previously provided, the module can be configured to reach out to the sponsoring organization to rectify and correct. In some embodiments, only after the instructions and the funds match does the notification process take place.

In some embodiments, the uncashed checks module can be configured to perform the following functions in notifying the unpaid beneficiaries of their benefit after the reconciliation process takes place:

Perform an address search based on the unpaid account data previously received to obtain the best address. In some embodiments, an API protocol is used to drop files via secure FTP to a vendor and to either receive confirmation that the current address is the best address or to update the current address with a better one.

Create the notification letter via, for example, PDF and save the notification letter.

Print and mail the notification letter.

In some embodiments, the module is configured to include information in the notification letter to provide instructions to the unpaid beneficiary as to how to securely claim their unpaid benefit via, for example, an online claim form or via paper forms. The letter can also notify the party of any processing fees and what happens if the benefit goes unclaimed within a predetermined amount of time (e.g., the next 30 to 60 days).

If the party is responsive, the module can be configured to process the online or paper claim form and to schedule the unpaid benefit to be paid according to the claim form (e.g., check, ACH, wire, debit card, etc.). The module can be configured to then pay the benefit out, and to assess and collect a processing fee.

If the uncashed checks module does not receive a response to the notification letter within a predetermined time (e.g., 30 days), the module can be configured to automatically generate another letter to be mailed.

If the uncashed checks module does not receive a response to the second notification letter within a predetermined time (e.g., an additional 30 days), the module can be configured to, for example, initiate a transfer to a taxable savings account established on behalf of the uncashed check beneficiary. The uncashed checks module can be configured to issue a 1099-Int annually to the uncashed check beneficiary and to have it mailed to their last known residence. The uncashed check module can additionally be configured to determine when the taxable savings account must be escheated and process an escheat payment.

After the uncashed checks module receives the uncashed check account information, funds that reconcile to the account information are provided, generates and mails the notification, and does not receive a response or the uncashed check account goes unclaimed, the module can be configured to initiate a transfer to a taxable savings account that is established on behalf of the uncashed check beneficiary. When the funds are transferred to the taxable savings account, the module can be configured to assess and collect a processing fee.

The uncashed checks module can be configured to administer the taxable savings accounts by performing the following functions:

Credit interest to these accounts on, for example, a monthly basis.

Generate and mail to the participant, IRS Form 1099 Int, on an annual basis.

Charge and deduct from each account an administrative fee, for example, annually or on a monthly basis.

Eventually pay out the account balance to a responsive account holder and/or escheat the account balance when applicable.

Default and Missing Participant IRA's Module

In some embodiments, a retirement management system or payment generation system comprises a default and missing participant IRA's module configured to implement a no-response action when a participant does not respond to notifications relating to the participant's retirement benefits. The module can be configured to implement at least two types of actions when a participant does not respond to notifications: (1) establish a Default IRA auto rollover, or (2) establish a Missing Participant IRA auto rollover. The processes performed by a default and missing participant IRA's module as disclosed herein can be performed in some embodiments by, for example, the stale funds engine 258 illustrated in FIG. 2B.

A Default (Auto Rollover) IRA can be advantageous to avoid unnecessary retirement plan administration costs, to reduce fiduciary exposure, and to protect participants' deferred tax status. As its name implies, the retirement benefits management system can establish a Default IRA auto rollover, for example, for plan participants who fail to respond to benefit election requests. The Default IRA auto rollover often works best for ongoing, non-terminating, qualified pension plans with account balances less than $5,000.

A Missing Participant IRA is similar to a Default IRA auto rollover in that a Missing Participant IRA auto rollover lowers the plan sponsor's fiduciary risk and saves time from tracking down missing participants. However, unlike the Default IRA auto rollover, the Missing Participant IRA does not incur the $5,000 dollar limit and the retirement plan must be terminating.

Example Default and Missing Participant IRA Process Flow

In some embodiments, a default and missing participant IRA's module is configured to implement a process flow comprising the following process flow elements. Although this embodiment illustrates some elements as occurring sequentially, in various embodiments, a process flow may comprise more or fewer elements and/or the elements may be processed in a different order and/or one or more elements may be processed simultaneously or concurrently.

The retirement benefits management system can be configured to enable a user to create a user account as well as a sponsor organization account. The sponsor organization accounts are typically created by the company or entity that has the responsibility of the retirement plan.

The retirement benefits management system can be configured to then request that a user select the module or service type desired. In this example, a user would select the default and missing participant IRA's module or service type.

In some embodiments, the uncashed checks module is configured to ask the user who is going to pay the processing fees for the service (e.g., the participant or requestor).

The default and missing participants IRA's module can be configured to then prompt a user to indicate if there are any additional third party administrator fees (e.g., in addition to the processing fees that may be required by the operator of the retirement benefits management system) for each participant account.

The module in some embodiments is configured to prompt users to provide participant notification details and/or to designate the protocol as to how these participants will be notified of their retirement plan benefits and requirements to make a benefit election. In some embodiments, the module can be configured to allow the selection of more than one type of notification to the participants. In some embodiments, the module is configured to prompt users to select a specific no response action or actions that should be taken if the participant does not respond to the notification. No response actions may include, but are not limited to: Set Up Default IRA; Return Funds to Plan; or Contact Third Party Administrator/Plan Sponsor.

In some embodiments, the users can also select the type of notification used (e.g., 1st class mail, certified mailing, etc.).

The module can be configured to then prompt users to create participant accounts by, for example, providing the retirement plan participant information such as participant name, date of birth, social security number, address, participant benefit amount, reason for distribution, account type, report-to state for tax purposes, etc. The module can be configured to perform various data entry validations and to prompt the user for correction at each data requirement prompt for the various pieces of information (e.g., social security number, date of birth, address, etc.) to help ensure or at least attain a certain level of comfort that complete and accurate data is being captured.

In some embodiments, after the necessary information is provided by the user to create a participant account, the module can be configured to present users with a batch summary. The batch summary can be configured to display to the user that a batch of participant accounts has been created and to display various information about the batch, such as participant information for each individual account and/or batch totals. The module can additionally be configured to enable the user to create or add additional accounts and/or participants to the batch, to edit or remove existing accounts and/or participants from the batch, and/or to finalize or close the batch.

When a user indicates to the system to finalize or close the batch, the module can be configured to obtain an acknowledgment or confirmation from the user that he or she has read and understands the disclosures provided (e.g., that the information provided is true and accurate), that the operator of the system will not be held liable for inaccurate or invalid information, that the participant are entitled to the benefits/accounts entered, and/or that, if a retirement plan is subject to the PBGC, then the operator of the system would not be held liable for remitting such accounts to the PBGC.

After a user agrees that they have read and understand the disclosures, then the default and missing participant IRA's module can be configured to provide a confirmation number, which communicates that the participant account batch and accounts have been created and saved. In addition, in some embodiments, a confirmation page is provided that provides the user with additional instructions on how to remit the money to fund the participant accounts. For example, the module may indicate that the batch total and the amount needed to fund these accounts is $25,000. The module can be configured to provide instructions for various options for funding, such as check, ACH, or wire transfer.

In some embodiments, the module can be configured to confirm that the required funds have been received prior to proceeding any further in the process flow.

The module can be configured to send any funds received to a trust, such as an Employee Benefit Distribution Trust (PCEEBDT).

The module can be configured to, once the funds are received into the PCEEBDT, validate and reconcile the deposit information from the PCEEBDT account. For example, the funds received can be matched with any participant account instructions provided. The module can be configured to then link the received funds to the sponsor organization account and/or any associated participant accounts.

In some embodiments, the module can be configured to, once the funds are reconciled and associate with the participant accounts, begin the notification process and generates the appropriate contact forms to notify the participants of their benefit and to make a benefit election (e.g., cash out or rollover).

In some embodiments, if the funds received do not match or reconcile with the participant account information previously provided, the module can be configured to reach out to the sponsoring organization to rectify and correct. In some embodiments, only after the instructions and the funds match does the notification process take place.

In some embodiments, the module can be configured to perform the following functions in notifying the participants of their retirement plan benefit after the reconciliation process takes place:

Perform an address search based on the participant account data previously received to obtain the best address. In some embodiments, an API protocol is used to drop files via secure FTP to vendor and to either receive confirmation that the current address is the best address or to update the current address with a better one.

Create the notification letter via, for example, PDF and save the notification letter.

Print and mail the notification letter with specific instructions on how to make a benefit election, deadlines to make a benefit election and what happens if they don't make a benefit election (e.g., cash out or roll their funds over to an IRA or New Employer Plan).

The notification letter in some embodiments provides instructions to the retirement plan participant as to how to securely make a benefit election via online claim form or via paper forms.

For responsive parties, the module can be configured to process the online or paper claim form and to schedule the retirement plan benefit to be paid according to the claim form (e.g., via check, ACH, wire, debit card, etc.). In some embodiments, when the benefit is paid out, the module is configured to assess and collect a processing fee.

If the module does not receive a response to the notification letter(s), the module can be configured to automatically follow the notification/processing protocol established when the participant account information was created originally. The protocol can comprise the following: sending out a second notice certified mail with another specific deadline; setting up a default IRA; returning the funds to the plan; contacting the third party administrator or plan sponsor.

Some embodiments include usage of the Social Security Administration letter forwarding service. In these embodiments, the module is configured to automatically generate this request on behalf of the retirement plan and plan participants.

In some embodiments, the module is configured to automatically register all accounts that are established as Missing Participant/Default IRA's with a national registry of unclaimed retirement benefits.

Reloadable Debit Card

In some embodiments, a retirement benefits management system or payment generation system can be configured to enable beneficiaries and/or alternate payees to receive benefit payments via a reloadable debit card. The system can be configured to pay benefits using a debit card for any underlying account type. A retirement benefits management system can be configured to provide a debit card payment option to payees of benefits as the form of payment (e.g., in addition to check, ACH, wire, etc.). This option can allow the payee to receive their benefits loaded on a debit card. The payee then has the flexibility to use the debit card for purchases, just as they would another debit or credit card. The payee does not need to be banked to use the card and can control both the payment and all expenses in one place, the debit card account. In some embodiments, a reloadable debit card can be issued by (or its issuance can be initiated by), for example, the distribution engine 238 illustrated in FIG. 2B in combination with, among other things, the debit card printer 106 illustrated in FIG. 2B.

In some embodiments, a retirement benefits management system is configured to implement a process flow comprising the following process flow elements. Although this embodiment illustrates some elements as occurring sequentially, in various embodiments, a process flow may comprise more or fewer elements and/or the elements may be processed in a different order and/or one or more elements may be processed simultaneously or concurrently.

The retirement benefits management system can be configured to prompt the payee to select a form of payment. If the payee selects the debit card option, then the system can be configured to prompt the payee to enter the address to which the debit card will be mailed.

In some embodiments, the system uses an API call or SFTP process to communicate with a debit card processing company to order the card in the name of the payee and to be sent to the requested address.

The debit card processing company fulfills the request and mails the card and, in some embodiments, disclosure materials from the benefits service provider, to the proper address. In some embodiments, rather than using a debit card processing company, the debit card processing is handled by the retirement benefits management system.

In some embodiments, when the payee receives the card, the payee is required to activate the card by calling in and providing specific personal information to get the card activated. In some embodiments, the payee is required to acknowledge receipt and understanding of disclosures and fees.

Once the card is activated, the debit card processing company informs the retirement benefits management system of the activated card numbers, and the system then processes an ACH to fund that specific card.

National Registry of Unclaimed Retirement Benefits

There are a huge number of unclaimed benefits in the U.S. market that the owners of the funds either forgot about or that the owners of the funds are not aware of how to claim the benefits they are entitled to. Accordingly, in some embodiments, systems, methods, and devices are configured to assist users in locating lost, forgotten, abandoned, or unclaimed retirement benefits. In some embodiments, a system is configured to provide a national registry of unclaimed retirement benefits searchable by users, for example, former employees, to assist the users in locating lost or forgotten benefits. A system can also be configured to enable trustees and/or plan sponsors to register the names and other information relating to missing participants who have an account balance in hopes that the former employee may one day access the system to search for the lost benefits. A system can be configured to help match employers with abandoned or forgotten employee retirement account balances with the former employees who they rightfully belong to. In some embodiments, a system incorporating a national registry of unclaimed retirement benefits is configured to be accessible through a secure internet website. In some embodiments, the processes described herein in reference to a registry of unclaimed retirement benefits can be performed by, for example, the orphaned plan engine 254 illustrated in FIG. 2B. In some embodiments, the system can be configured to automatically update and/or verify account balances and/or to confirm accounts still exist. For example, the orphaned plan engine 254 can be configured to periodically utilize an identity verification system to verify identities and/or get updated address information. The orphaned plan engine 254 can also be configured to periodically electronically communicate with a third party benefits management system to confirm that an unclaimed benefit listed in the unclaimed benefits system is still unclaimed and/or to update the account balance.

In some embodiments, a lost or forgotten benefits system is configured to enable a user to perform a free (or in some embodiments, not free) secure database search for any unclaimed or unpaid retirement benefits. The system can also be configured to enable, for example, government agencies, employers, institutions, and/or plan sponsors to register, for free or for a fee, one or more unclaimed or unpaid retirement benefits and the corresponding employee's information. In some embodiments, when a user performs a search using the system, the system is configured to alert the user to any benefit that matches their search criteria and/or to provide the user with the contact information of the entity that holds the account. In some embodiments, the system is configured to alert the user that a benefit matches their search criteria, but not to disclose any confidential information relating to the benefit to the user.

Example Process Flow

Figure 7A:
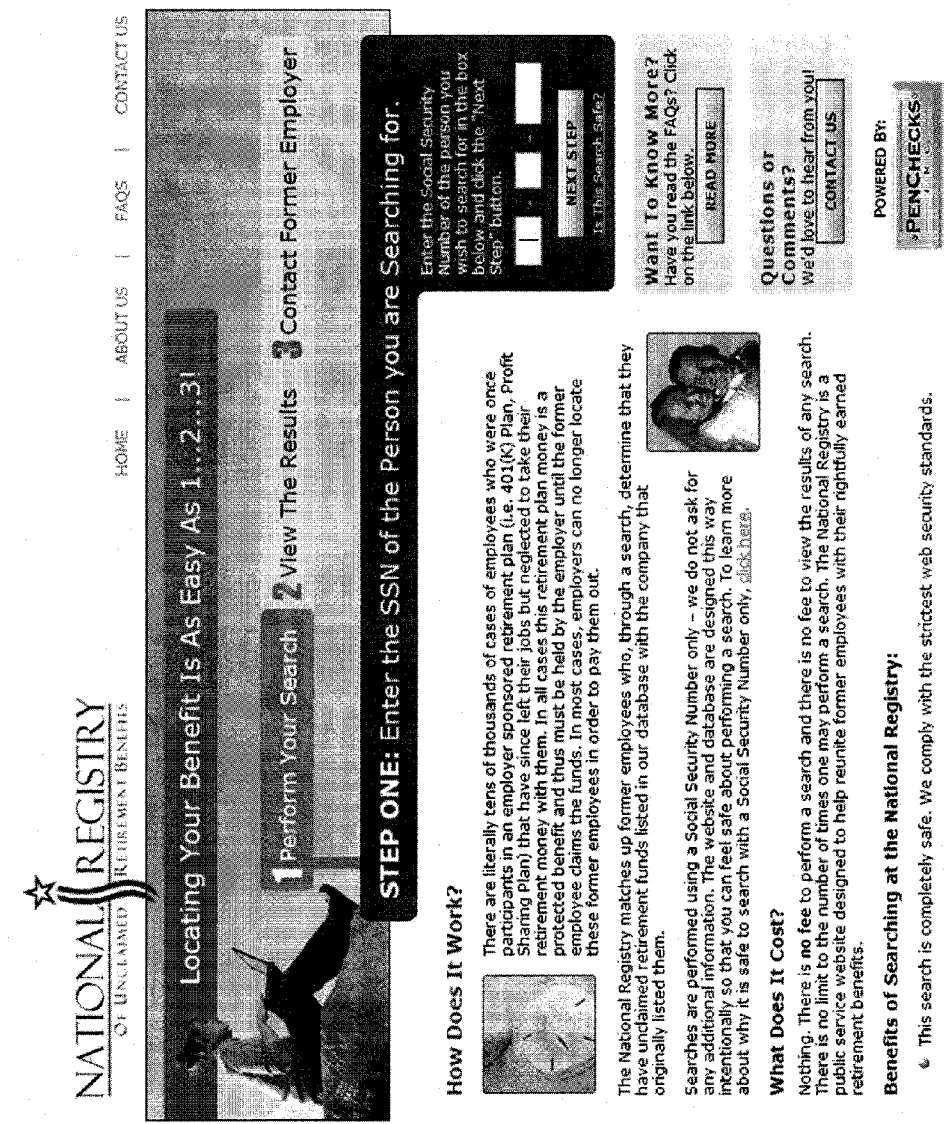
Figure 7B:
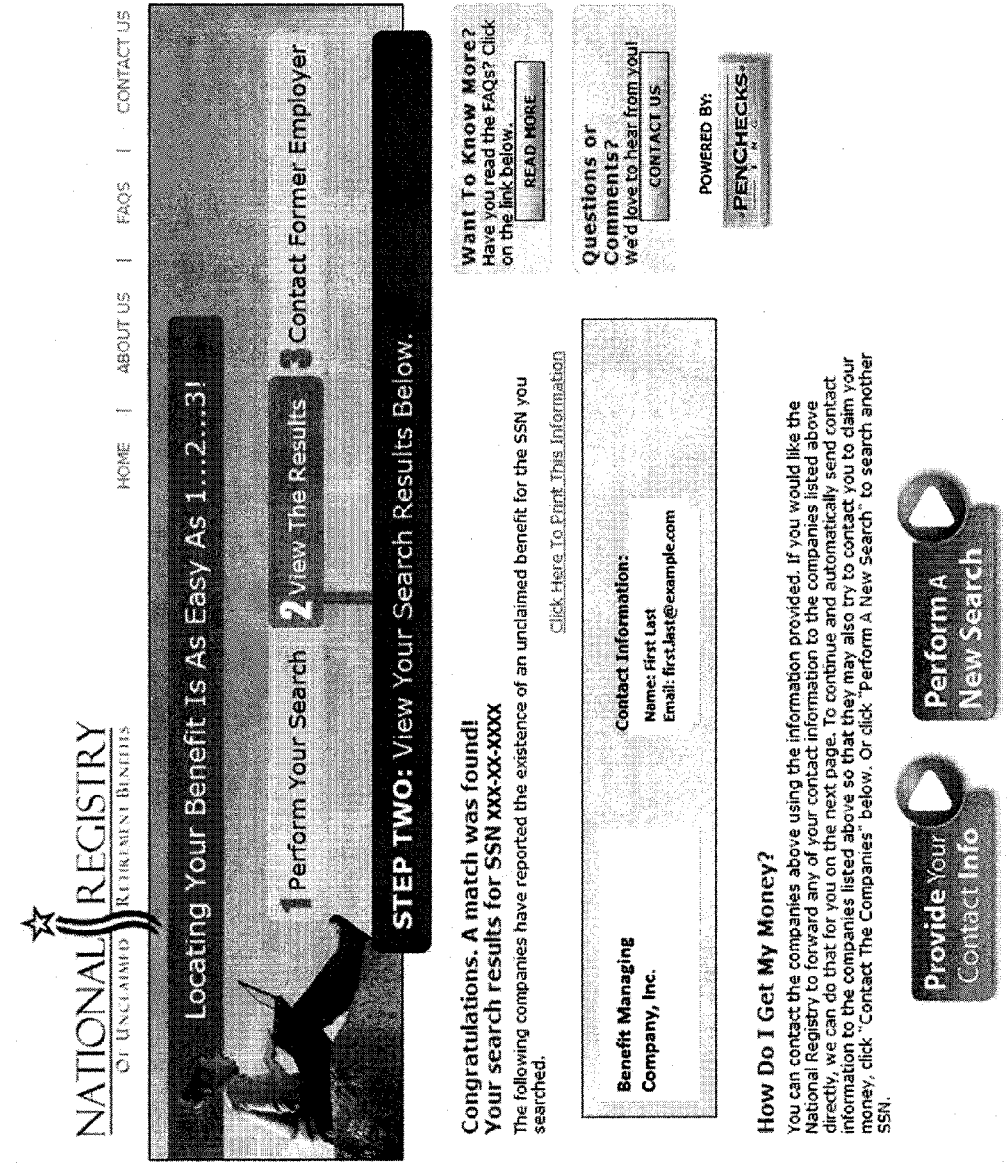
Figure 7C:
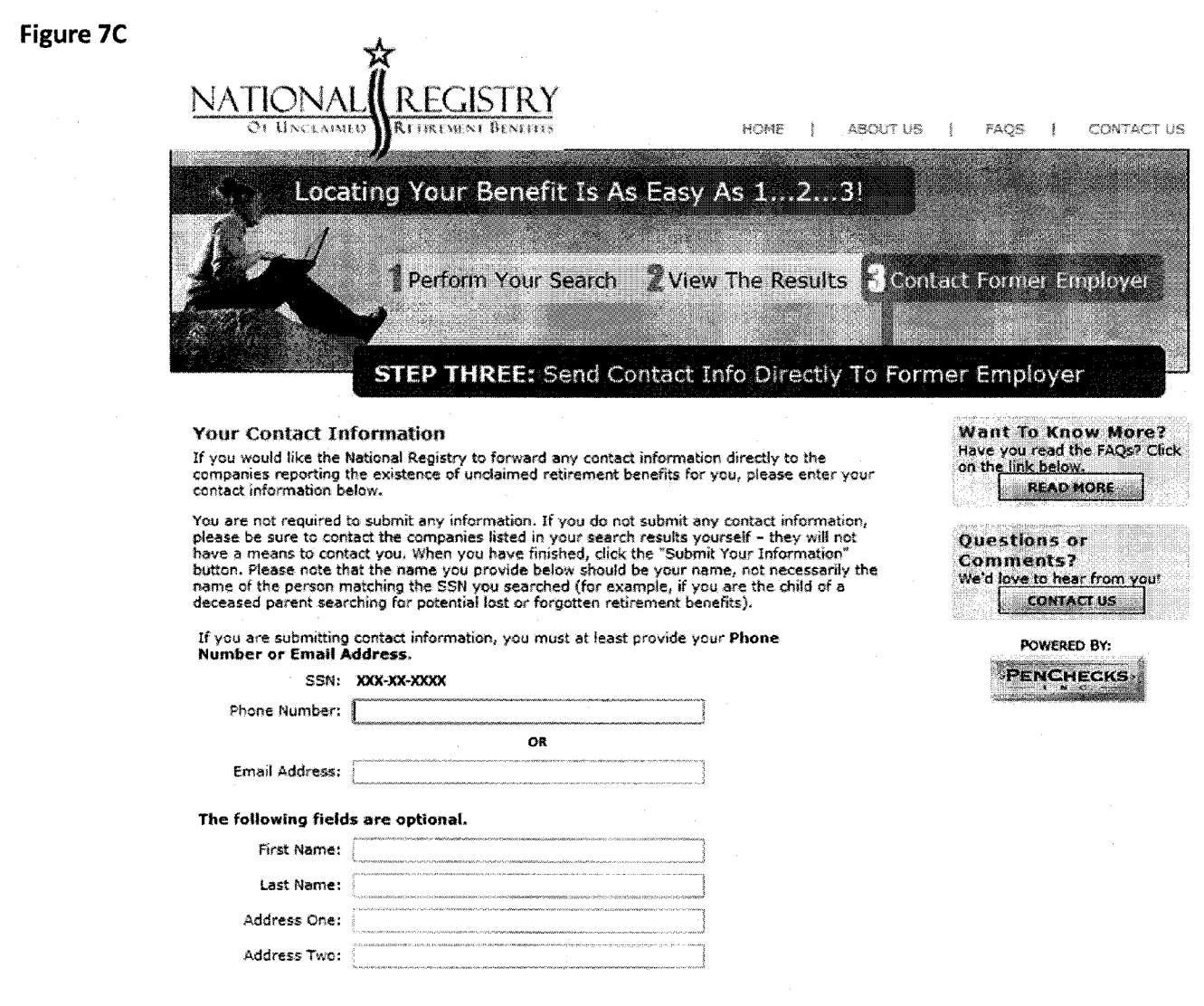

In some embodiments, a lost or forgotten benefits system is configured to implement a process flow comprising the following process flow elements. Although this embodiment illustrates some elements as occurring sequentially, in various embodiments, a process flow may comprise more or fewer elements and/or the elements may be processed in a different order and/or one or more elements may be processed simultaneously or concurrently. FIGS. 7A-7C illustrate example embodiments of a user interface for performing portions of the process flow described below.

The lost or forgotten benefits system can be configured to enable an administrator user, such as a plan sponsor, to create a master account and/or administrator account with the system. This master account can be used, for example, to then create individual accounts of funds that belong to people that are non-responsive and/or that cannot be located. The system can be configured to accept various information to setup a master account, for example, the company name and contact information (e.g., address, phone, email address). The system can be configured to allow an administrator user to access and/or administer the account through an online interface to, for example, make any changes, add individual accounts, etc. In some embodiments, the system can be configured to enable the administrator user to bulk upload account information via, for example, an Excel spreadsheet.

The lost or forgotten benefits system can be configured to, after a master account is created, prompt the administrator user to create individual accounts. These individual accounts can then be, for example, stored in a database and/or listed in the national registry of unclaimed retirement benefits to enable individuals to search the database for any missing funds that belong to them. The system can be configured to allow the master account administrator or user to add, delete, or update individual accounts and/or to add, delete, or update accounts in bulk. In some embodiments, to establish an individual account, the employee's name, last known address, and/or social security number are required. In other embodiments, more or less information is required to establish an individual account.

The lost or forgotten benefits system can be configured to, once a master account and one or more individual accounts are established, make at least some of the information relating to the accounts be searchable by an individual user of the system, for example through an online user interface. For example, an individual searching the system can be asked to enter their social security number. The system can be configured to then search the database and alert the user if there is a match for their social security number. When there is a match, the system can be configured to provide information to the individual user to enable the individual user to contact the master account administrator, such as the name, address, and email address of the master account administrator. This can, for example, enable the individual to contact the company regarding their lost benefit.

In some embodiments, the system is configured to provide little or no information regarding the lost benefits to the individual user. For example, the system may be configured to merely tell the user there was a "hit" in the database, and to provide the administrator user's contact information to the individual user. This may be desirable, for example, to not allow the disclosure of confidential information and/or to comply with relevant regulations. In other embodiments, the system can be configured to provide at least some information relating to the lost benefits, to enable a user to make a preliminary determination as to whether the lost benefits are that user's lost benefits. For example, the system may be configured to specify the amount of money in the account (or a range within which the value lies, e.g., "between $5,000 and $10,000"), the last name of the owner, the employer with which the account is or was associated, the geographic region with which the account is or was associated, the date or approximate date the employee the account is associated with left the associated employer, and/or the like.

In some embodiments, the system is configured to enable an individual user to provide updated contact information for an individual account that was found by the system through the individual user's search. This information can be, for example, transmitted back to the master account administrator to enable the administrator to update their records.

In some embodiments, the system is configured to generate an email or other communication to the master account administrator indicating that a search was performed and/or that one or more of the administrator's individual accounts was selected as being relevant to that search (e.g., that the individual account's social security number matches the social security number provided for the search). The communication to the administrator can in some embodiments include the social security number that was searched, contact information relating to the searcher (including any updated contact information provided by the search), a unique identifier identifying the individual account found through the search, and/or the like. The communication to the administrator can, for example, enable the administrator to contact the individual user to help reunite the user with the lost or forgotten account.

Other Retirement Benefits Management System Features

A retirement benefits management system as described herein can comprise various features, including, in addition to the features already discussed above, various other features. For example, a system can be web-based enabling users of the system to have no start-up costs to utilize a fast, efficient, and scalable system compatible with various web browsers. In some embodiments, the system comprises a hierarchical account structure to enable access by users at various levels. In some embodiments, the system comprises a high level of transparency, such as including automatic email notifications on receipt of plan assets, aging deposits, aging distributions, and/or the like. In some embodiments, information is easy for a user to access, such as by maintaining a history of every distribution that is then available for users for several years to view and/or to create instant, easy to use reports.

In some embodiments, the system comprises broker notifications on distributions from plans. In some embodiments, the system can be configured to notify plan participants of pending distributions. In some embodiments, the system can be configured to process rollover and lump sum payments via check, ACH, wire, and payment card. In some embodiments, the system can be configured to establish and administer recurring benefit payments, such as monthly, quarterly, semi-annually, and annually. In some embodiments, the system can be configured to withhold, remit, and report federal and state tax withholdings. In some embodiments, the system can be configured to provide an easy way to collect a third-party administrator fee from every distribution or some distributions. In some embodiments, the system can be configured to fulfill Department of Labor participant notification requirements prior to establishing a missing participant IRA or other alternative account. In some embodiments, the system can be configured to establish safe harbor default/missing participant IRAs on behalf of the participant.

In some embodiments, the system comprises a dashboard homepage viewable with an Internet browser that provides, among other things, a quick view of available deposits and unprocessed distributions for all plans under a third-party administrator or plan sponsor account. In some embodiments, the system provides robust online reports, such as with quick and easy access to various forms of data, such as deposits, distributions, 1099-R information, uncashed checks, and third-party administrator credits, with the ability to export in various formats, such as for use with a spreadsheet program. In some embodiments, the system provides built-in federal and state tax engines to calculate tax withholding and appropriate tax codes for each distribution. In some embodiments, the system is configured to provide correct 1099-R tax codes based on the distribution reason, account type, and participant age. In some embodiments, the system is configured to enable bulk upload distributions from, for example, a spreadsheet program or CSV file, without requiring templates. In some embodiments, the system provides a more streamlined and efficient process to add plan sponsor and plan data using the bulk upload feature.

In some embodiments, the system comprises the ability to easily enter vendor payments independent of a participant distribution. In some embodiments, the system is configured to provision access using various user profiles, such as administrator, basic, view-only, and/or the like. In some embodiments, the dashboard enables a user to easily sort, group, and filter all items in a data grid. In some embodiments, the dashboard or other portions of the retirement benefits management system enable a user to edit and/or delete unprocessed distributions without having to contact the operator of the retirement benefits management system. In some embodiments, participant information is saved and is made available for future distributions. In some embodiments, the dashboard homepage enables a user to view a credit balance. In some embodiments, the system is configured to mask sensitive information, such as Social Security numbers. In some embodiments, the system is configured to enable a user to quickly search for a specific participant, plan, etc. by searching by participant name, Social Security number, distribution ID, plan name, plan sponsor name, check number, and/or the like.

In some embodiments, a retirement benefits management system or payment generation system comprises at least three components that interact to achieve the functionality described herein: a database, a user interface, and a reports module or reporting engine. The database in some embodiments is a repository for distribution data and provides storage for all the information needed by the retirement benefits management system. In addition, the database can be configured to enable enforcing of rules on the stored data and providing mechanisms for adding/updating data according to those rules. In some embodiments, the user interface is the front end for the end-user that allows the user to interact with the data. In some embodiments, the user interface comprises a website as well as one or more programs for internal use by an administrator of the system. In some embodiments, the reports module is configured to provide reporting on the data. The reports module can be configured to provide various reports, with many reports being customizable in their selection criteria, and the results can be exported to a variety of formats, such as text file, PDF, native spreadsheet file, and/or the like.

Example Embodiment of a Database Structure

Figure 8:
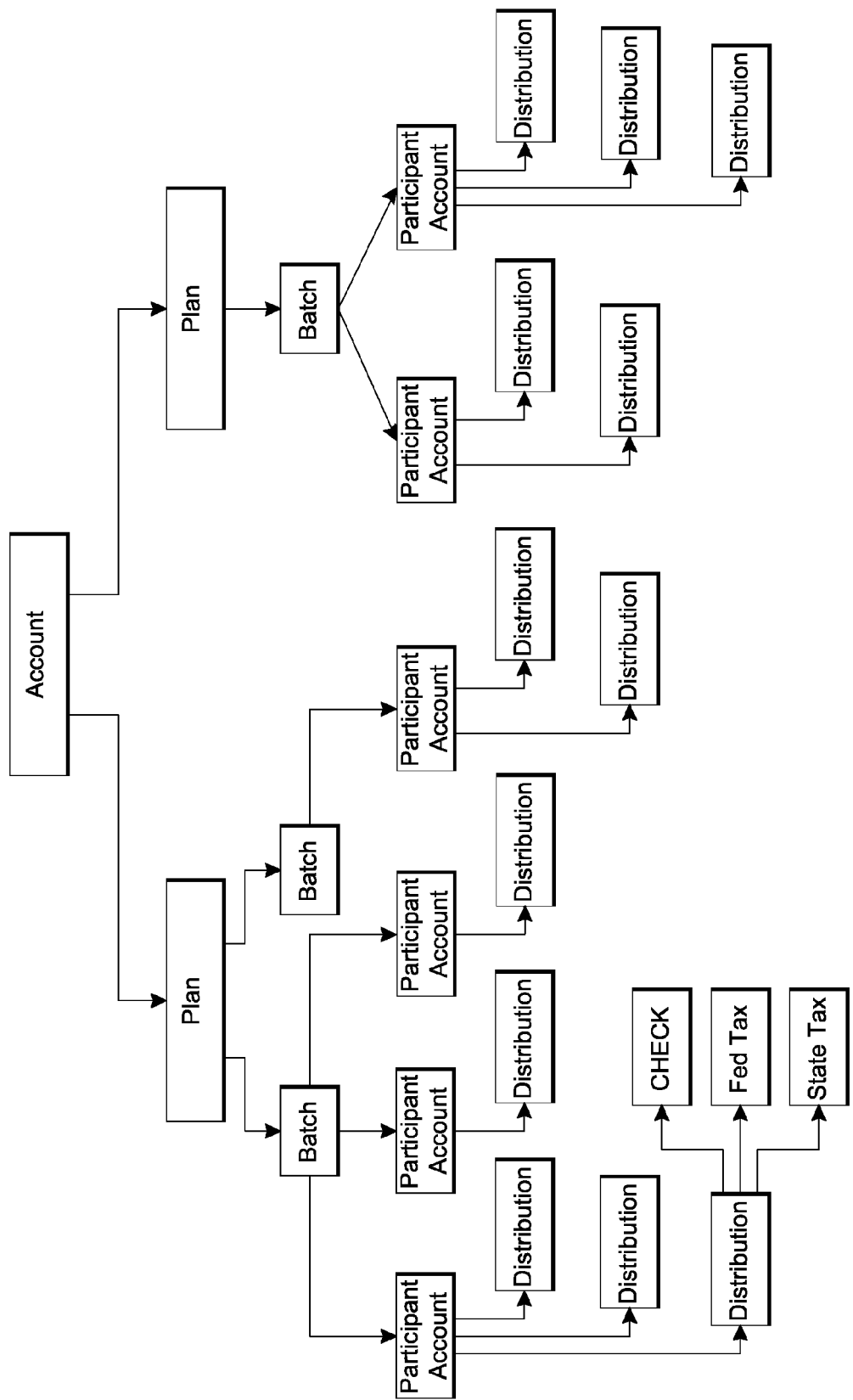
FIG. 8 is a block diagram depicting an embodiment of a database structure for a payment generation system.

An example configuration of a database for a retirement benefits management system can be seen in FIG. 8. The database structure illustrated in FIG. 8 comprises several interrelated data areas relating to accounts and plans, participants, distribution batches, participant accounts, and individual distributions. The accounts and plans area is configured to hold information about the third-party administrator/plan sponsor accounts that are maintained using the retirement benefits management system. Third-party administrator accounts are top-level accounts and may have several plan sponsor accounts underneath them. A plan sponsor account may be a child of a third-party administrator account or may be an independent account. In the latter case, the plan sponsor account can have no dependent accounts, in some embodiments.

Accounts can be created by, for example, the account holder using the retirement benefit management systems account creation facility, but they may also be created by uploading data into the database. Account creation in some embodiments can also trigger a user account creation. The user account is, for example, what can be used to login to the retirement benefits management system through, for example, an Internet website. Each account may have one or more plans attached to it. Plan records hold the information about a specific plan owned by the account.

A participant record holds information about a plan participant such as social security number, date of birth, contact information, and/or the like. Participants belong to a plan. An individual may appear several times in the database, but in some embodiments can only appear once under a given plan.

A distribution batch is a container record that groups participant accounts generally so that they can all be processed together. When a third-party administrator needs to distribute funds, he or she may group these distributions under one umbrella. When depositing funds to the retirement benefit management system to cover these distributions, one deposit can be made to cover them all, and the retirement benefits management system can easily identify these deposits by their associated unique batch identification number. Distribution batches in some embodiments belong to a specific plan.

Participant accounts records are configured to describe the financial information for each participant's account with the plan. They are usually created when a distribution is about to be made. The retirements benefit management system can be configured to use this information in the distribution creation process. Participant accounts in some embodiments belong to a specific distribution batch.

Distribution records in some embodiments contain all the information pertaining to a payment made by the retirement benefits management system or payment generation system to a participant or recipient. Information such as fees, taxes, method of payment, amounts, and/or the like are all maintained in the distribution records. Distribution records belong to a participant account.

Example Payment Distribution Processes

Figure 9A:
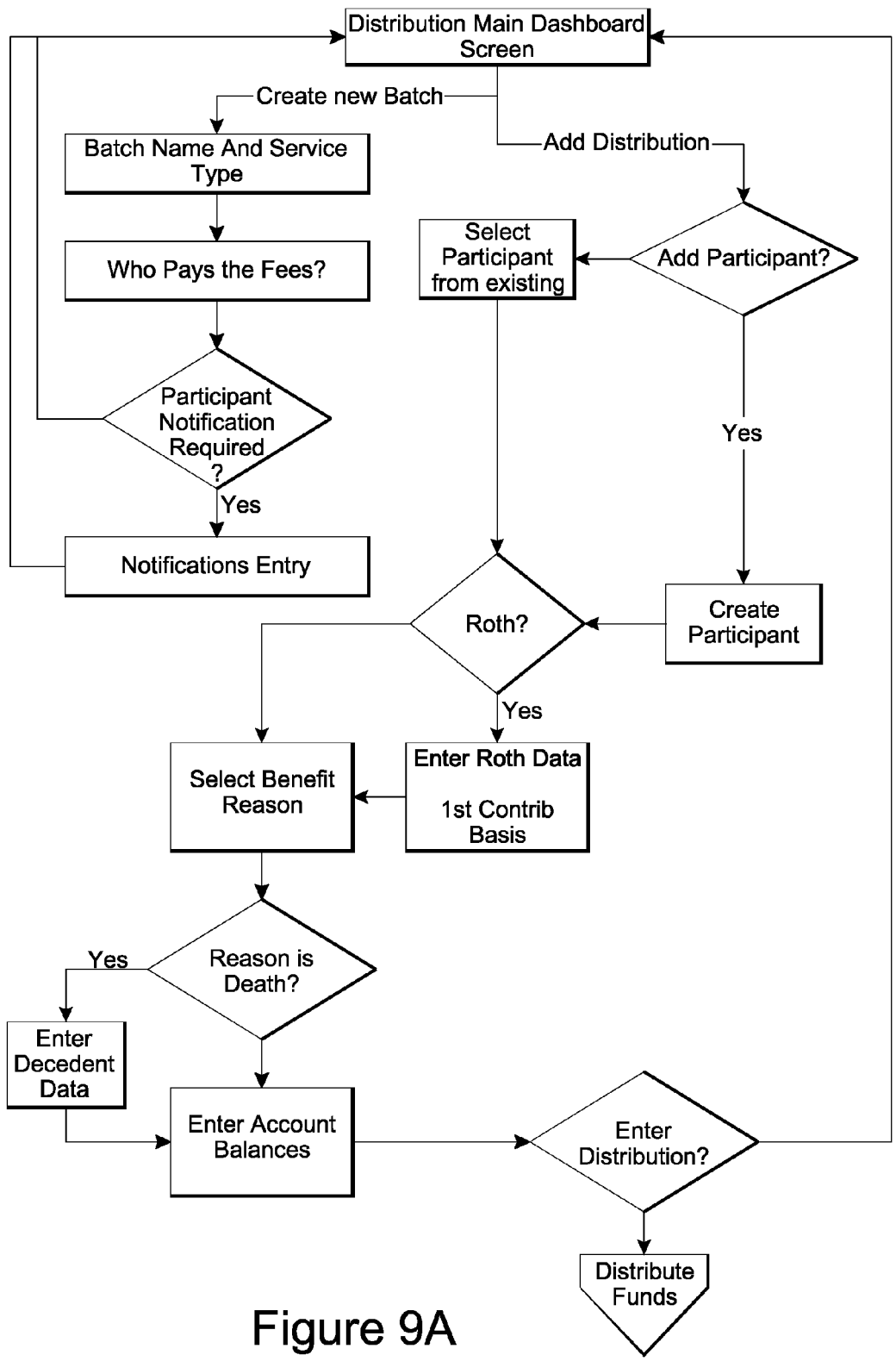
FIG. 9A depicts an embodiment of a process flow diagram illustrating an example of a payment distribution process.
Figure 9B:
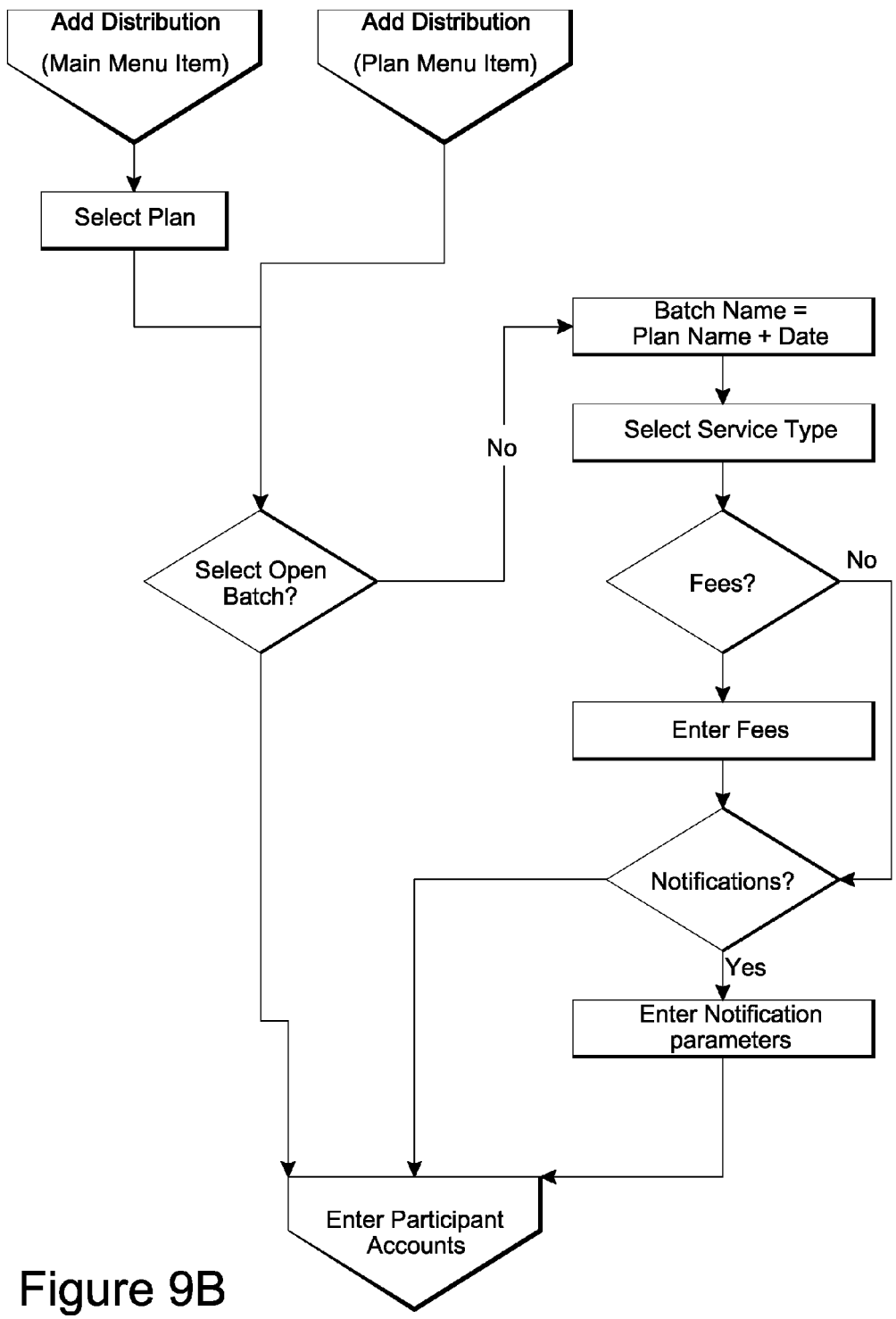
FIG. 9B depicts an embodiment of a process flow diagram illustrating another example of a payment distribution process.

FIGS. 9A and 9B depict two more embodiments of examples of payment distribution processes. The process flows illustrated in FIGS. 9A and 9B can be performed by, for example, various payment generation systems as described herein. In some embodiments, a payment distribution process enables a user to select a plan under which a batch distribution will be created. When a plan is selected, a list of open batches for that plan can be displayed. If a user selects one of the open batches, the system can be configured to branch to the participant accounts creation function. Users can also opt to create a new batch.

Batches can be created, modified, close, or reopened. When entering distributions, the user has the option to create a new batch and/or to add distributions to an existing open batch. If a user chooses to create a new batch, a new batch is created under a selected plan. A batch may have a name and define a service type as well as if a third-party administrator fee needs to be levied for its distributions. If the user selects to close a batch, once distributions have been added, a batch can then be closed, triggering the start of distribution processing by the retirement benefits management system or payment generation system. A user may have the option to reopen a closed batch in some embodiments if certain conditions are met, such as that no distribution payments have yet been made. In some embodiments a user may be given the option to save a batch, meaning the user can confirm batch settings and have an option to enter participant accounts right away.

Participant accounts are individual accounts within the plan. A participant account function can be configured to define the balances and other pertinent data for a specific participant account. As long as payments have not yet been made, in some embodiments, a participant account may still be modified. A payments feature allows a user to enter payments against a participant account. This function can allow entering payment amount, type, and other pertinent data. This function can also compute taxes to be withheld.

As one example of a distribution configuration process, the process can be started by enabling a user to select a plan to add distributions to. For example, the system may present, through a user interface, a list of existing plans that the user may select from to add a distribution to. The user can then be displayed a batch selection or creation screen. On this screen, the user can be shown existing batches from which the user can select, or the user can select a button to create a new batch within the selected plan.

If a user selects to create a new batch, the system can be configured to enable the user to give the batch a name and to select a service type. For example, some of the service types that may be selected from may include payment processing only, express default/missing participant IRA, full service, benefit election processing, premier default missing participant, tax payment and 1099-R, 1099-R processing, uncashed checks processing, plan trustee payment, recurring benefit payment, and/or the like. For example, if the user selects benefit election processing, the user is indicating that this batch is for performing a service wherein the payment generation system is configured to take care of contacting participants, collecting participants benefit elections, as well as notifying any plan broker of the pending distribution. The end result of this process is an electronic record of the participant benefit election. The user can then be given an option to define who pays fees, if any, and if third-party administrator fees are be are to be levied. For example, the user can indicate that the participant or recipient will pay fees and that the fees are $15 per distribution.

The system can be configured to then give a user options to define how participants or recipients are notified of distributions or other information. For example, the system may be configured to provide a first notification and a second notification with a certain amount of time allowed to pass between sending the first and second notifications. For example, the user may be given the option to select, for the first notification, how it is delivered and what happens when that notification expires. For example, the user may be able to indicate that the first notification should be sent via first class mail, express mail, electronic mail, and/or the like. The user may also be given the option to determine what happens upon expiration of the first notification. For example, the user may be given the option to determine that, upon expiration of a predetermined amount of time with no response to the first notification, that a second notification is sent. The user can then be given the option to decide how the second notification is sent and what happens when that notification expires. For example, one option for when the second notification expires is to expire a PIN number that was provided in the notifications that the user could have used to login to the retirement benefit management system to provide his or her elections. The system can also be configured to enable a user to set the time intervals between notifications. For example, the system can be configured to enable a user to set that the first notice will expire 30 days from sending and that the second notice will expire 60 days from sending the first notice.

Once a batch has been created, the system can be configured to give a user the opportunity to start creating participant accounts. For example, an existing participant may be selected from a list of existing participants or recipients in the system. Further, a button may be displayed that enables a user to add a new participant that is not yet in the system or associated with the relevant plan. If the user creates a new participant, the system can be configured to ask for various pieces of information about the user, such as social security number, date of birth, name, address, phone number, email address, and/or the like.

Once a user has selected a participant, the system can be configured to ask the user to enter distribution amounts. For example, the system can be configured to ask the user for a pre-tax amount, a post-tax amount, a loan amounts, a gross amount, and what state to report any relevant text documents two. Finally, the system can be configured to ask the user to select a reason for this distribution. For example, the reason may be disability, employee separation of service, excess contributions/deferrals, hardship, in-service distribution, IRS levy, life insurance, none, plan termination, prohibited transaction, qualified domestic relations order, required minimum distribution, and/or the like. The system can be configured to then enable the user to add or configure additional participants to the existing batch and to then finalize the batch to process the distributions.

In some embodiments, a payment generation system is configured to offer prepackaged sets of services to its users. The system can also be configured to rely on these prepackaged sets of services for defining business rules in the application. For example, the system can be configured to maintain a set of relationship tables between service types and other items such as distribution types, payment delivery methods, information display items, and/or the like. Whatever the system needs to display these items, it can be configured to query these tables to find which items are valid for the current service type. For instance, a service type may allow payments to be made by only check, while other service types allow ACH and wire transfers as well. In some embodiments, each service type has an attached list of delivery methods and allows and the user interface will only show these allowed delivery methods to the user.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. A debit card system for creating a plurality of debit cards, the debit card system comprising:
    a debit card printer configured to create debit cards based on instructions received through a computer network, the debit card printer comprising:
        an imprinting mechanism configured to apply textual information to a debit card blank;
        a magnetic strip writer configured to store information in a magnetic strip of the debit card blank; and
        a computer network interface configured to transmit and receive information through the computer network;
    a batch creation engine for processing batches of debit card distributions, the batch creation engine configured to receive through the computer network, from a user computing device, batch distribution information related to a batch of incomplete payments, the batch distribution information comprising a recipient name and a recipient payment amount for each of a plurality of recipients;
    a payment batches database for electronically storing information relating to the batches of debit card distributions,
    wherein the batch creation engine is further configured to assign a batch identifier to the batch of incomplete payments, calculate a total payment amount of the batch of incomplete payments by adding the recipient payment amounts, store the total payment amount in the payment batches database associated with the batch identifier, and transmit, through the computer network to the user computing device, the batch identifier and the total payment amount;
    a deposit management engine configured to receive, through the computer network from a deposit processing system, a deposit notification message, the deposit notification message comprising a deposit amount and a deposit identifier, wherein the deposit identifier matches the batch identifier,
    the deposit management engine further configured to access the total payment amount in the payment batches database using the deposit identifier, and to compare the deposit amount to the total payment amount to verify a correct amount of funds has been deposited;
    a distribution engine configured to, automatically in response to the verification that the correct amount of funds has been deposited, transmit instructions through the computer network to the debit card printer, causing the debit card printer to create a plurality of debit cards for at least a portion of the plurality of recipients by at least imprinting the recipient name and storing information associated with the recipient in the magnetic strip,
    wherein the distribution engine is further configured to initiate creation of an alternate account on behalf of each recipient related to a debit card that is not activated within a predetermined amount of time, and to transmit, through the computer network to the deposit processing system, instructions to enable a deposit into the alternate account of funds equal to the recipient payment amount; and
    one more computers configured to operate the batch creation engine, deposit management engine, and distribution engine, wherein the one or more computers comprises a computer processor and an electronic storage medium.

2. The debit card system of claim 1, wherein the distribution engine is further configured to assign a recipient identifier to each of the plurality of recipients for which a debit card is created, and to store the recipient identifiers in the payment batches database associated with both the batch identifier and an account into which funds to be spent by the debit card associated with the recipient identifier can be deposited,
    the distribution engine further configured to transmit, through the computer network to the deposit processing system, for each debit card that is activated within a predetermined amount of time, instructions to enable a deposit into the account of funds equal to the recipient payment amount.

3. The debit card system of claim 2, wherein the distribution engine is further configured to associate in the payment batches database an identifier of the alternate account with the recipient identifier.

4. The debit card system of claim 2, wherein the distribution engine is further configured to enable generation of reports at different levels by associating the recipient identifier in the payment batches database with at least one of the following: a benefits plan, a benefits plan sponsoring organization, a third party administrator.

5. The debit card system of claim 1, wherein the batch distribution information further comprises recipient address information, and the distribution engine is further configured to initiate a mailing of each debit card to its associated recipient using the recipient address information.

6. The debit card system of claim 5, wherein the distribution engine is further configured to, automatically upon receiving a notification that a debit card mailing was returned as undeliverable, transmit through the computer network to an identification verification system, a request for a current address for the recipient associated with the returned mailing,
  wherein the distribution engine is further configured to initiate a new mailing of the debit card associated with the returned mailing to the current address automatically upon receiving the current address from the identification verification system.

7. The debit card system of claim 1, wherein the alternate account comprises at least one of the following: an interest-bearing account, a tax-preferred account, an investment account.

8. The debit card system of claim 1, further comprising the deposit processing system, wherein the deposit processing system is configured to receive and at least temporarily hold funds for application to accounts associated with at least a portion of the plurality of debit cards.

9. The debit card system of claim 8, wherein the deposit processing system is further configured to electronically transmit distributions of payments to accounts associated with recipients that elect to receive an electronic funds transfer instead of a debit card.

10. The debit card system of claim 1, wherein the batch creation engine is configured to be capable of receiving through the computer network batch distribution information substantially simultaneously from a plurality of user computing devices and to calculate a total payment amount for each batch substantially in real-time, such that the total payment amount can be transmitted to each user computing device within five seconds of receiving the batch distribution information, the batch distribution information comprising information related to at least 100 incomplete payments.

11. The debit card system of claim 1, wherein the distribution engine is configured to, prior to transmitting instructions to the debit card printer to cause the debit card printer to create a debit card, verify the associated incomplete payment complies with a regulation.

* * * * *